United States Patent
Sato

(10) Patent No.: US 6,363,045 B2
(45) Date of Patent: Mar. 26, 2002

(54) SUPPORTING MEMBER FOR A DISC RECORDING MEDIUM REPRODUCING APPARATUS

(75) Inventor: Hiroyuki Sato, Hamura (JP)

(73) Assignee: Teac Corporation, Tokyo (JP)

( * ) Notice: Subject to any disclaimer, the term of this patent is extended or adjusted under 35 U.S.C. 154(b) by 0 days.

(21) Appl. No.: 09/740,621

(22) Filed: Dec. 19, 2000

Related U.S. Application Data

(62) Division of application No. 09/092,284, filed on Jun. 5, 1998, now Pat. No. 6,219,325.

(30) Foreign Application Priority Data

Jun. 10, 1996 (JP) .............................................. 8-147627
Jun. 9, 1997 (JP) .............................................. 9-151361

(51) Int. Cl.[7] .............................................. G11B 33/02
(52) U.S. Cl. ..................................................... 369/77.1
(58) Field of Search ............................ 369/75.1, 75.2, 369/77.1, 77.2

(56) References Cited

U.S. PATENT DOCUMENTS

| | | | |
|---|---|---|---|
| 4,785,365 A | * 11/1988 | Ohkita | 360/97 |
| 5,229,987 A | * 7/1993 | Aoki | 369/77.1 |
| 5,301,178 A | * 4/1994 | Okabe et al. | 369/77.1 |
| 5,355,358 A | * 10/1994 | Van Alfen | 369/77.1 |
| 5,532,994 A | * 7/1996 | Inoue et al. | 369/77.2 |
| 5,737,293 A | * 4/1998 | Kawamura et al. | 369/77.1 |
| 5,793,728 A | * 2/1999 | Selby et al. | 369/77.1 |
| 5,872,756 A | * 2/1999 | Shime | 369/77.1 |

* cited by examiner

*Primary Examiner*—Brian E. Miller
*Assistant Examiner*—Kenneth W. Fields
(74) *Attorney, Agent, or Firm*—Anderson, Kill & Olick, P.C.

(57) ABSTRACT

A recording medium reproducing apparatus includes a recording medium inlet member through which a recording medium is inserted, a recording medium reproducing unit which reproduces said recording medium, and a recording medium supporting member including wing portions which support said recording medium. The wing portions are elastically warped by the recording medium and support the recording medium by an elastically restoring force. Each of the wing portions is provided obliquely in a direction in which the recording medium is inserted in the recording medium reproducing unit.

6 Claims, 59 Drawing Sheets

INSERTION

EJECTION

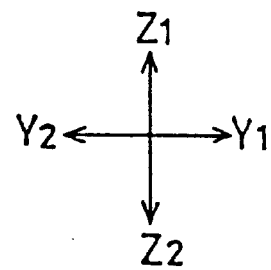
FIG. 6A
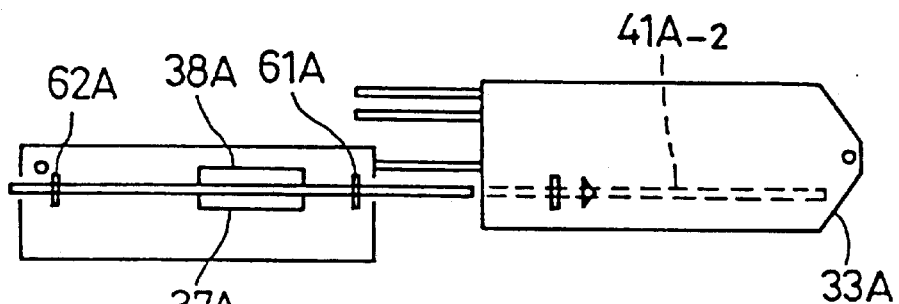
FIG. 6B
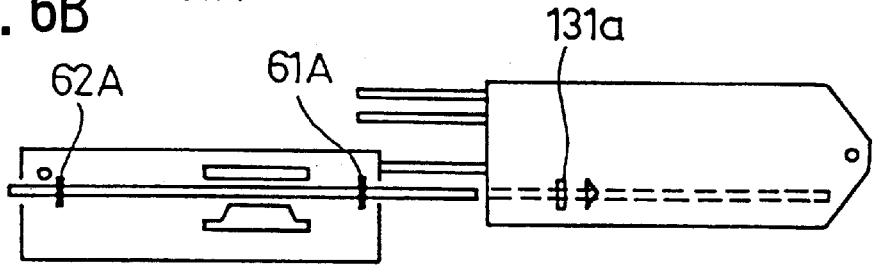
FIG. 6C
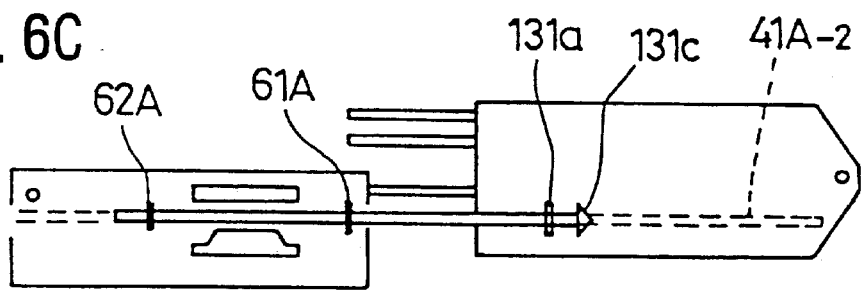
FIG. 6D
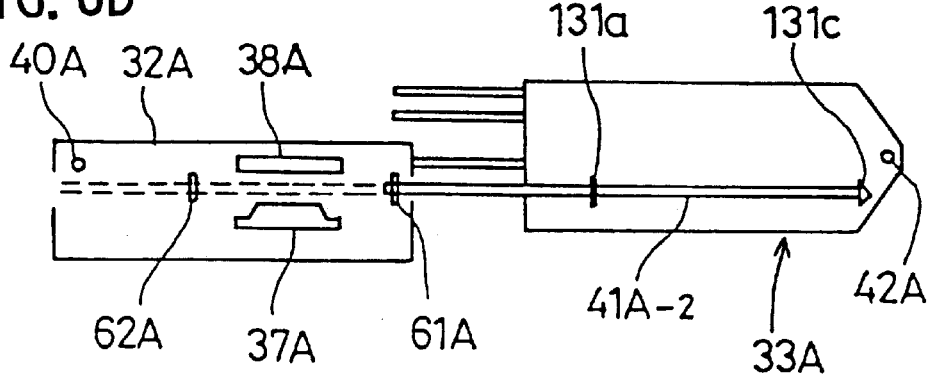

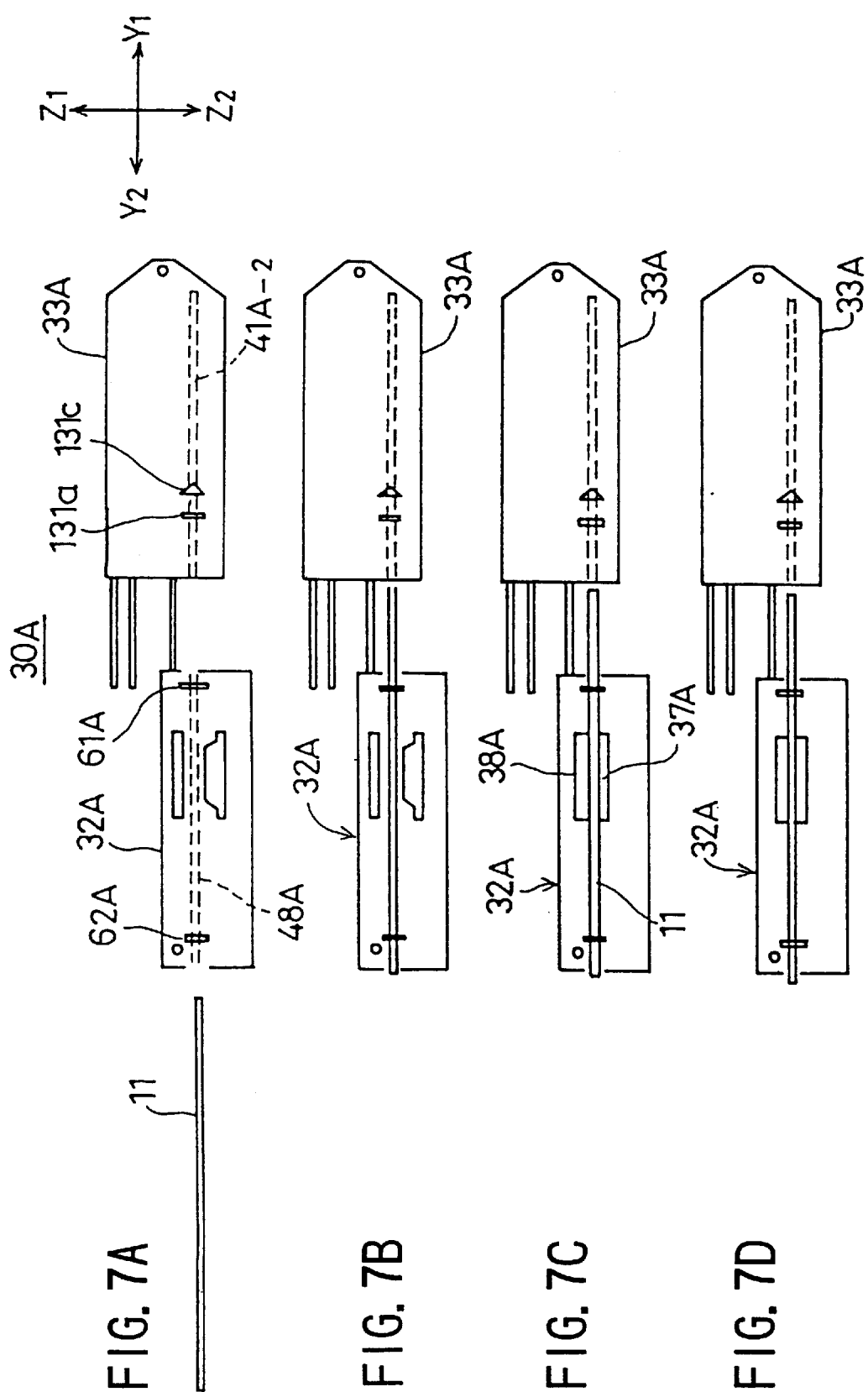

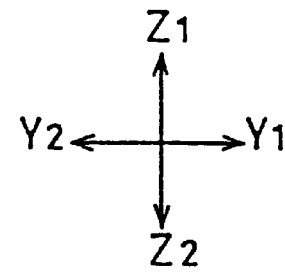
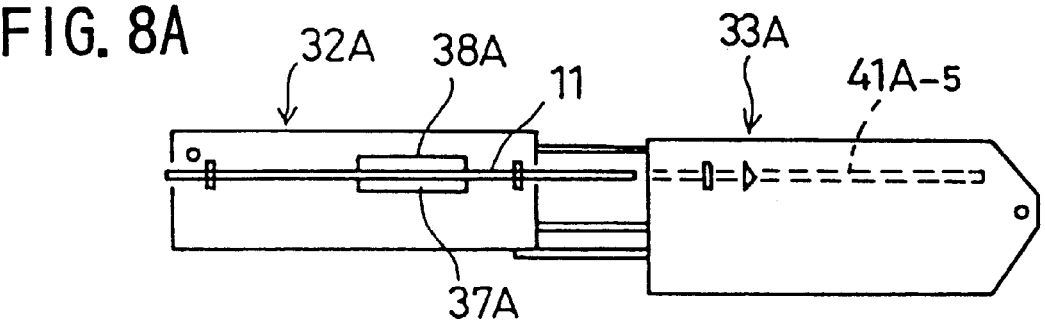
FIG. 8A
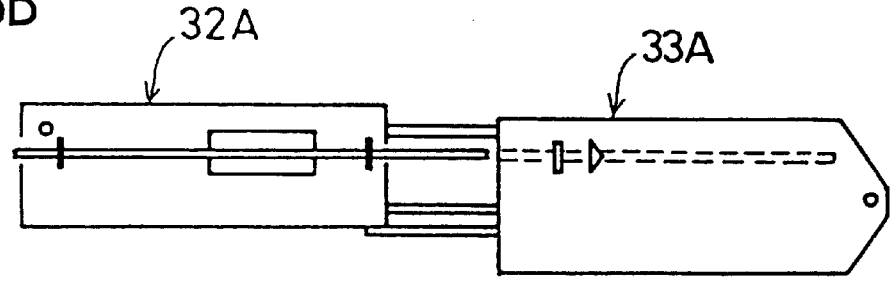
FIG. 8B
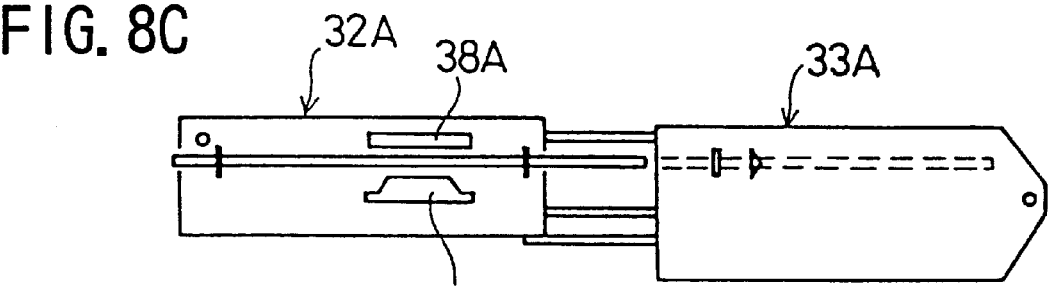
FIG. 8C
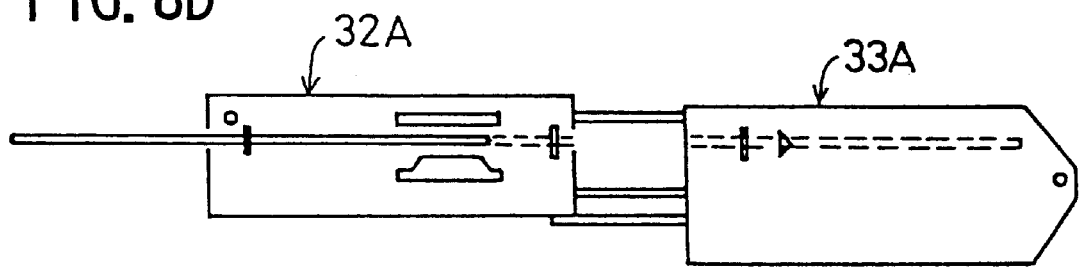
FIG. 8D

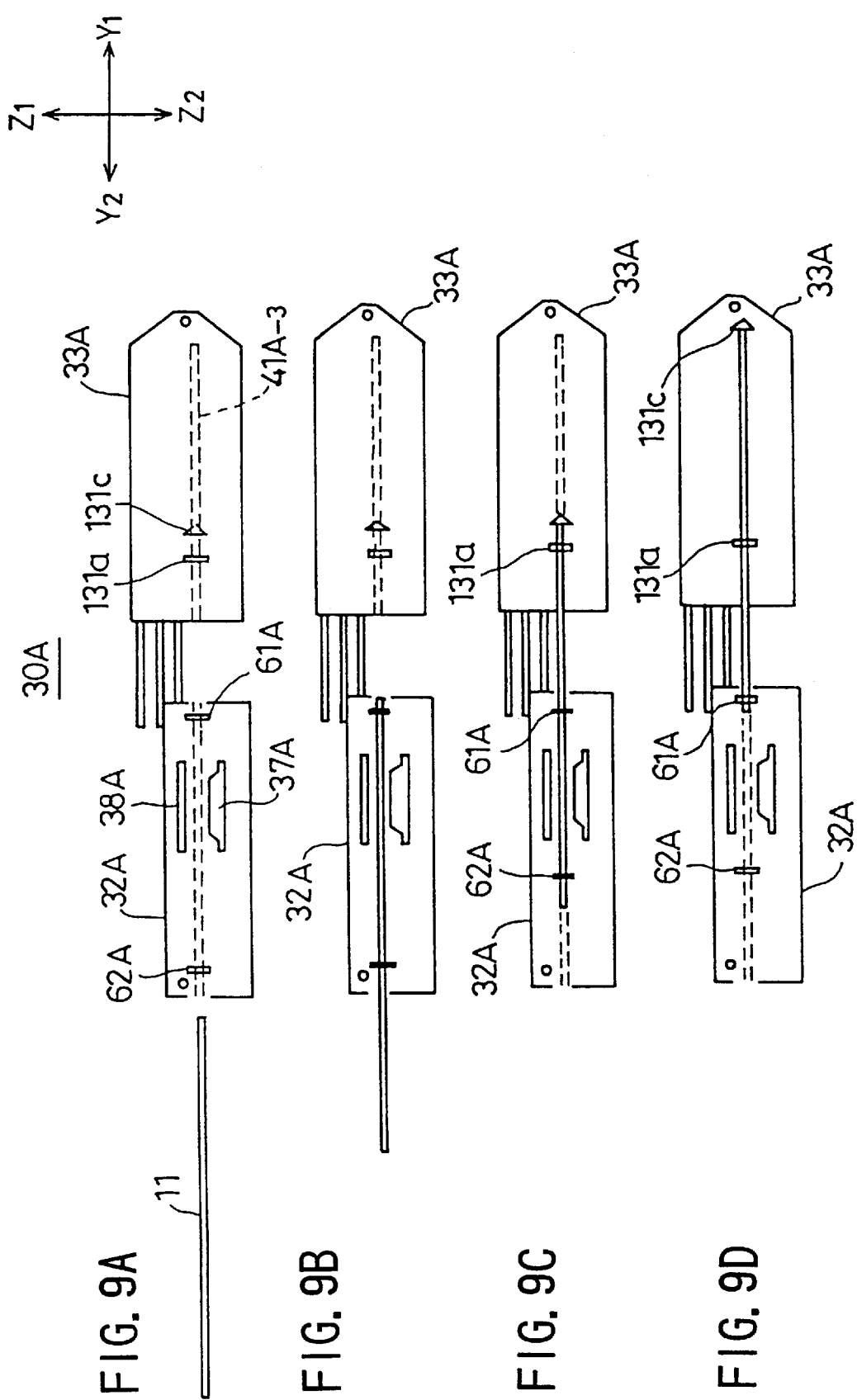

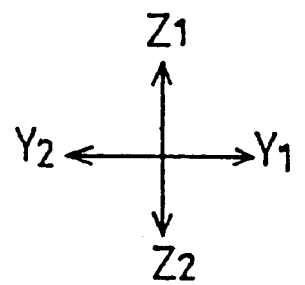
FIG. 10A
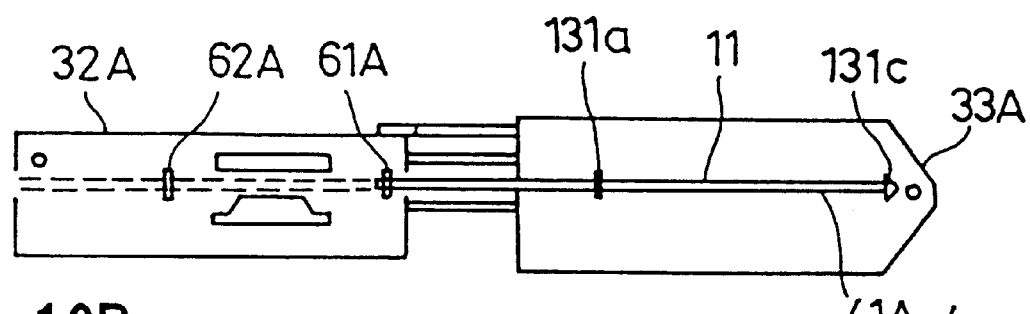
FIG. 10B
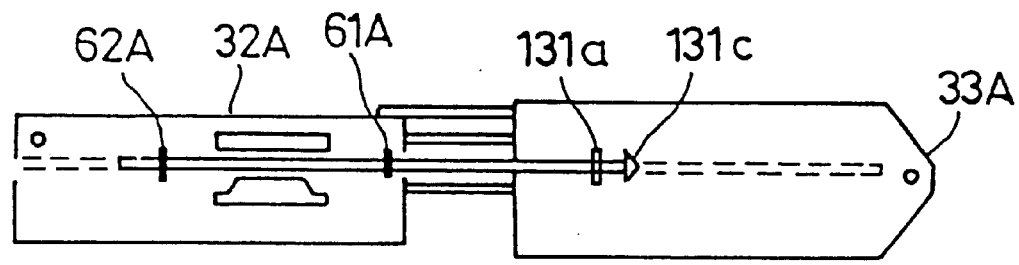
FIG. 10C
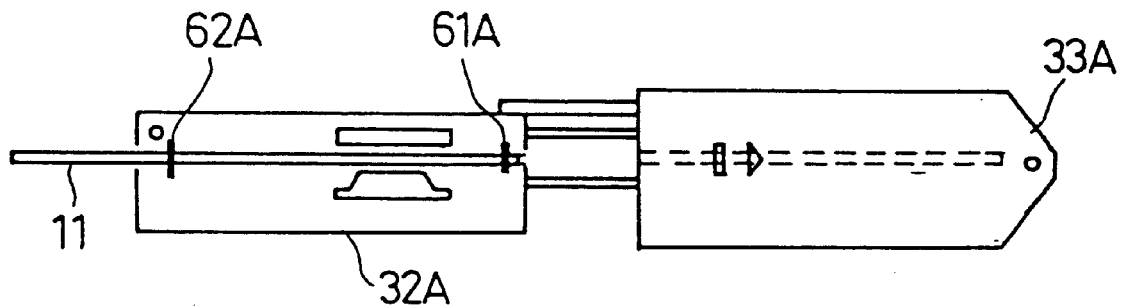

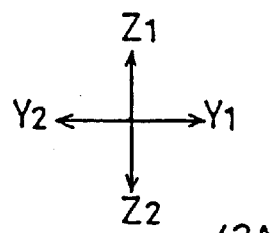

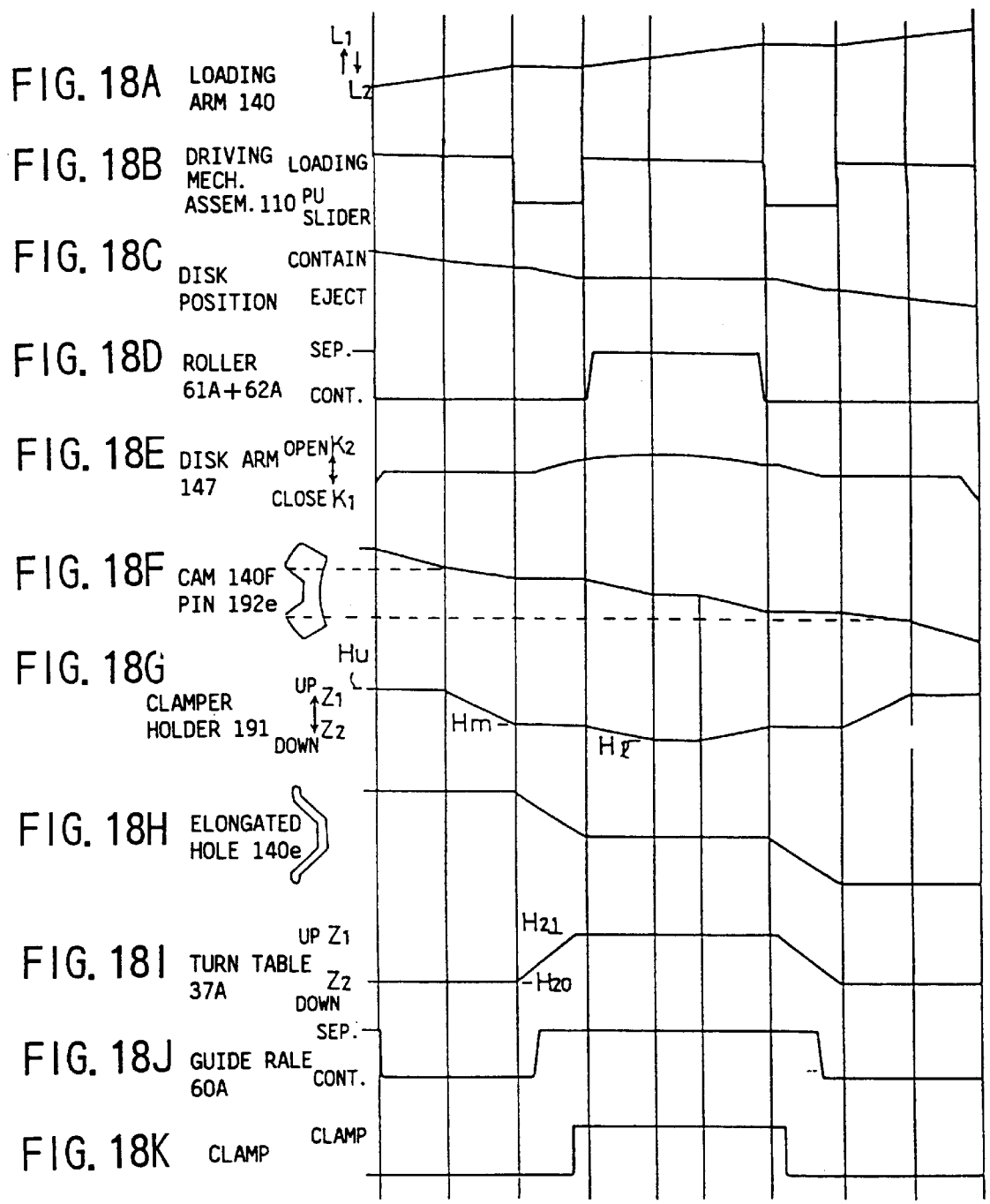

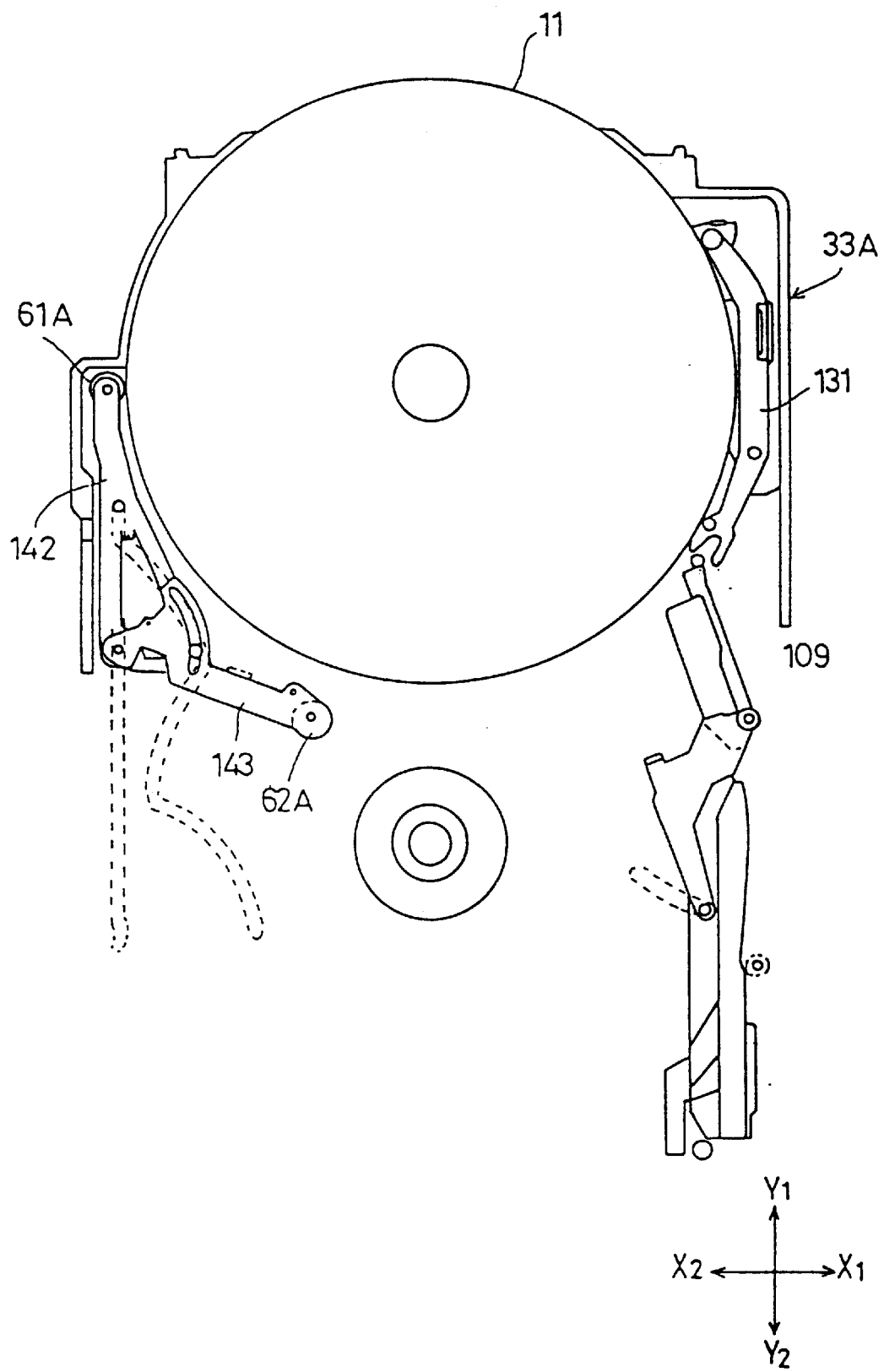

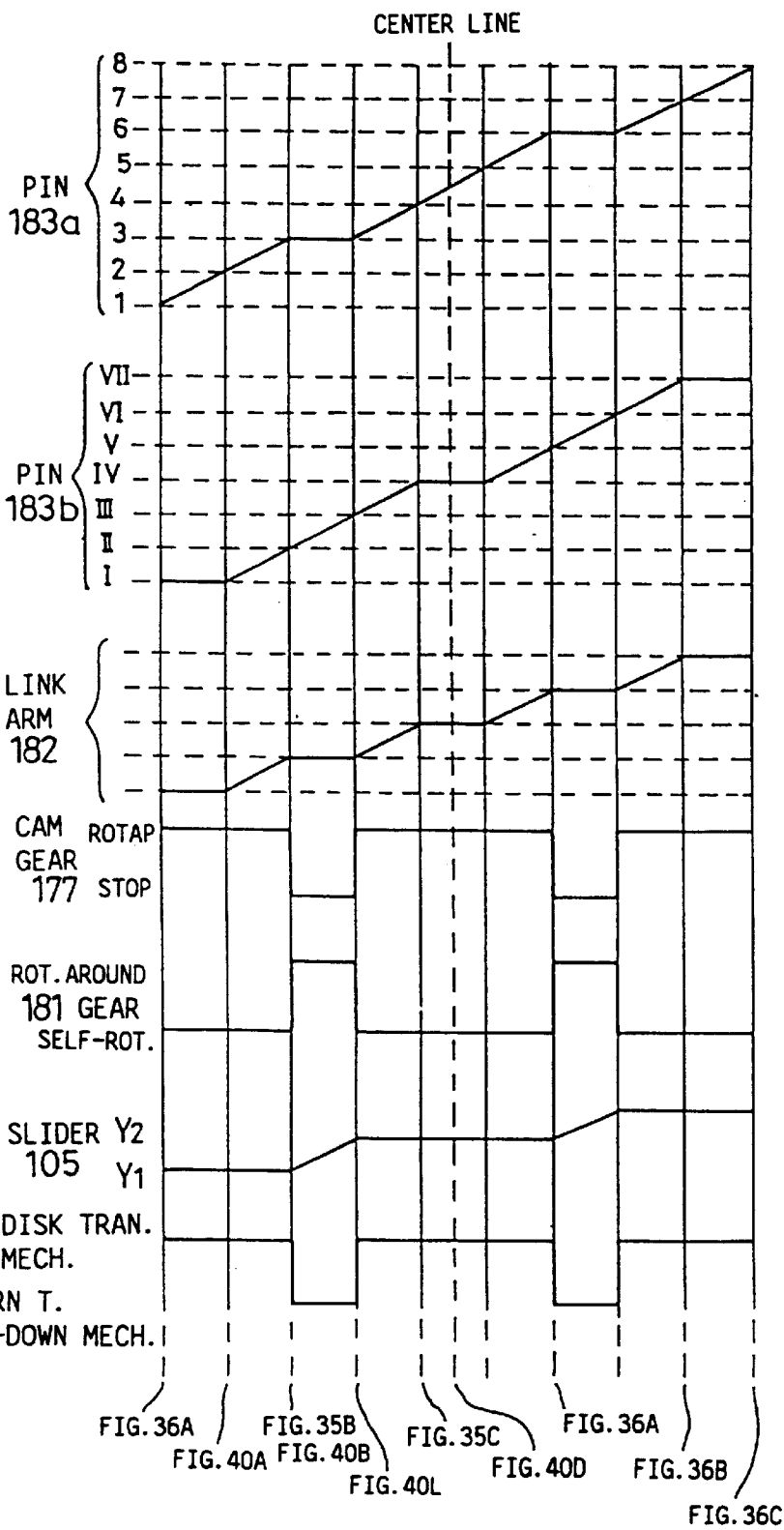

DET.SWITCH 160

DETECTOR 106

SUPPORTING MEMBER FOR A DISC RECORDING MEDIUM REPRODUCING APPARATUS

This application is a divisional of application Ser. No. 09/092,284, filed Jun. 5, 1998, now U.S. Pat. No. 6,219,325.

BACKGROUND OF THE INVENTION

1. Field of the Invention

The present invention generally relates to recording medium reproducing apparatus, and more particularly, to a recording medium reproducing apparatus provided with a computer unit.

2. Description of the Related Art

In a recording medium reproducing apparatus in which a CD-ROM is inserted into an inlet halfway by a user and is taken out by a user after it is ejected halfway from the inlet, it is desirable that the inlet has a structure by which the CD-ROM may be inserted smoothly and easily. It is also desired that the CD-ROM may be firmly supported by the inlet when it is taken out from it.

FIG. 1A is a diagram showing a disk inlet of a conventional CD-ROM reproducing apparatus. As shown in FIG. 1A, the disk inlet of the CD-ROM reproducing apparatus 300 has a structure in which a disk supporting member 302 is attaches to the back of a disk inlet member 301.

The disk inlet member 301 includes a disk inlet 301a and a back surface 301b of a flat shape.

The disk supporting member 302 is made of felt of a sheet type and includes a slit 302a. The slit 302a forms a pair of wing portions 302b and 302c.

The position of the disk supporting member 302 is determined so that the slit 302a is located at the center of the disk inlet 301a. The disk supporting member 302 may be thermally adhered to the back surface 301b of the disk inlet member 301.

When a CD-ROM (hereinafter also referred to as a disk) 11 is inserted, the wing portions 302b and 302c of the disk supporting member 302 are elastically deformed as shown in FIG. 1B by being pushed by the disk 11 (the arrow shown in FIG. 1B indicates the direction in which the disk 11 is inserted). The wing portions 302b and 302c thus deformed support the disk 11 by holding the disk 11 with an elastic returning force thereof.

When the disk 11 is ejected, on the other hand, the wing portions 302b and 302c support the disk 11 by elastically deforming in the direction opposite to the insertion direction of the disk 11 as shown in FIG. 1C (the arrow shown in FIG. 1C indicates the direction in which the disk 11 is ejected).

The part of the wing portions 302b and 302c, respectively, which contacts the back surface 301b of the disk inlet member 301 is thermally adhered to the back surface 301b. Therefore, only the part of the wing portions 302b and 302c which does not contact the back surface 301b may be elastically deformed. That is, the part of the wing portions 302b and 302c corresponding to the disk inlet 301a may be deformed and the length of the part is short.

Accordingly, the angle of the wing portions 302b and 302c when elastically deformed by the insertion of the disk 11 reaches about 90 degrees, and hence the disk 11 is strongly held by the wing portions 302b and 302c. Thus, a relatively large force is required for inserting the disk 11 into the disk inlet 301a and ease of insertion of the disk 11 is not very good.

Also, as mentioned above, it is desirable that the disk 11 is firmly supported by the wing portions 302b and 302c when ejecting the disk 11 since the user (operator) is not holding the disk 11. However, since the wing portions 302b and 302c are originally located in the same plane, it is difficult to support the disk 11 with a sufficient force.

Moreover, the disk supporting member 302 is worn every insertion/ejection operation of the disk 11. Thus, it is necessary to exchange the disk supporting member 302 after a certain time period. However, since the disk supporting member 302 is thermally adhered to the back surface 301b of the disk inlet member 301, it is not possible to exchange only the disk supporting member 302 and it is necessary to change the disk inlet member. Accordingly, extra maintenance cost is necessary for the conventional recording medium reproducing apparatus.

Further, it is not easy to thermally adhere the disk supporting member on the back surface 301b of the disk inlet member 301.

SUMMARY OF THE INVENTION

Accordingly, it is a general object of this invention to provide a recording medium reproducing apparatus in which the above-mentioned problems are eliminated.

Another object of this invention is to provide a recording medium reproducing apparatus in which an insertion/ejection operation of a recording medium may be performed easily and smoothly.

Yet another object of the present invention is to provide a recording medium reproducing apparatus whose disk supporting member may be exchanged and hence cost for maintaining the apparatus may be reduced.

The above objects of the present invention are achieved by a recording medium reproducing apparatus comprising: a recording medium inlet member through which a recording medium is inserted; a recording medium reproducing unit which reproduces the recording medium; and a recording medium supporting member including wing portions which support the recording medium. The wing portions are elastically warped by the recording medium and support the recording medium by an elastically restoring force. Each of the wing portions is provided obliquely in a direction in which the recording medium is inserted in the recording medium reproducing unit.

The recording medium reproducing apparatus may be configured so that: the wing portions are paired and located inside the recording medium inlet member so as to be opposite each other; and the wing portions have tapered portions which can contact a peripheral edge of the recording medium.

The recording medium reproducing apparatus may be configured so that the recording medium supporting member is detachably attached to a back surface of the recording medium inlet member by an attachment member which presses the recording medium supporting member against the back surface of the recording medium inlet member.

The recording medium reproducing apparatus may be configured so that the wing portions have edges which can contact a surface of the recording medium and elastically press the recording medium.

The above objects of the present invention are also achieved by a recording medium reproducing apparatus comprising: a recording medium inlet member through which a recording medium is inserted; a recording medium reproducing unit which reproduces the recording medium; and a recording medium supporting member including wing portions which support the recording medium. The wing portions are elastically warped by the recording medium and support the recording medium by an elastically restoring force. The recording medium inlet member has a disk inlet having a first curved edge so that a center portion of the disk inlet has a width greater than that of edge portions thereof. The wing portions protrude from a second edge of the disk inlet and extend in the disk inlet, the first curved edge being opposite the second edge.

The recording medium reproducing apparatus may be configured so that: each of the wing portions have an extending portion located in the disk inlet; and the extending portion has a length which is gradually increased towards the edges of the disk inlet from the center thereof.

The recording medium reproducing apparatus may be configured so that the wing portions are provided obliquely in a direction in which the recording medium is inserted in the recording medium reproducing unit.

The recording medium reproducing apparatus may be configured so that each of the wing portions has a plate shape.

BRIEF DESCRIPTION OF THE DRAWINGS

FIGS. 6A through 6D are diagrams for explaining operations in which a reproduced disk is returned to the disk accommodating part of the disk accommodating unit;

FIGS. 7A through 7D are diagrams for explaining operations in which a disk inserted in the disk reproducing apparatus is reproduced;

FIGS. 8A through 8D are diagrams for explaining operations in which a disk being reproduced is ejected from the disk reproducing apparatus;

FIGS. 9A through 9D are diagrams for explaining operations in which a disk located externally the disk reproducing apparatus is accommodated in the disk accommodating unit;

FIGS. 10A through 10C are diagrams for explaining operations in which a disk accommodated in the disk accommodating unit is ejected from the disk reproducing apparatus;

FIGS. 18A through 18K are diagrams for explaining an operation of each part of the disk reproducing apparatus;

FIG. 20 is a diagram showing a plan view of the disk transfer mechanism in an initial state without a chassis;

FIGS. 37A through 37G are diagrams for explaining an operational state of the driving mechanism assembly;

EMBODIMENTS

In the following, a principle and embodiments of the present invention will be described with reference to the accompanying drawings.

[Structure of Disk Reproducing Apparatus 30A](refer to FIGS. 2 through 16)

Figure 1A:
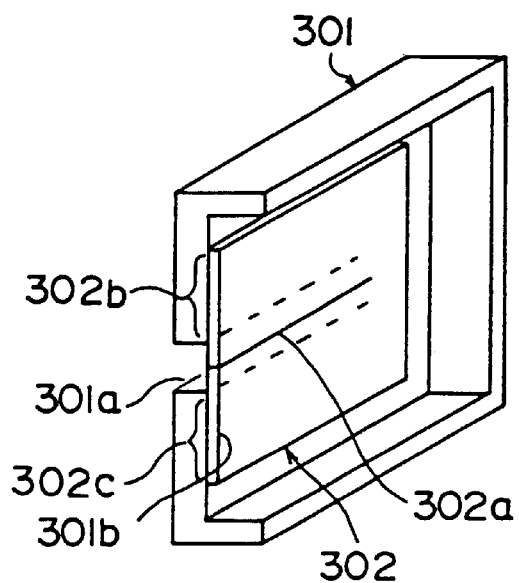
FIG. 1A is a diagram showing a disk inlet of a conventional CD-ROM reproducing apparatus.
Figure 1B:
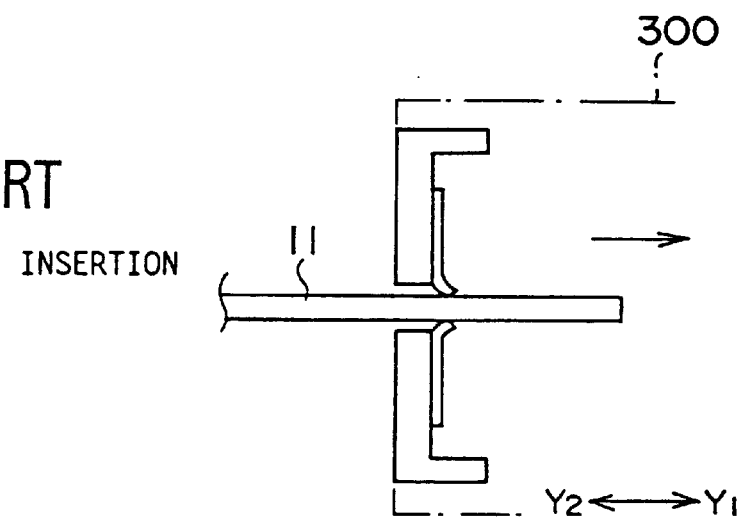
FIG. 1B is a diagram for explaining a disk insertion operation of the conventional CD-ROM reproducing apparatus.
Figure 1C:
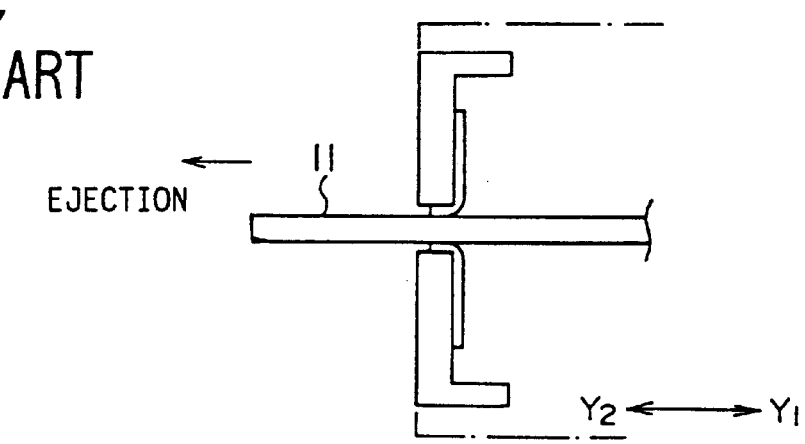
FIG. 1C is a diagram for explaining a disk ejection operation of the conventional CD-ROM reproducing apparatus.
Figure 2:
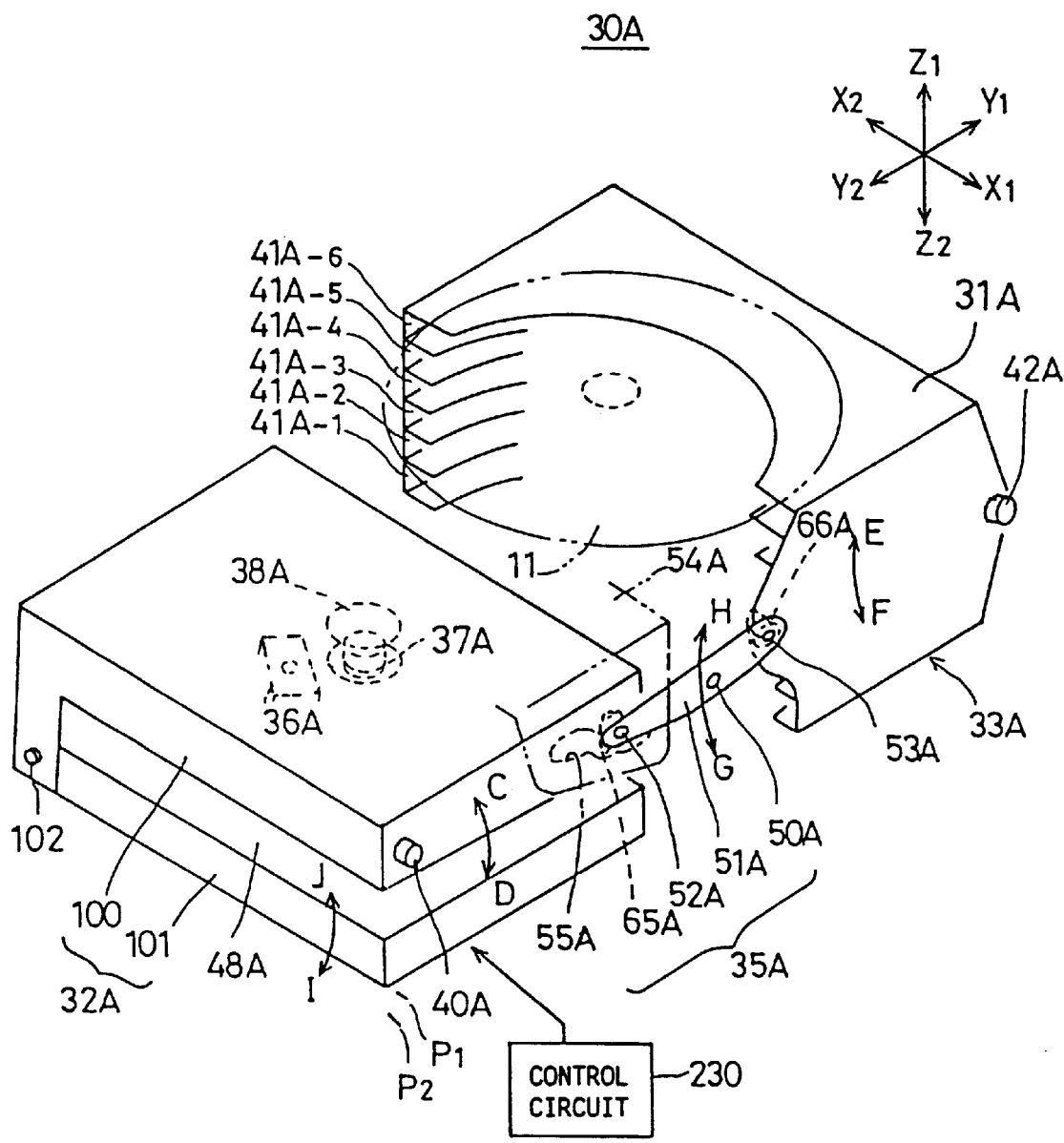
FIG. 2 is a diagram showing a perspective view of a schematic structure of a disk reproducing apparatus according to an embodiment of the present invention.
Figure 52A:
FIG. 52A is a graph showing an operation of a detection switch when a disk is pulled out immediately after the insertion of the disk.
Figure 52B:
FIG. 52B is a graph showing an operation of a detector when a disk is pulled out immediately after the insertion of the disk.
Figure 53:
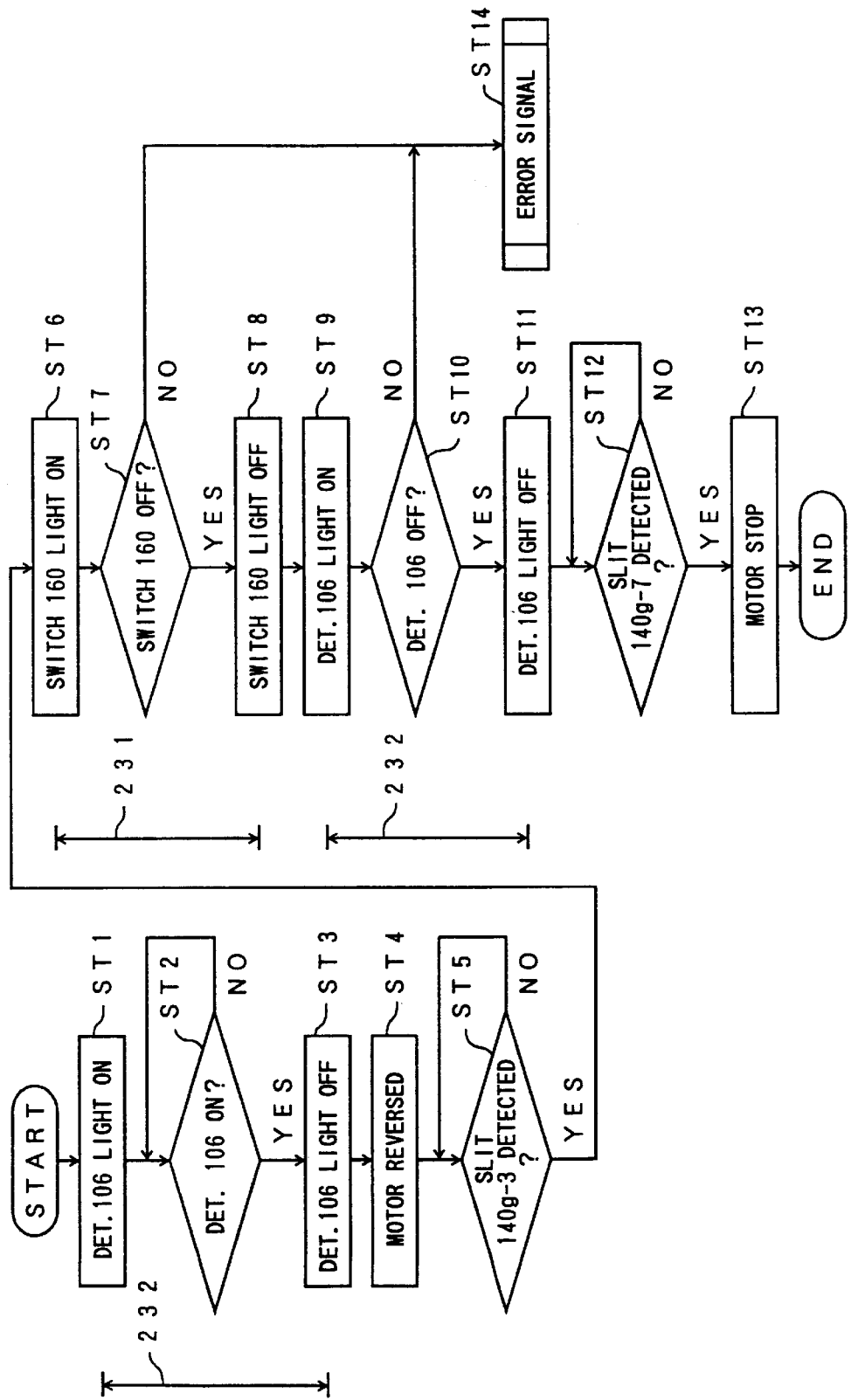
FIG. 53 is a flow-chart for detecting an extraction of a disk immediately after the disk is inserted.

FIGS. 2 through 53 are diagrams for explaining the disk reproducing apparatus 30A according to an embodiment of the present invention. FIGS. 2 through 11 are schematic diagrams showing the disk reproducing apparatus 30A and FIGS. 12 through 53 are diagrams showing the construction parts of the disk reproducing apparatus 30A.

Figure 3A:
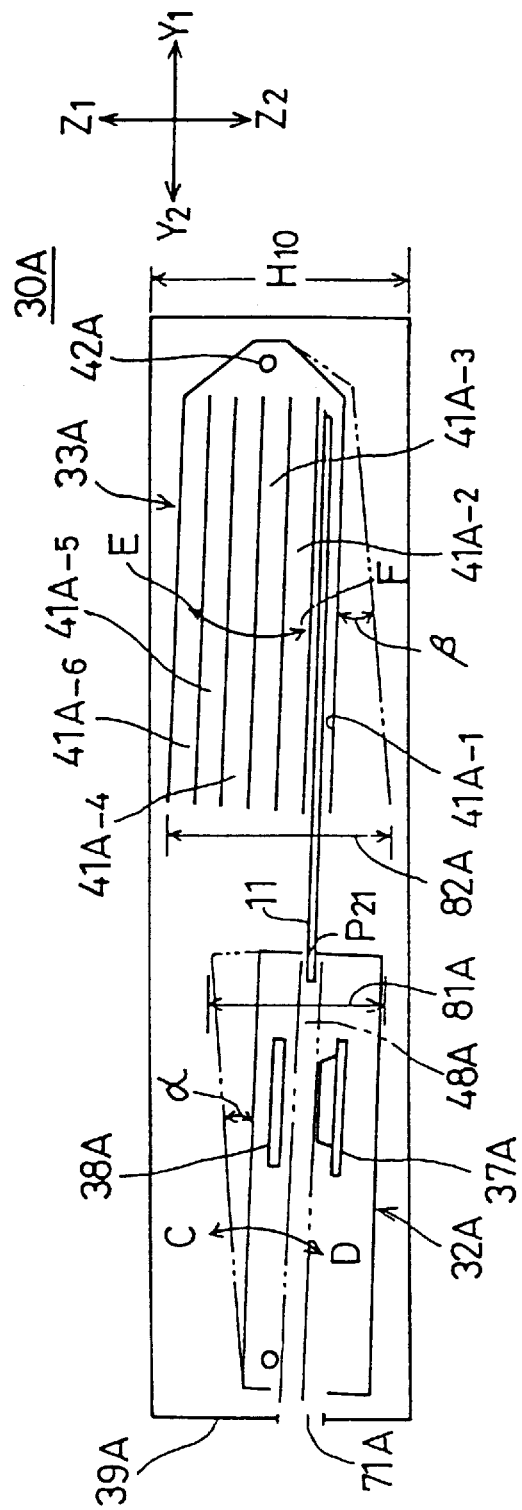
FIGS. 3A and 3B are diagrams for explaining the positional relationship between a disk reproducing unit and a disk accommodating unit of the disk reproducing apparatus.
Figure 3B:
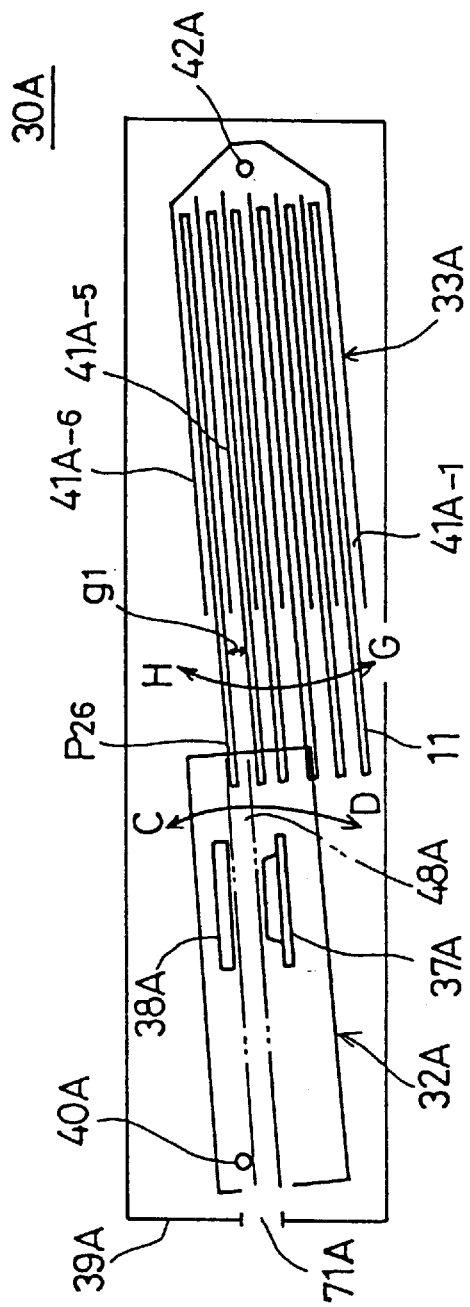
Figure 4:
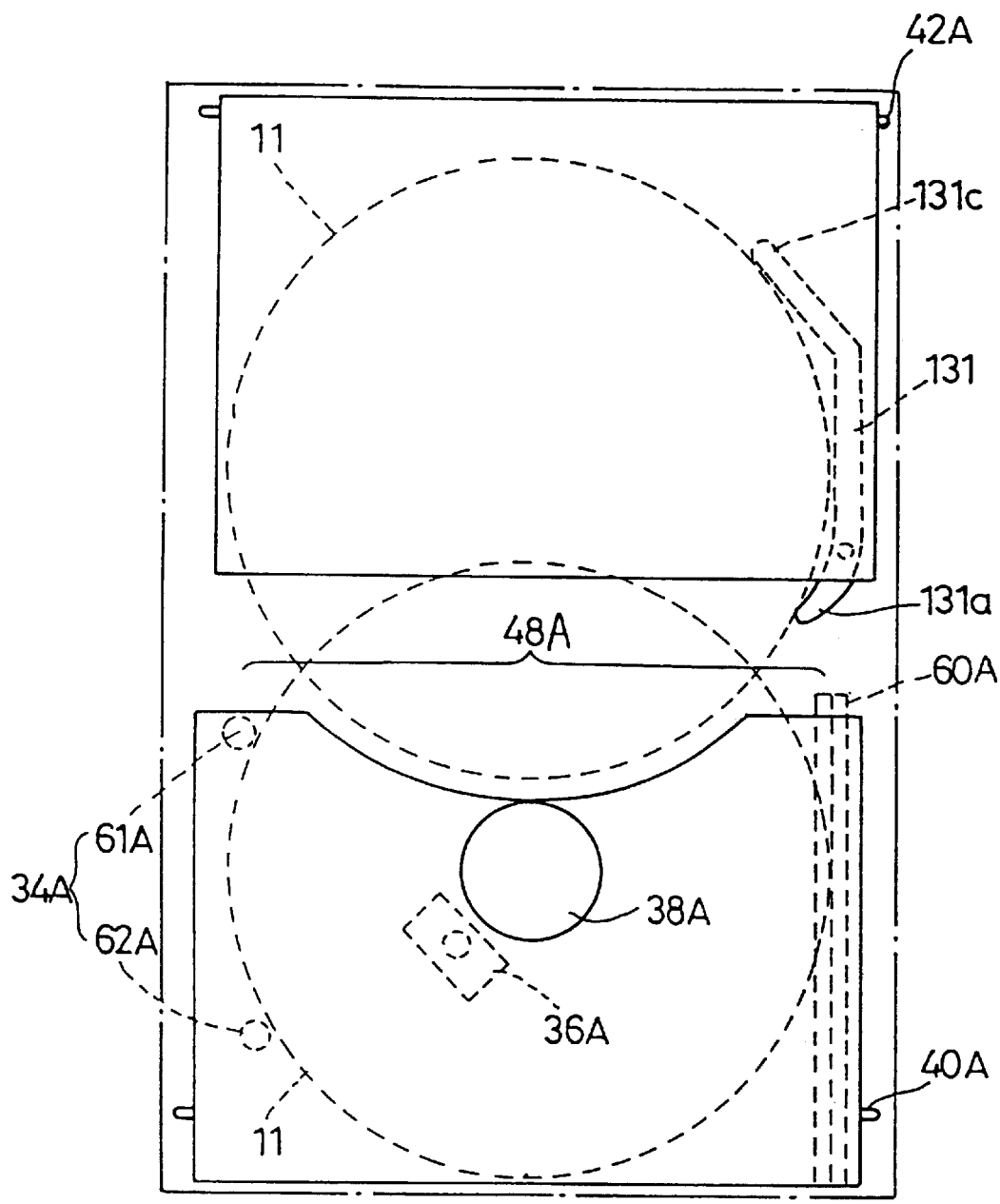
FIG. 4 is a diagram showing a plan view of a schematic structure of the disk reproducing apparatus.

Referring to FIGS. 2 through 4, the disk reproducing apparatus 30A is comprised of an arch-shaped frame 31A, a disk reproducing unit 32A which reproduces a disk 11 (recording medium), a disk accommodating unit 33A which may accommodate a plurality of disks 11, a disk transfer mechanism 34A which transfers the disk 11 between the disk accommodating unit 33A and the disk reproducing unit 32A, and a rotation mechanism 35A which rotates both the disk reproducing unit 32A and the disk accommodating unit 33A.

The term "disk reproducing unit" corresponds to a term "recording medium reproducing unit" used in the claims.

As shown in FIG. 4, the disk reproducing unit 32A and the disk accommodating unit 33A are positioned so that a portion of the disk 11 in the disk reproducing unit 32A and a portion of the disk 11 accommodated in the disk accommodating unit 33A are superimposed when looking down from the top. The reason that the portion of the disk 11 in the disk reproducing unit 32A and the portion of the disk 11 accommodated in the disk accommodating unit 33A may be superimposed is that the disk reproducing unit 32A is not rotated when the disk 11 is located in the disk reproducing unit 32A.

Figure 14:
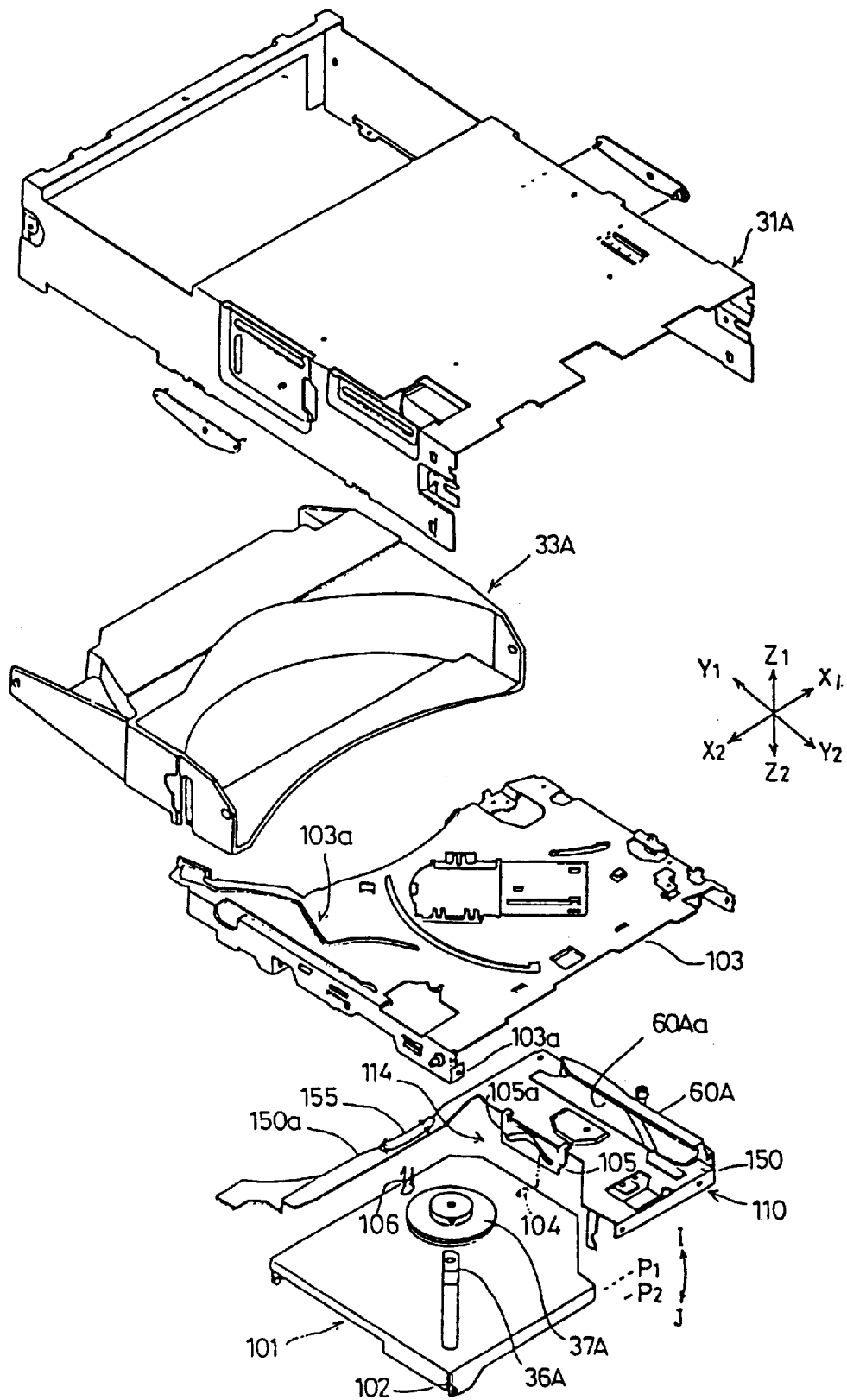
FIG. 14 is a diagram showing an exploded perspective view of the disk reproducing unit and a driving mechanism assembly.

As shown in FIGS. 2 and 14, the disk reproducing unit 32A includes a loading assembly 100 at the upper portion of a disk reproducing unit body 101 and the disk reproducing unit body 101 is supported by the loading assembly 100. A disk transfer path 48A through which the disk 11 is transferred is formed between the loading assembly 100 and the disk reproducing unit body 101.

The disk reproducing unit 32A is rotatably supported by the arch-shaped frame 31A by pins 40A and may be rotated in the C-D directions indicated by an arrow in FIG. 2.

The disk reproducing unit body 101 is supported by a pin 102, which is engaged with a hole 103a of a chassis 103, and a pin 104, which is engaged with a guiding groove 105a of a sliding member 105. When the sliding member 105 is slidably moved in the Y1-Y2 direction, the disk reproducing unit body 101, together with the loading assembly 100, may be moved between a position P1 and a position P2. Also, the disk reproducing unit body 101 may be solely moved in the C-D direction.

The disk reproducing unit body 101 includes a photo-pickup 36A, a turntable 37A and a disk detector 106 which optically detects the disk 11.

Figure 15:
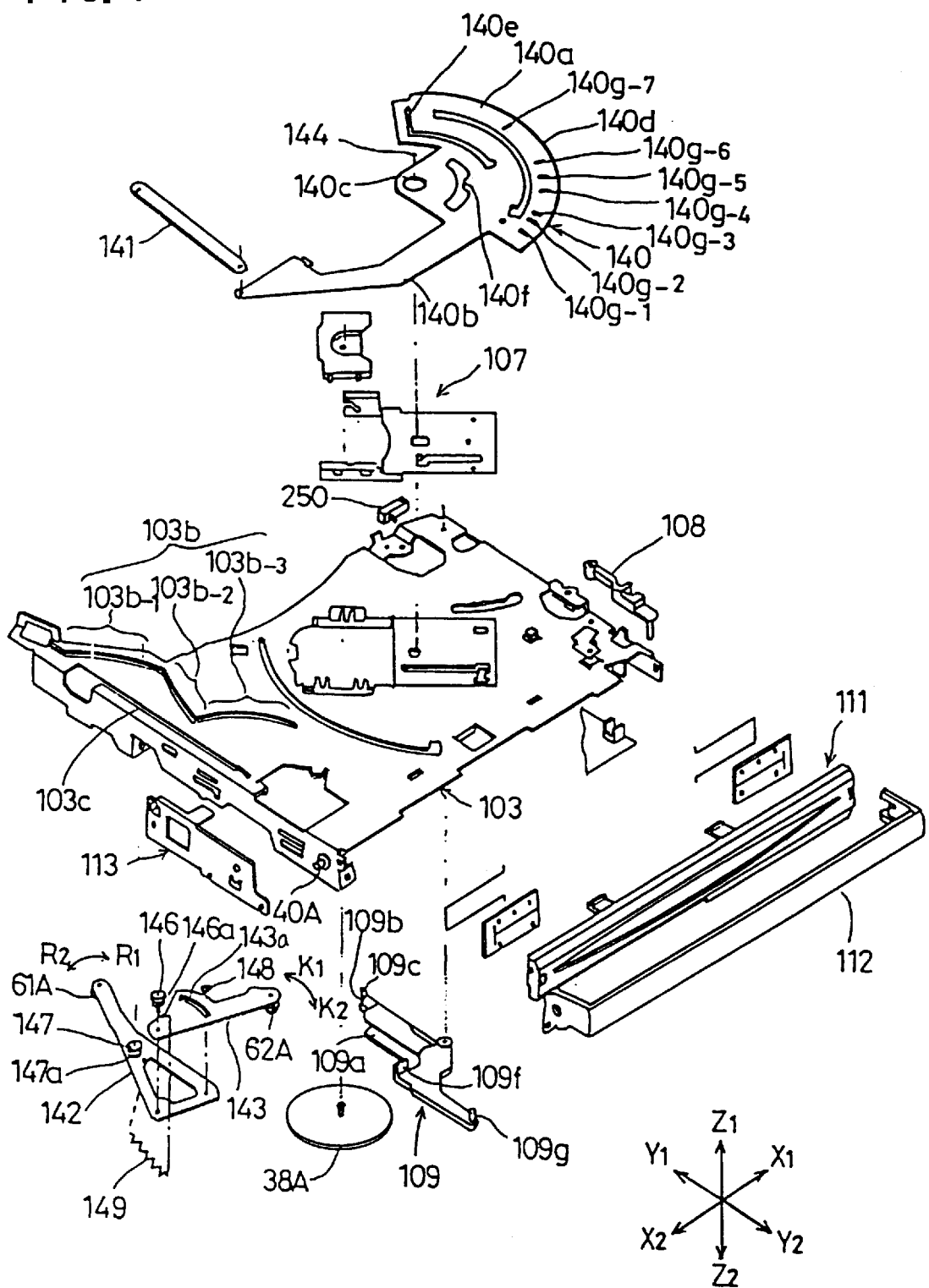
FIG. 15 is a diagram showing an exploded perspective view of a disk transfer mechanism.
Figure 38:
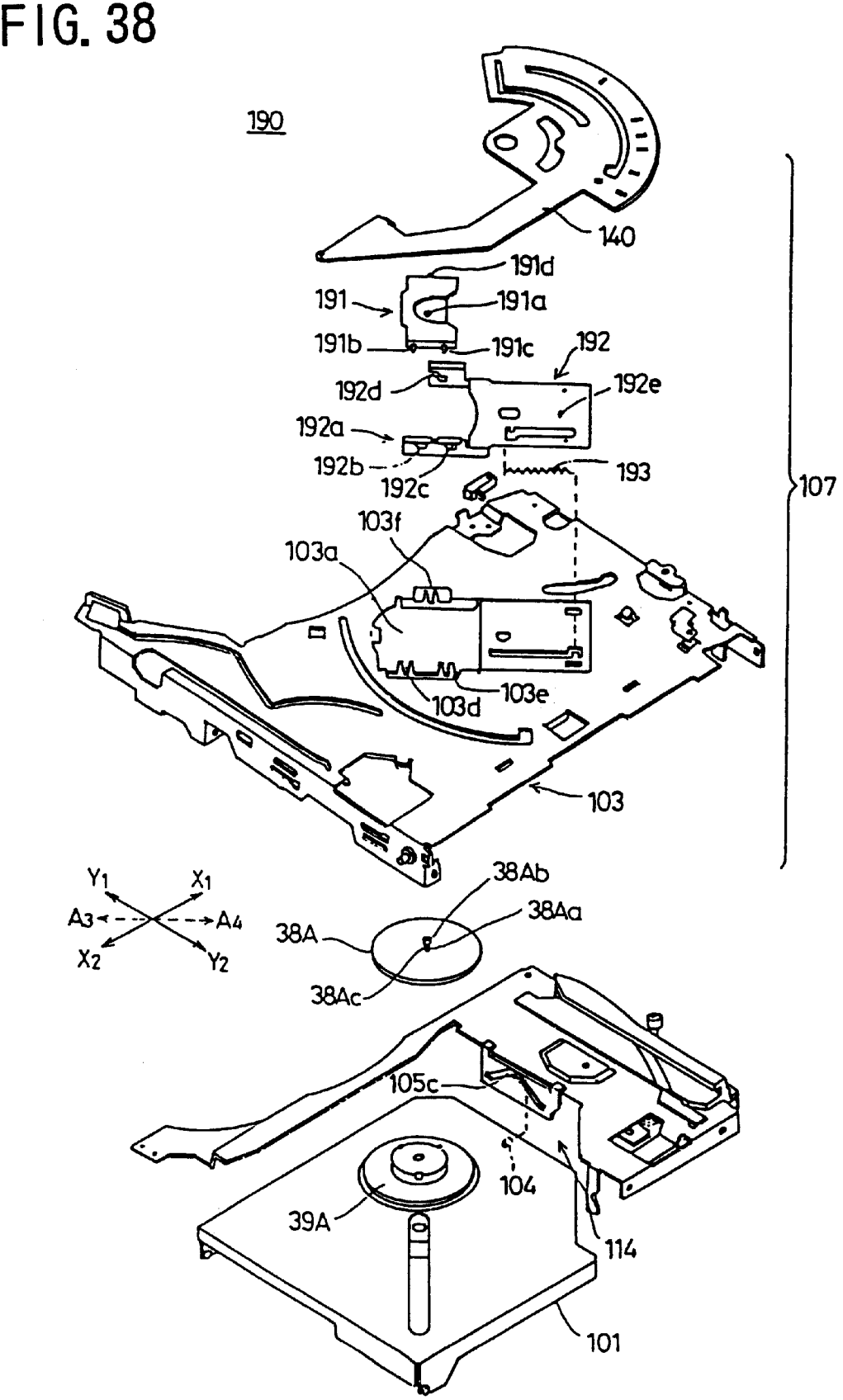
FIG. 38 is a diagram showing an exploded perspective view of a disk clamping mechanism.

The loading assembly 100 includes a clamper 38A, a clamper holder up-and-down mechanism 107, the disk transfer mechanism 34A, an insertion lever 108, an ejection lever 109, a driving mechanism assembly 110, a disk inlet member 111, a flap 112, a flap opening mechanism 113, a turntable up-and-down mechanism 114 and a disk clamp 190, fixed to the chassis 103 as shown in FIGS. 14, 15 and 38.

The clamper holder up-and-down mechanism 107, the disk transfer mechanism 34A, the insertion lever 108, the ejection lever 109, the driving mechanism assembly 110, the disk inlet member 111, the flap 112, the flap opening mechanism 113, and the turntable up-and-down mechanism 114 will be described in detail later.

Figure 33:
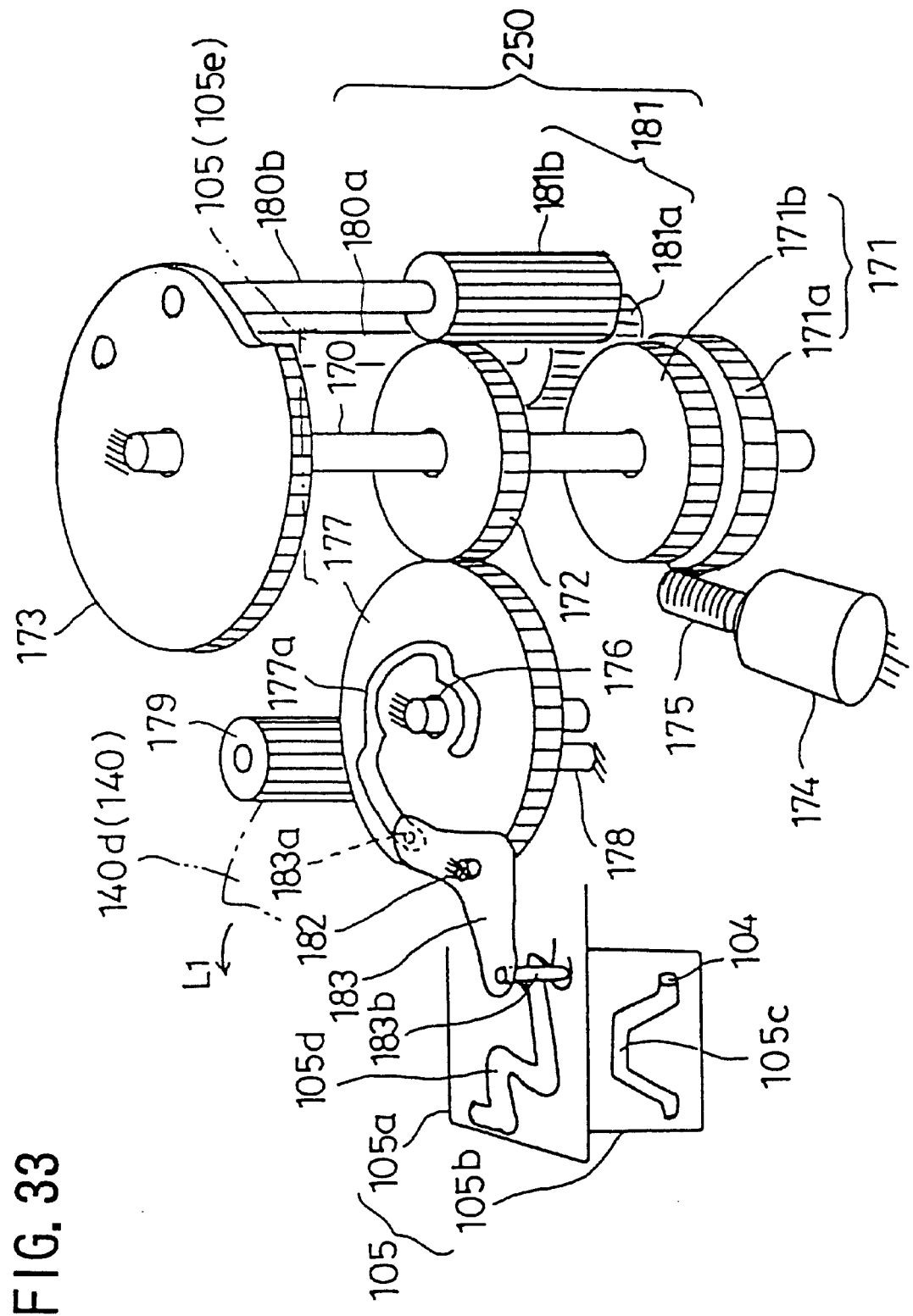
FIG. 33 is a diagram showing a perspective view of the driving mechanism assembly.

The driving mechanism assembly 110 is comprised of a chassis base 150 to which a loading motor 174, a sliding member 105, gears, etc., are fixed as shown in FIG. 33. The driving mechanism assembly 110 is fixed to a lower surface of the chassis 103.

Figure 16:
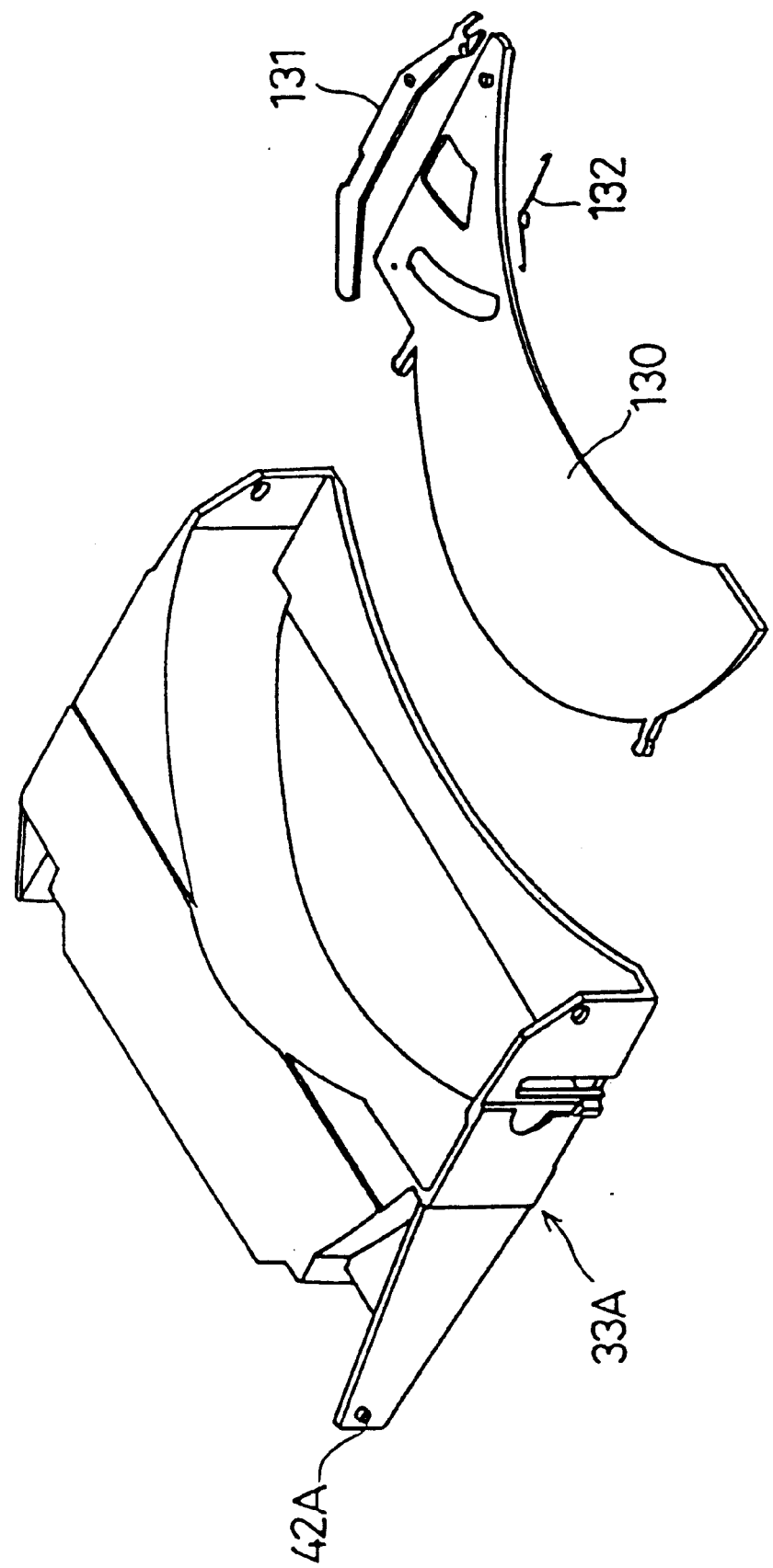
FIG. 16 is a diagram showing an exploded perspective view of a disk accommodating unit.

The disk accommodating unit 33A has a structure in which first to sixth disk accommodating parts 41A-1 to 41A-6, each of which accommodates one disk, are provided as shown in FIGS. 2 and 16. The disk accommodating unit 33A is located in the Y1 direction with respect to the disk reproducing unit 32A. The disk accommodating unit 33A is supported by the frame 31A by pins 42A and it may be rotated in the E-F directions.

As mentioned above, one disk is accommodated in each of the first to sixth disk accommodating parts 41A-1 to 41A-6. Each of the disks 11 is positioned horizontal to each other and a space g1 between the adjacent disks 11 is sufficiently large so that the disks 11 are not worn when transferred.

Each of the first to sixth disk accommodating parts 41A-1 to 41A-6 is separated by a parting plate 130. A stock arm 131 is provided in each of the first to sixth disk accommodating parts 41A-1 to 41A-6. The stock arm 131 has substantially a reversed C-shape and includes a holding portion 131a at the end in the Y2 direction and a pushing portion 131c at the end in the Y1 direction. The stock arm 131 pushes an edge of the disk 11 so as to maintain the disk 11 in the disk accommodating part 41A. The stock arm 131 may function as a pushing member which pushes out a part of the disk 11 from the disk accommodating part. Each of the stock arms 131 may be operated independently.

Figure 11:
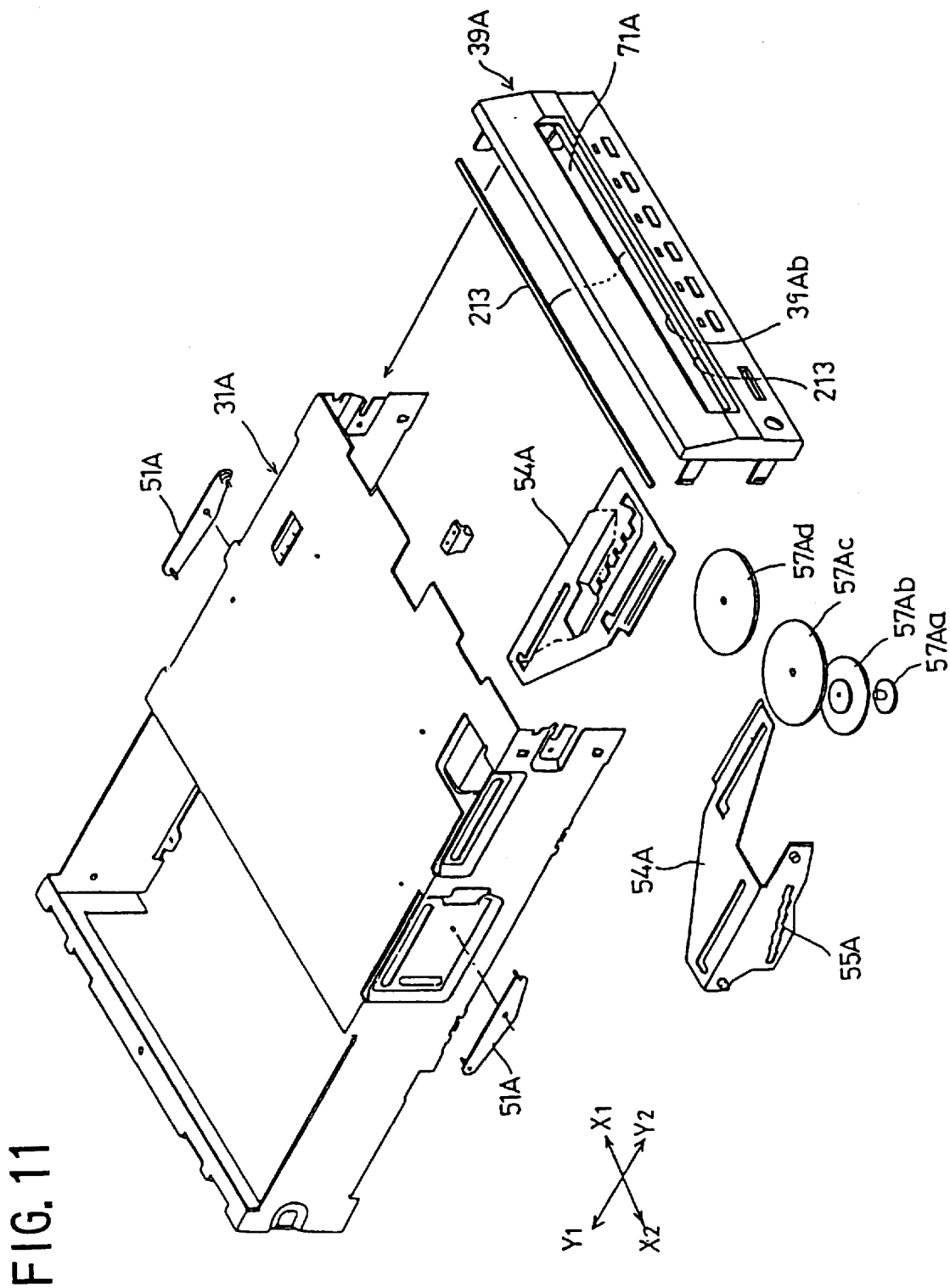
FIG. 11 is a diagram showing an exploded perspective view of a rotation mechanism and a front bezel of the disk reproducing apparatus.
Figure 12A:
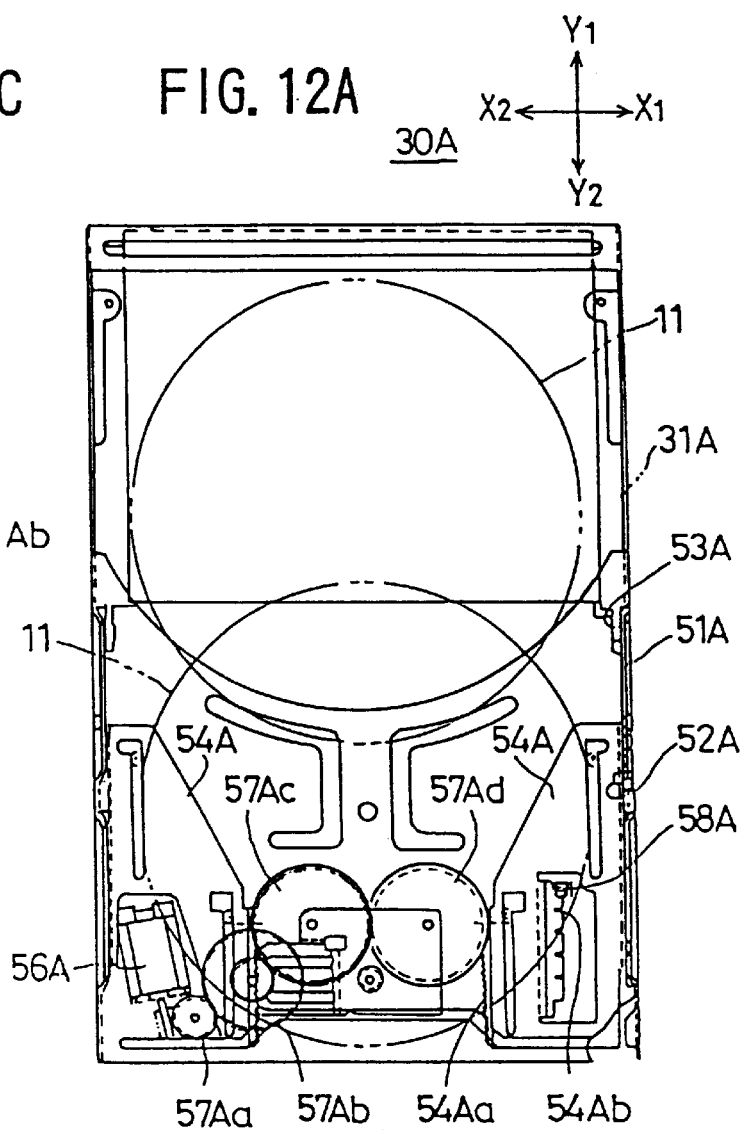
FIGS. 12A through 12C are diagrams for showing the rotation mechanism.
Figure 12C:
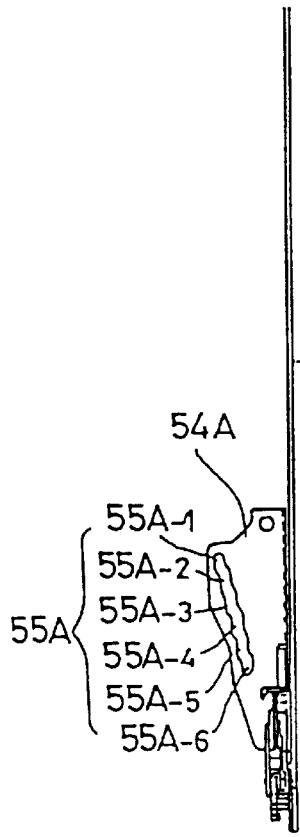
Figure 12B:
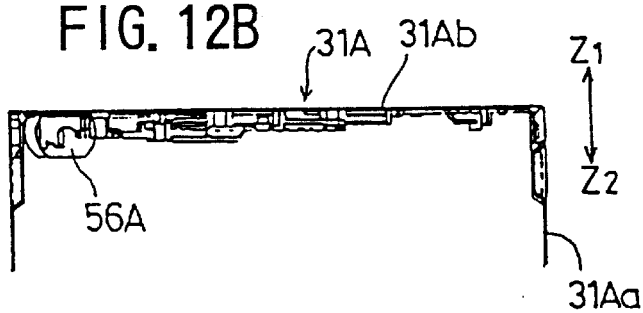
Figure 13:
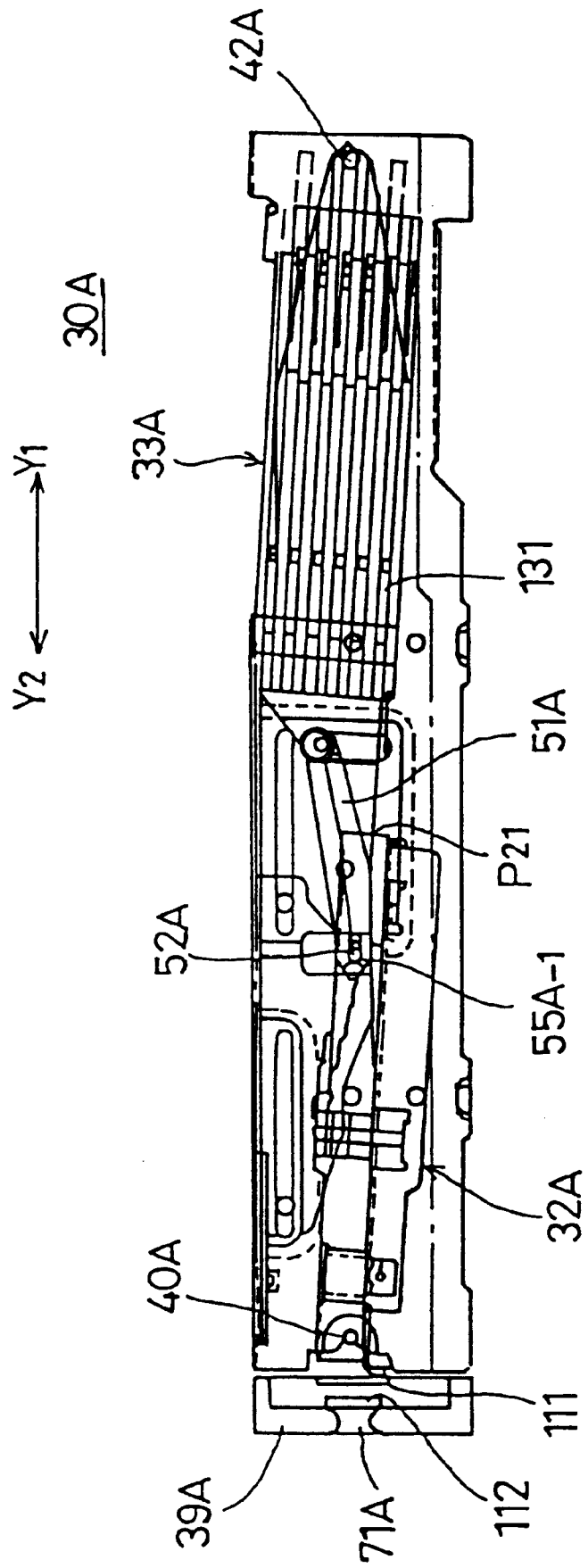
FIG. 13 is a diagram showing a side of the disk reproducing apparatus.

The rotation mechanism 35A, as shown in FIGS. 11, 12 and 13, is provided at the X1 side and the X2 side. As for the X1 side, the rotation mechanism 35A is comprised of an arm 51A rotatably supported by a pin 50A which is fixed to a side plate 31Aa of the frame 31A, a structure in which a pin 52A, which is provided at one end of the arm 51A, is engaged with an elongated hole 65A at the Y1 side of the disk reproducing unit 32A, a structure in which a pin 53A, which is provided at another end of the arm 51A is engaged with an elongated hole 66A at the Y2 side of the disk accommodating unit 33A, a slider 54A movably provided in the Y1-Y2 directions on the lower surface of a top plate 31Ab of the frame 31A, a structure in which a hole 55A of a stair shape is engaged with the pin 52A, a motor 56A and gears 57Aa to 57Ad provided on the lower surface of the top plate 31Ab of the frame 31A, a mechanism comprising a rack 54Aa which is a part of the slider 54A and transfers the slider in the Y1-Y2 directions, and a position detection mechanism comprising a slit portion 54Ab, which is a part of the slider 54A, and a photo-sensor 58A. The hole 55A of the stair shape includes six holes 55A-1 to 55A-6, as shown in FIG. 12C.

As shown in FIGS. 17A through 17E, the hole 55A of the stair shape shifts the pin 52A when the slider 54A is moved in the Y1 direction by the motor 56A and the disk reproducing unit 32A is moved in the C direction. After that the disk accommodating unit 33A is rotated in the F direction via the arm 51A. When the slider 54A is moved in the Y2 direction the hole 55 moves the pin 52 so that the disk reproducing unit 32 is rotated in the D direction and that the disk accommodating unit 33A is rotated in the E direction via the arm 51A.

When the hole 55A-1 is engaged with the pin 52A, the disk reproducing unit 32A is maximally rotated in the D direction and is located at a position P21 as shown in FIGS. 3A and 13. At this moment, the disk accommodating unit 33A is maximally rotated in the E direction. Thus, the disk transfer path 48A is aligned with the first disk accommodating part 41A-1 of the disk accommodating unit 33A.

Figure 17A:
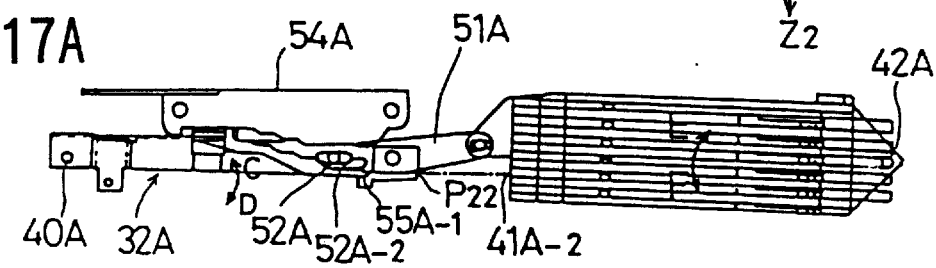
FIGS. 17A through 17E are diagrams for explaining operations of the rotation mechanism.

When the hole 55A-2 is engaged with the pin 52A, the disk reproducing unit 32A is rotated in the C direction and is located at a position P22 as shown in FIG. 17A. The disk accommodating unit 33A is also rotated in the F direction. Thus, the disk transfer path 48A is aligned with the second disk accommodating part 41A-2 of the disk accommodating unit 33A.

Figure 17B:
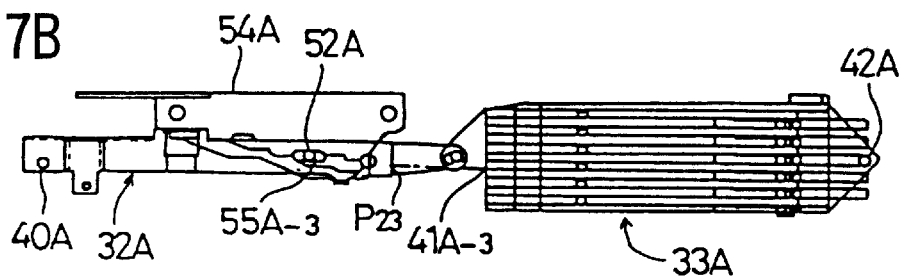

When the hole 55A-3 is engaged with the pin 52A, the disk reproducing unit 32A is further rotated in the C direction and is located at a position P23 as shown in FIG. 17B. The disk accommodating unit 33A is also further rotated in the F direction. Thus, the disk transfer path 48A is aligned with the third disk accommodating part 41A-3 of the disk accommodating unit 33A.

Likewise, the disk transfer path 48A is aligned with the fourth and fifth disk accommodating parts 41A-4 and 41A-5,respectively, when holes 55A-4 and 55A-5 are engaged with the pin 52A.

Figure 17C:
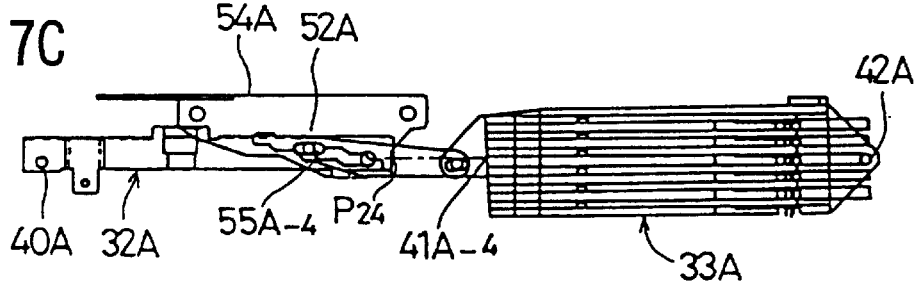
Figure 17D:
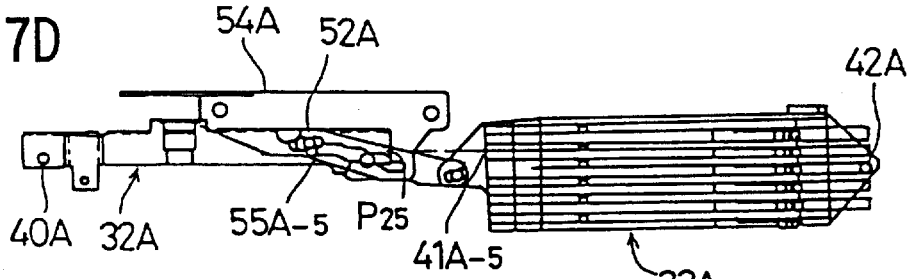
Figure 17E:
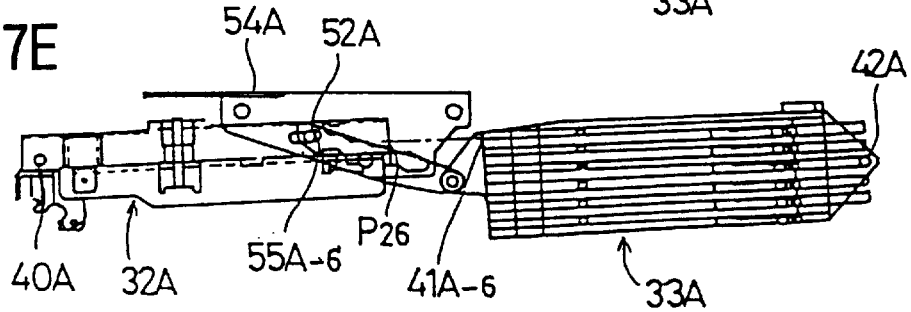

When the hose 55A-6 is engaged with the pin 52A, the disk reproducing unit 32A is maximally rotated in the C direction and is located at a position P25 as shown in FIGS. 3B and 17E. At this moment, the disk accommodating unit 33A is maximally rotated in the F direction. Thus, the disk transfer path 48A is aligned with the sixth disk accommodating part 41A-6 of the disk accommodating unit 33A. Other functions of the disk transfer mechanism 34A will be described later.

As shown in FIGS. 2 and 3, the disk reproducing unit 32A and the disk accommodating unit 33A are positioned so as to be opposed to each other and both the disk reproducing unit 32a and the disk accommodating unit 33A may be inclined by rotation. Since both the disk reproducing unit 23A and the disk accommodating unit 33A may be rotated according to the embodiment of the present invention, the angle α of the rotation of the disk reproducing unit 32A is smaller than the angle which would be required for a disk reproducing unit when a fixed-type disk accommodating unit is employed. In practice, the angle α is in the range of ±3 degrees, and hence a space 81A which is required for a rotation of the disk reproducing unit 32A is relatively small.

Likewise, the angle β which is necessary to be achieved by the rotation of the disk accommodating unit 33A is smaller than the angle which would be required for a disk accommodating unit when a fixed type disk reproducing unit is employed. In practice, the angle β is in the range of ±3 degrees, and hence a space 82A which is required for a rotation of the disk accommodating unit 33A is relatively small. In addition, the space 81a and the space 82A are superimposed in the A direction. Accordingly, the height H10 of the disk reproducing apparatus 30A is relatively low.

Also, since both the disk reproducing unit 32A and the disk accommodating unit 33A are rotated, time required for one of the disk accommodating parts to be aligned with the disk transfer path 48A of the disk reproducing unit 32A will be reduced compared with a disk reproducing apparatus in which only the disk reproducing unit may be moved.

[Operation of Disk Reproducing Apparatus 30A](refer to FIGS. 5 through 10)

Next, the operation of the disk reproducing apparatus 30A having the above-mentioned structure will be described in detail.

As mentioned above, the disk reproducing apparatus 30A may be incorporated in a computer unit. Accordingly, in the normal operation, the disk reproducing apparatus 30A carries out operations in which the disk 11 contained in the disk accommodating part is taken out and reproduced and the reproduced disk 11 is returned to the disk accommodating part according to the instruction generated by the computer.

Also, the disk reproducing apparatus 30A performs an operation in which a predetermined disk 11 is ejected out of the disk reproducing apparatus 30A from a predetermined disk accommodating part of the disk accommodating unit 33A.

(1) Operation in which a disk 11 in the disk accommodating part 41A-5 of the disk accommodating unit 33A is reproduced (refer to FIGS. 5A through 5D)

When a computer orders reproduction of the disk 11 contained in the disk accommodating part 41A5, an operation shown in FIGS. 5A through 5D results. In the figures, if the holding portion 131a, a roller 61A and a roller 62A, respectively, are indicated by black squares, it indicates the corresponding holding portion 131a, roller 61A or roller 62A contacts the periphery of the disk 11. If they are indicated by white squares, it indicates they are not in contact with the disk 11. This rule also applies to other figures.

Figure 5A:
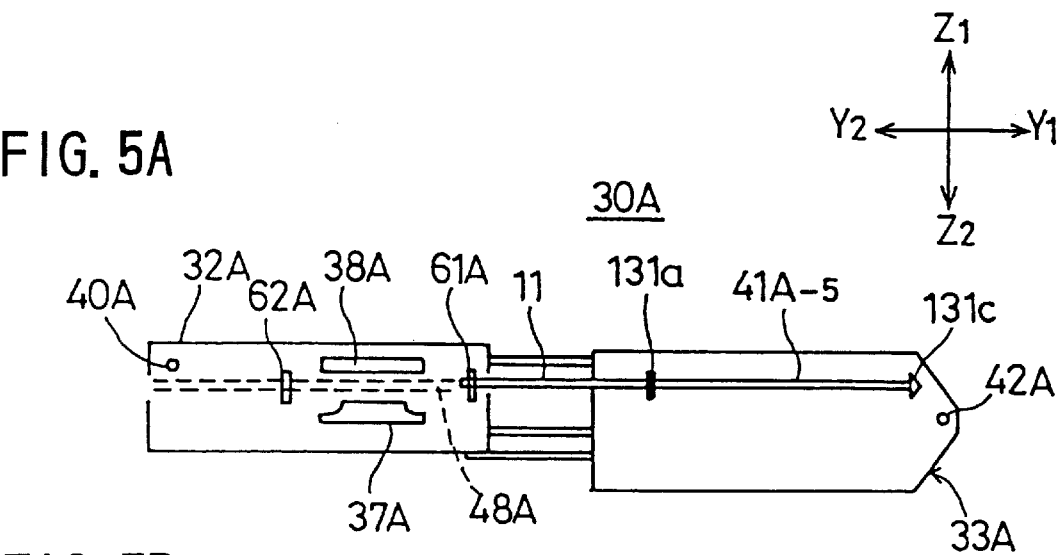
FIGS. 5A through 5D are diagrams for explaining operations in which a disk in a disk accommodating part of the disk accommodating unit is reproduced.

When the rotation mechanism 35A is operated, both the disk reproducing unit 32A and the disk accommodating unit 33A are rotated. As shown in FIGS. 5A and 17D, the disk transfer path 48A of the disk reproducing unit 32A and the fifth disk contacting part 41A-5 are aligned.

Figure 5B:
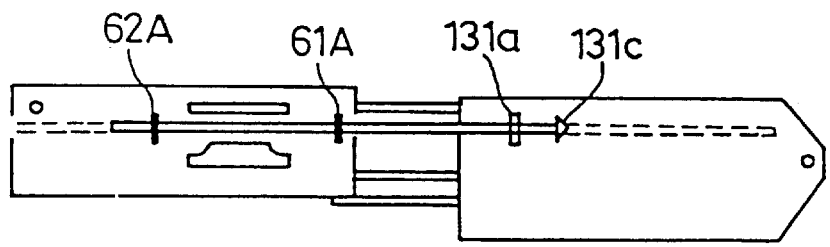

Then, as shown in FIG. 5B, the stock arm 131 of the fifth disk accommodating part 41A-5 is rotated and the holding state of the holding portion 131a is released. Accordingly, the pushing portion 131c starts to push the disk 11 so that a part of the disk 11 is ejected in the Y2 direction.

Figure 5C:
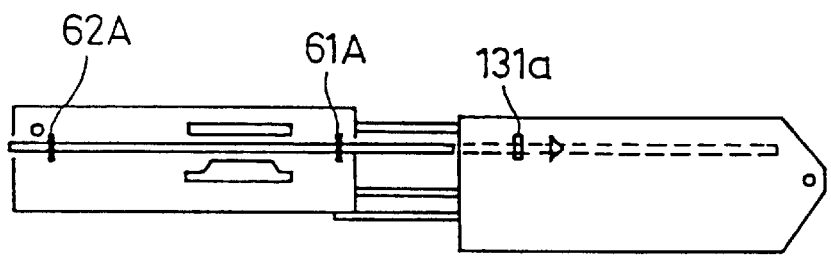

After that the disk transfer mechanism 34A is operated. As shown in FIG. 5C, the rollers 61A and 62A are moved so as to hold the disk 11 ejected from the fifth disk accommodating part 41A-5 and transfer the disk 11 in the Y2 direction to be inside the disk reproducing unit 32A.

Figure 5D:
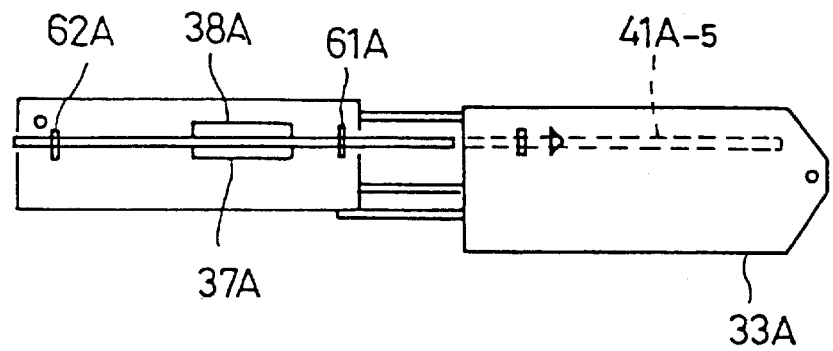

Then, as shown in FIG. 5D, the turntable 37A is moved upwardly so as to connect to the clamper 38A. Thus, the disk 11 is clamped on the turntable 37A. At this moment, the rollers 61A and 62A are separated from the disk 11. After this, the disk 11 is reproduced.

If the disk 11 is located on the disk reproducing unit 32A when the computer appoints the fifth disk accommodating part 41A-5, the operation in which the disk 11 is accommodated in the disk accommodating unit 33A and the disk 11 is ejected outside of the disk reproducing apparatus 30A (to be described later) is firstly carried out. After that the operation in which the disk 11 in the disk accommodating unit 33A is transferred to the disk reproducing unit 32A is performed.

(2) Operation in which a reproduced disk 11 is returned to the disk accommodating part 41A-5 of the disk accommodating unit 33A (refer to FIGS. 6A through 6D)

Suppose that the disk 11 is originally located in a disk accommodating part 41A-2. During and after the reproduction of the disk 11, a position of the disk reproducing unit 32A and that of the disk accommodating unit 33A are in the relationship shown in FIGS. 6A and 17A. That is, the disk transfer path 48A of the disk reproducing unit 32A is aligned with the second disk accommodating part 41A-2.

When an order is given by the computer to reproduce another disk, operations shown in FIGS. 6a through 6D are carried out.

Firstly, as shown in FIG. 6B, the disk transfer mechanism 34A is operated so as to hold the disk 11. Then the turntable 37A is moved downward and the clamper 38A is moved upward so that the clamping of the disk 11 is released.

After that, as shown in FIG. 6C, the disk transfer mechanism 34A transfers the disk 11 in the Y1 direction so that the disk 11 is located in the second disk accommodating part 41A-2.

Finally, as shown in FIG. 6D, the holding portion 131a makes contact with the edge of the disk 11 so as to hold the disk 11.

In normal operation, the disk reproducing apparatus 30A repeats the above-mentioned operation.

In addition, the disk reproducing apparatus 30A may perform the following operation when operated by an operator.

(3) Operation in which a disk 11 inserted in the disk reproducing apparatus 30A is reproduced (refer to FIGS. 7A through 7D)

When an operator orders reproduction of a disk which will be inserted, the following operations will be performed by the disk reproducing apparatus 30A.

The rotation mechanism 35A is operated so as to rotate both the disk reproducing unit 32A and the disk accommodating unit 33A. As shown in FIGS. 17A and 7A, the disk transfer path 48A of the disk reproducing unit 32A is aligned with an empty disk accommodating part, for example, the second disk accommodating part 41A-2. Then, the flap 112 shown in FIG. 15 is rotated so as to open a disk inlet 71A.

After that, the disk 11 is inserted into the inlet 71A by the operator. When the disk 11 is inserted, the disk transfer mechanism 34A transfers the disk 11 in the Y1 direction until the disk 11 is located on the disk reproducing unit 32A as shown in FIG. 7B.

Then, the turntable 37A and the clamper 38A are operated so as to clamp the disk 11 on the turntable 37A as shown in FIG. 7C. Also, the flap 112 is returned to the original state and the disk inlet 71A is closed.

Finally, the rollers 61A and 62A are detached from the disk 11. After this the disk 11 is reproduced.

(4) operation in which a disk 11 being reproduced is ejected from the disk reproducing apparatus 30A (refer to FIGS. 8A through 8D)

When an operator orders ejection of a disk being reproduced from the disk reproducing apparatus 30A, operations shown in FIGS. 8A through 8D will be performed.

As shown in FIG. 8B, the disk transfer mechanism 34A is operated so as to hold the disk 11.

Then, as shown in FIG. 8C, the clamp of the disk 11 is released and a motor (not shown) is actuated so as to rotate the flap 112 shown in FIG. 15 to open the disk inlet 71A.

After that, as shown in FIG. 8D, the disk transfer mechanism 34A transfers the disk 11 in the Y2 direction until the portion of the disk 11 is ejected outside of the disk reproducing apparatus 30A.

Finally, the operator holds the disk 11 and pulls it out from the disk reproducing apparatus 30A.

When the disk 11 is pulled out from the disk reproducing apparatus 30A, the flap 112 is returned to the original position and the disk inlet 71A is closed.

Note that the flap 112 is not closed until the operator pulls out the disk 11. That is, when an order to close the flap 112 is input, a disk detection switch 160 (refer to FIG. 29, to be described later) is turned on for a predetermined period when the order to close the flap 112 is input, and if the disk detection switch 160 is not turned on (i.e., the disk 11 is present), it is manipulated so that the order to closed the flap 112 is not executed. Therefore, a problem such as the flap 112 hitting the disk 11 will not occur.

(5) Operation in which a disk 11 located externally to the disk reproducing apparatus 30A is contained in the disk accommodating unit 33 (refer to FIGS. 9A through 9D)

When an operator orders locating the disk 11 inside the disk accommodating unit and choosing, for example, the third disk accommodating part 41A-3, operations shown in FIGS. 9A through 9D will be performed.

The rotation mechanism 35A is actuated and both the disk reproducing unit 32A and the disk accommodating unit 33A are rotated so that the disk transfer path 48A of the disk reproducing unit 32A and the third disk accommodating part 41A-3 are aligned as shown in FIGS. 17B and 9A. Then, the flap 112 shown in FIG. 15 is rotated so as to open the disk inlet 71A.

After that the operator inserts the disk 11 into the disk inlet 71A. When the disk 11 is inserted, the disk transfer mechanism 34A retains the disk 11 as shown in FIG. 9B.

Then, as shown in FIG. 9C, the disk transfer mechanism 34A transfers the disk 11 in the Y1 direction. The disk transfer mechanism 34A transfers the disk 11 towards the third disk accommodating part 41A-3 of the disk accommodating unit 33A via the disk transfer path 48A of the disk reproducing unit 32A. Also, the flap 112 is returned to the original state and the disk inlet 71A is closed.

Finally, as shown in FIG. 9D, the holding portion 131a pushes the periphery of the disk 11 so that the disk 11 is accommodated in the third disk accommodating part 41A-3. At that time, the disk transfer mechanism 34A is detached from the disk 11.

(6) Operation in which a disk 11 contained in the disk accommodating unit 33A is ejected from the disk reproducing apparatus 30A (refer to FIGS. 10A through 10C)

When an operator orders ejection of a disk from, for example, the fourth disk accommodating part 41A-4, operations shown in FIGS. 10A through 10C will be performed.

The rotation mechanism 35A is actuated and both the disk reproducing unit 32A and the disk accommodating unit 33A are rotated so that the disk transfer path 48A of the disk reproducing unit 32A and the fourth disk accommodating part 41A-4 are aligned as shown in FIGS. 17C and 10A.

Then, as shown in FIG. 10B, the retention of the disk 11 by the holding portion 131a is released and the pushing portion 131c gradually pushes the disk 11 in the Y2 direction from the disk accommodating part 41A-4. At that time, the disk transfer mechanism 34A supports the disk 11.

The disk transfer mechanism 34A transfers the disk 11 in the Y2 direction as shown in FIG. 10C until a part of the disk 11 is located outside of the disk reproducing apparatus 30A.

After this, the operator pulls out the disk 11 from the disk reproducing apparatus 30A.

As explained above, the disk reproducing apparatus 30A has the following characteristics (1)–(3).

(1) The size in the height direction is small (H10). This is due to the following three reasons (A)–(C):

(A) As shown in FIG. 3, the disk reproducing unit 32A and the disk accommodating unit 33A are opposed to each other and both of them may rotate. Accordingly, the angle α achieved by the rotation of the disk reproducing unit 32A is smaller than the angle achieved by the rotation of a disk reproducing unit when a fixed-type disk accommodating unit is used. Thus, the space 81A necessary for the rotation of the disk reproducing unit 32A is relatively small. The angle α is about 6 degrees.

(B) The angle β achieved by the rotation of the disk accommodating unit 33A is smaller than the angle achieved by the rotation of a disk accommodating unit when a fixed-type disk reproducing unit is used. Thus, the space 82A necessary for the rotation of the disk accommodating unit 33A is relatively small. The angle β is about 6 degrees.

(C) The space 81A necessary for the rotation of the disk reproducing unit 32A and the space 82A required for the rotation of the disk accommodating unit are superimposed in the Z direction.

(2) The interval g1 between the adjacent disks 11 contained in each of the disk accommodating parts 41A-1 to 41A-6 of the disk accommodating unit 33A is not reduced because each of the disk accommodating parts 41A-1 to 41A-6 is provided in parallel with respect to each other.

(3) Time required for the completion of an operation may be reduced. This is because both of the disk reproducing unit 32A and the disk accommodating unit 33A may be rotated and time necessary to align the disk transfer path 48A of the disk reproducing unit 32A with one of the disk accommodating parts may be shortened compared with a conventional apparatus.

Next, a construction of each part of the disk reproducing apparatus 30A will be explained.

[Structure and Operation of Disk Transfer Mechanism 34A] (refer to FIGS. 15 and 19 through 30)

The disk transfer mechanism 34A is mainly provided with the chassis 103 of the loading assembly 100 and it is comprised of a loading arm 140, a link arm 141, a first disk arm 142, a second disk arm 143 and a guide rail member 60A.

The loading arm 140 is comprised of a quarter-circle portion 140a and an arm portion 140b extending from the quarter-circle portion 140a. The loading arm 140 is rotatably supported by a shaft 144 on the chassis 103, which is engaged with a hole 140c of the quarter-circle portion 140a.

The quarter-circle portion 140a is comprised of a rack 140d, a cam elongated hole 140e which moves the ejection lever 109, a cam 140f which operates the clamper holder up-and-down mechanism 107, and seven slits 140g-1 to 140g-7. The operation of the disk transfer mechanism 34A is detected by the combination of the slits 140g-1 to 140g-7 and a photo-sensor 145 on the chassis 103. The rack 140d is engaged with a gear 179 which will be described later.

Figures 40A, 40B, 40C, 40D:
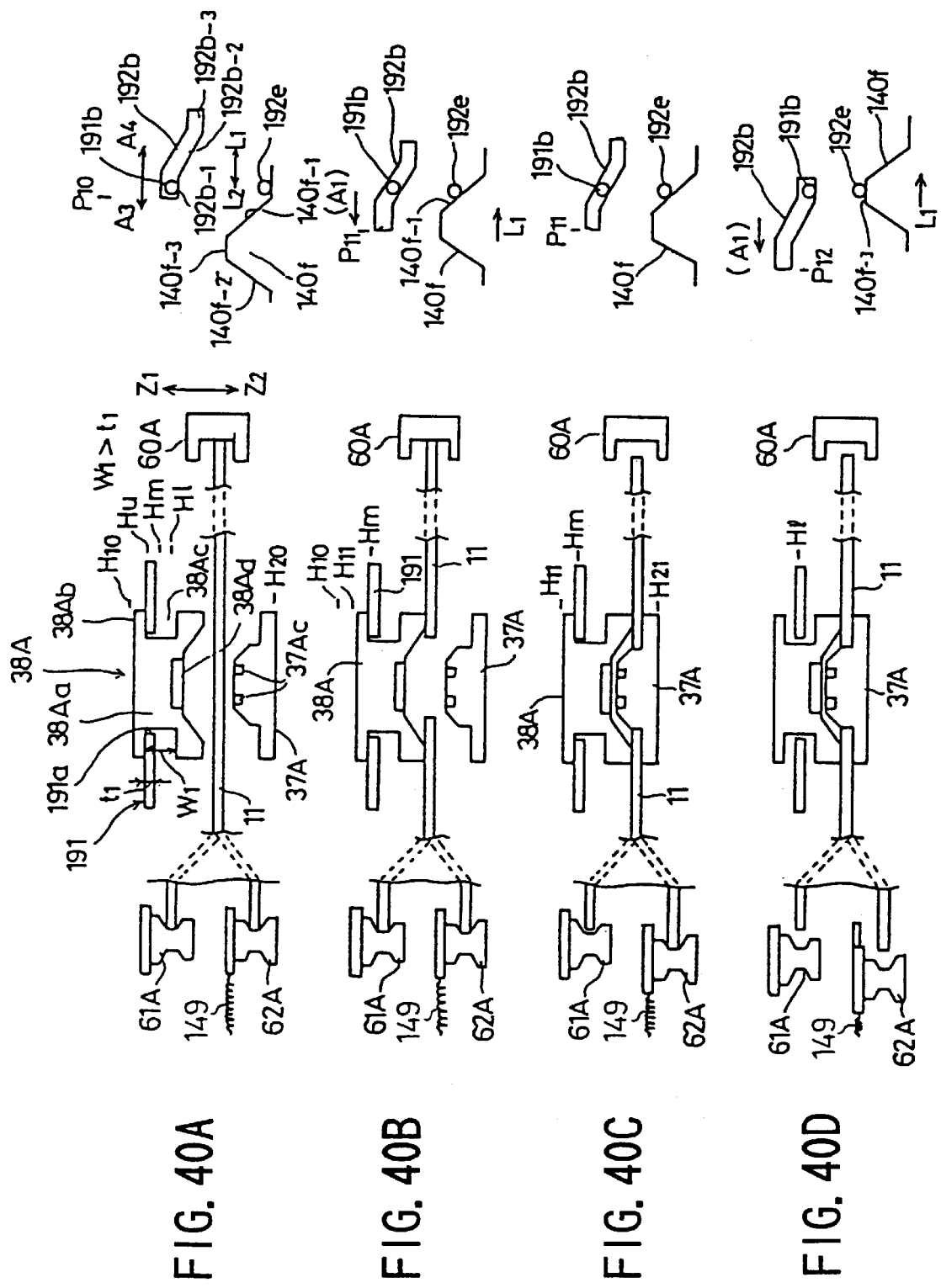
FIGS. 40A through 40D are diagrams for explaining a disk clamping operation by the disk clamping mechanism.
Figures 42A, 42B, 42C:
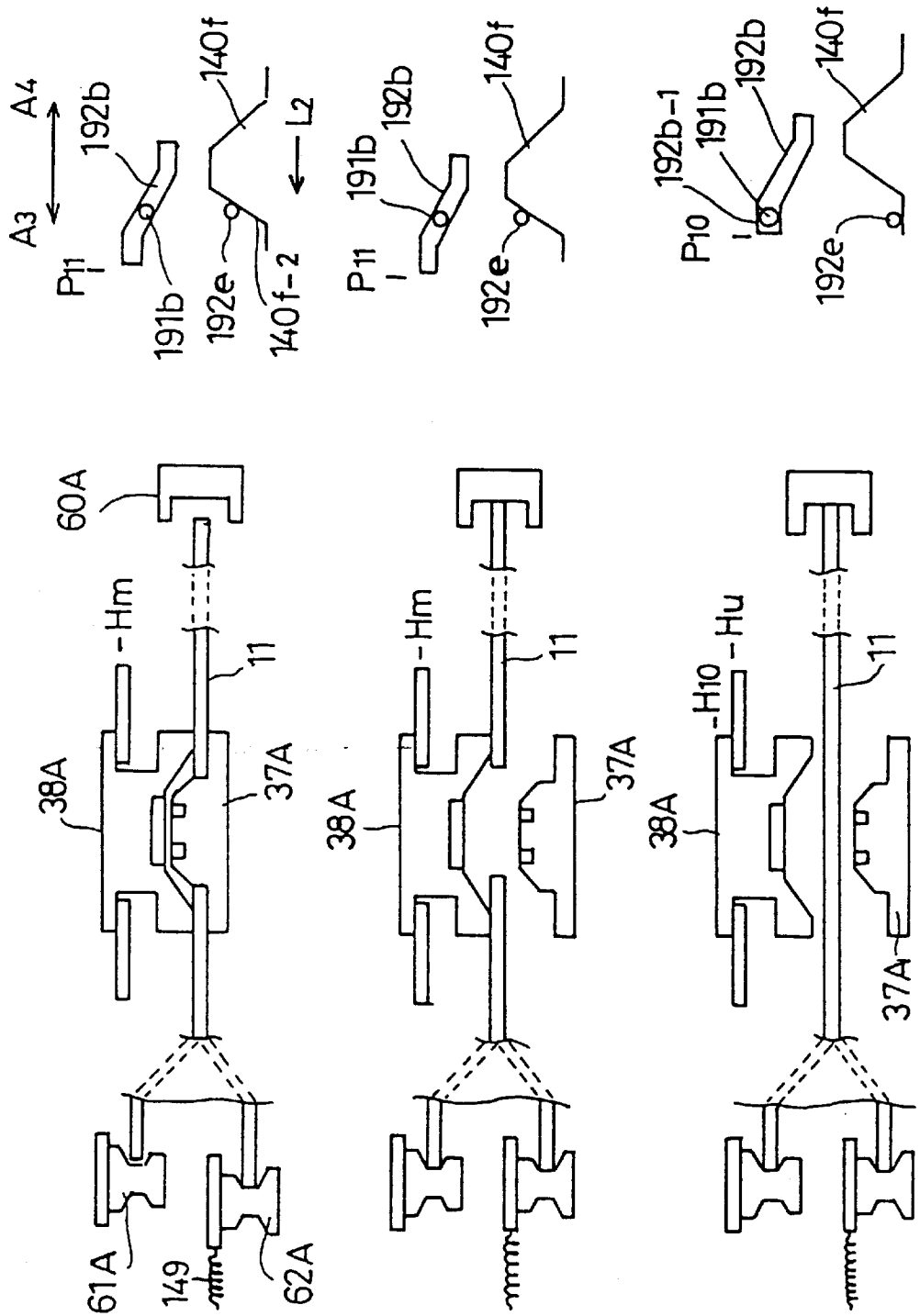
FIGS. 42A through 42C are diagrams for explaining a disk clamping releasing operation of the disk clamping mechanism.

The slit 140g-7 is provided in order to detect the initial state of the disk transfer mechanism 34A. The slit 140g-6, as shown in FIG. 40B, is provided in order to detect the state in which the slope portion 140f-1 of the cam 140f pushes a pin portion 192e. The slit 140g-5, as shown in FIG. 40D, is provided in order to detect the state in which the top portion 140f-3 of the cam 140f pushes the pin portion 192e (when a disk is being reproduced or a disk is temporarily clamped). The slit 140g-4, as shown in FIG. 42A, is provided in order to detect the state in which a slope portion 140f-2 of the cam 140f pushes the pin portion 192e. The slit 140g-3, as shown in FIG. 42C, is provided in order to detect the state in which the cam 140f passed the pin portion 192e. The slit 140g-2, as shown in FIG. 30B is provided in order to detect the position of a disk insertion waiting state. Finally, The slit 140g-1 is provided in order to detect the state in which the disk transfer mechanism 34A is moved to the final position shown in FIGS. 27 and 28.

A curved elongated-guiding-hole 103b extending in the Y1 and Y2 directions and a straight elongated-guiding-hole 103c extending in the Y1 and Y2 directions are formed at the X2 end of the chassis 103. The curved elongated-guiding-hole 103b is comprised of a first elongated-guiding-hole 103b-1, a second elongated-guiding-hole 103b-2 and a third elongated-guiding-hole 103b-3. Looking from the Y1 end, the first elongated-guiding-hole 103b-1 extends in the direction between X1 and Y2, the second elongated-guiding-hole 103b-2 extends in the direction between X2 and Y2 and the third elongated-guiding-hole 103b-3 extends in the direction between X1 and Y2. The elongated-guiding-hole 103b-1, 103b-2 and 103b-3 are operated so as to rotate the first disk arm 142.

A pin 146 is fused to the base portion of the first disk arm 142 at the Y2 side. The second disk arm 143 may be rotated with respect to the first disk arm 142 by the pin 146. The pin 146 includes a groove 146a of an annular shape at the upper periphery thereof. The roller 62A of an I-shape is rotatably formed with the lower surface at the Y1 end of the first disk arm 142. A pin 147 having an annular groove 147a is fixed to the upper surface of the center of the first disk arm 142.

The second disk arm 143 may be rotated in the K1 and K2 directions within the range of a hole 143a since a pin which is fixed to the first disk arm 142 is engaged with the hole 143a. The second disk arm 143 is pulled in the K1 direction by a spring 149 which is placed between the first disk arm 142 and the second disk arm 143.

The first disk arm 142 and the second disk arm 143 are provided at the lower surface of the chassis 103 in a state in which the groove 146a of the pin 146 is movably engaged with the straight elongated-guiding-hole 103c and the groove 147a of the pin 147 is movably engaged with the curved elongated-guiding-hole 103b.

The link arm 141 connects an end of the arm portion 140b of the loading arm 140 to the pin 147. When the loading arm 140 is rotated, the first disk arm 142 is moved in the Y1, Y2 directions with a rotation since the pin 146 is guided by the straight elongated-guiding-hole 103c and the pin 147 is guided by the curved elongated-guiding-hole 103b. The second disk arm 143 is also moved with the first disk arm 142. Further, the rollers 61A and 62A move along the X2 direction end of the disk transfer path 48A.

The guiding rail member 60A is fixed on the upper surface of the chassis base 150 of the driving mechanism assembly 110. The driving mechanism assembly 110 is fixed to the lower surface of the chassis 103 of the loading assembly 100 and the guiding rail member 60A is provided so as to extend in the Y1 and Y2 directions along the X1 direction end of the disk transfer path 48A. The guiding rail member 60A includes a guiding groove 60Aa inside thereof.

The above-mentioned ejection lever 109 also includes a guiding groove 109a inside thereof.

Moreover, an initial state detection switch 250 is provided on the chassis 103. The initial state detection switch 250 is turned on by a raising wall portion 109f of the ejection lever 109 when the ejection lever 109 is rotated in the M1 direction.

Next, the operation of the disk transfer mechanism 34A will be explained.

FIGS. 18A through 18K are diagrams for showing the operation of the parts which form the disk transfer mechanism 34A.

Figure 19:
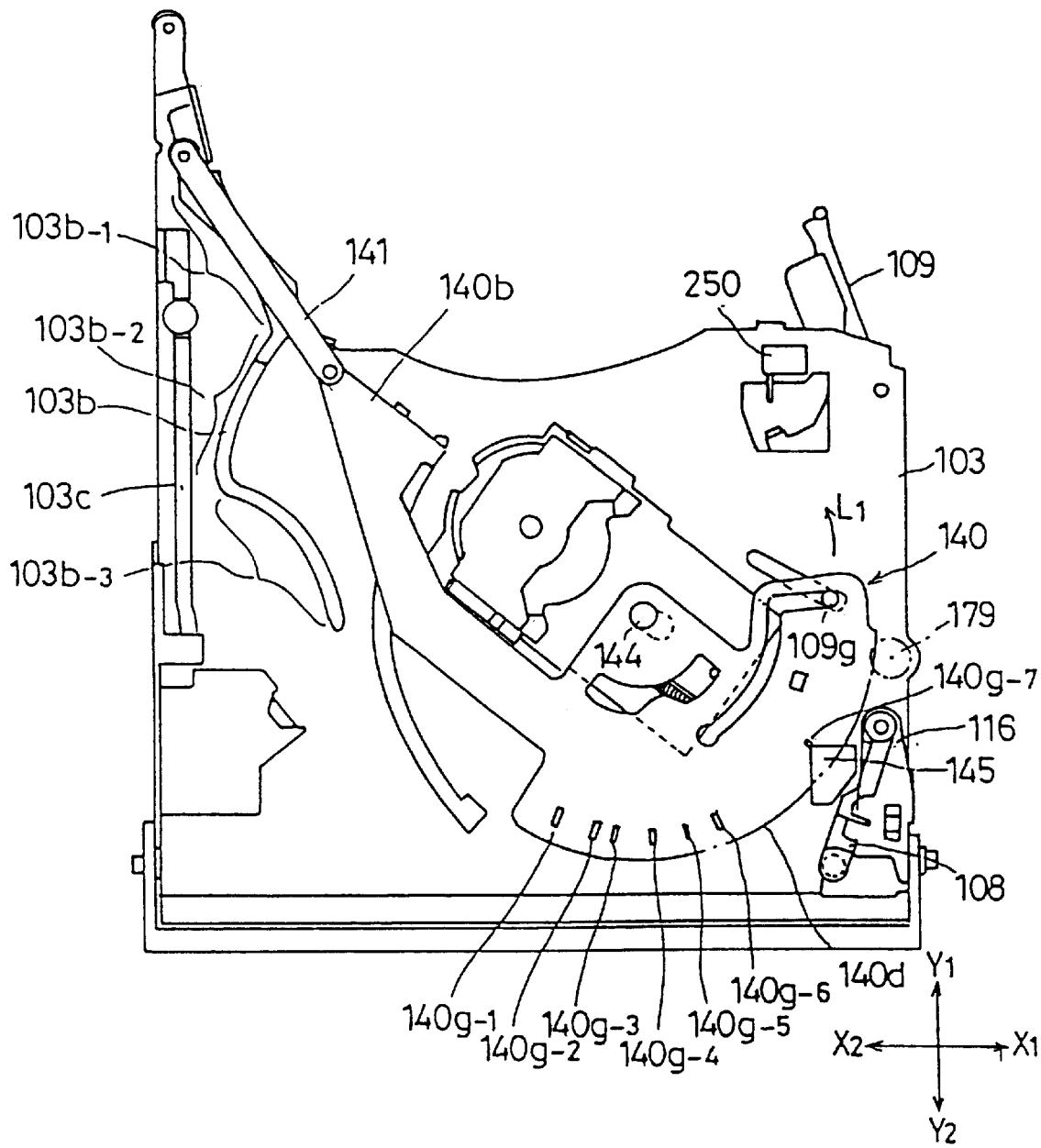
FIG. 19 is a diagram showing a plan view of the disk transfer mechanism in an initial state.
Figure 27:
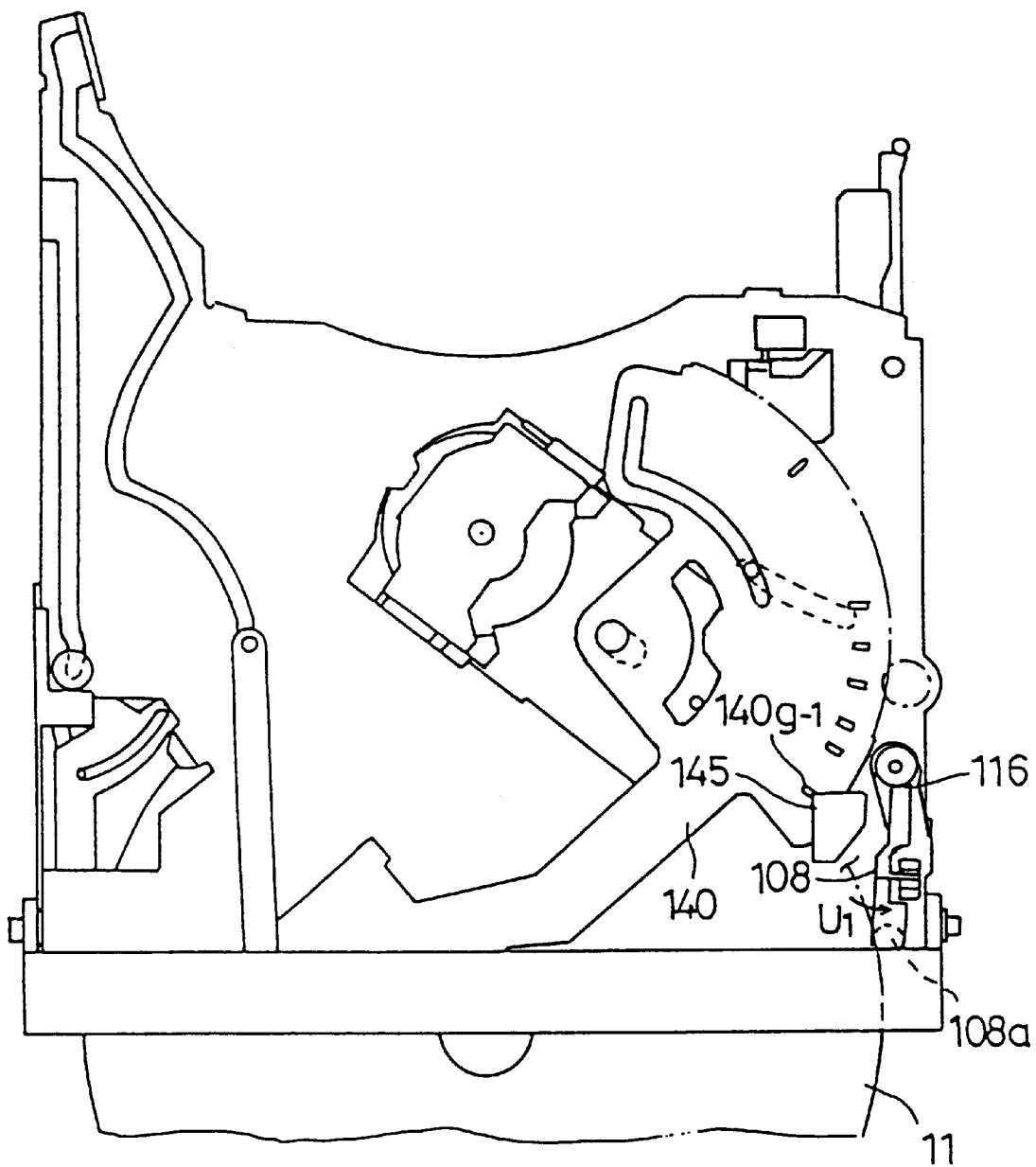
FIG. 27 is a diagram showing a state of the disk transfer mechanism when the disk is ejected.
Figure 28:
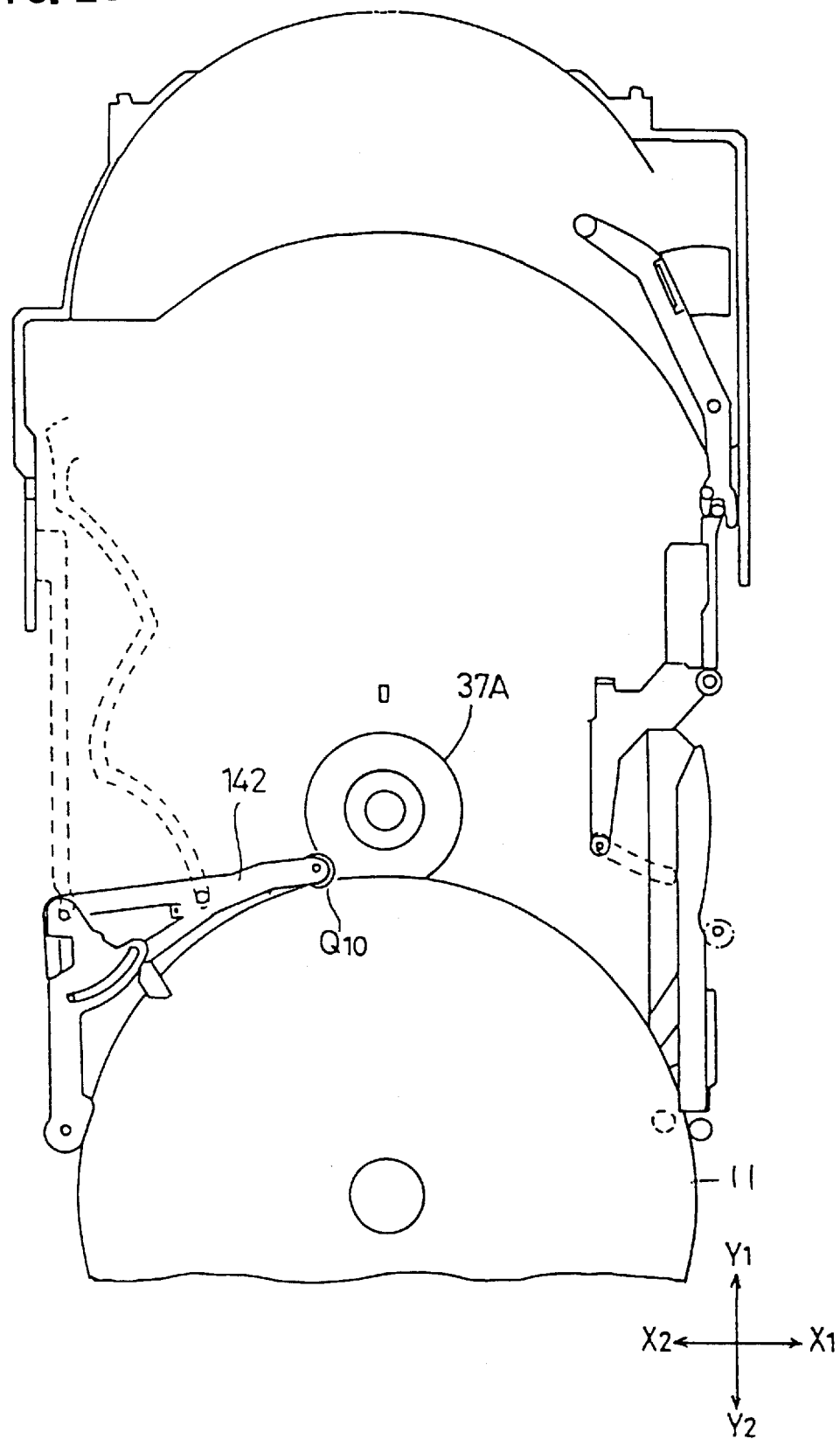
FIG. 28 is a diagram showing a state of the disk transfer mechanism after the disk is ejected (the chassis is omitted)

The disk transfer mechanism 34A operates between the initial state shown in FIGS. 19 and 20 and the ejection state shown in FIGS. 27 and 28.

The initial state of the disk transfer mechanism 34A is confirmed by an initial state detection switch 115 and the photo-sensor 145 which detects the slit 140g-7.

Firstly, the operation in which the disk 11 accommodated in the disk accommodating unit 33A is transferred in the Y2 direction will be explained.

When the loading motor 174 (FIG. 33) is rotated in the normal direction, the loading arm 140 is rotated in the L1 direction and the slit 140g-6 is rotated to a position detectable by the sensor 145 from the position shown in FIGS. 19 and 20 (refer to FIG. 18A).

Figure 21A:
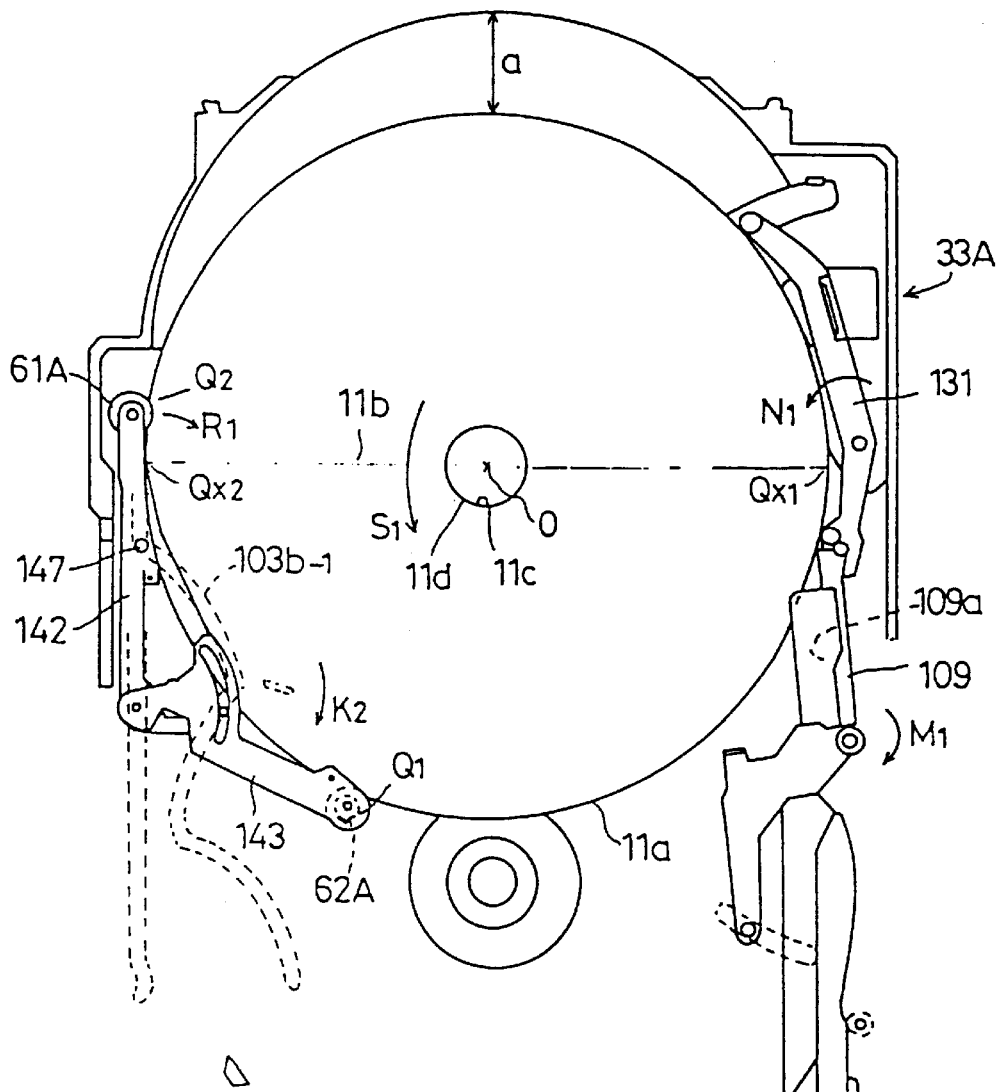
FIGS. 21A and 21B are diagrams for explaining a state in which a part of the disk is pushed out from the disk accommodating unit.

When the loading arm 140 starts to rotate in the L1 direction, it enters the state shown in FIG. 21. The first disk arm 142 and the second disk arm 143 rotate a little in the Y2 direction, and the cam elongated hole 140e guides a pin 109g of the ejection lever 109 so as to rotate the ejection lever 109 in the M1 direction. The initial state detection switch 115 is turned on by the rotation of the ejection lever 109. Also, the stock arm 131 is rotated in the N1 direction and the disk 11 is pushed in the Y2 direction by a distance 'a' from the disk accommodating part 41A-1. Here, the points at which the periphery 11a of the disk 11 crosses a line 11b are defined as QX1 and QX2.

In this manner, the periphery 11a of the disk 11 which is located in the Y2 direction contacts the roller 62A and pushes the roller 62A in the Y2 direction so as to rotate the second disk arm 143 in the K2 direction against the force exerted by the spring 149. Thus, the line 11b which passes the center O of the disk 11 and in parallel with respect to the X1 and X2 directions is located in the Y2 direction with respect to the roller 61A. That is, the roller 61A is opposed to a portion Q2 on the periphery 11a of the disk 11, which is located in the Y1 direction of the point QX2.

Also, when the ejection lever 109 is rotated in the M1 direction, the guiding groove 109a is aligned with the Y1-Y2 directions. That is, the periphery 11a of the disk 11 may be guided by the guiding groove 109a in that state.

When the loading arm 140 is further rotated in the L1 direction, the first disk arm 142 is rotated in the Y2 direction as shown in FIG. 22, and at the same time, the pin 147 is rotated in the R1 direction guided by the first elongated guiding hole 103b-1 so that the roller 61A pushes the portion Q2 in the X1 direction. Since the portion Q2 is located in the Y1 direction with respect to the point QX2, a force in the Y2 direction is applied to the disk 11 when the roller 61A pushes the periphery 11a of the disk 11 in the X1 direction. Accordingly, the disk 11 is transferred via the guiding groove 109a of the ejection lever 109 and the guiding groove 60Aa of the guiding rail member 60A in the Y2 direction with rotation in the S1 direction which gives low friction to the disk 11.

Since the second disk arm 143 may be rotated in the K2 direction, i.e., the opening direction with respect to the first disk arm 142, against the force exerted by the spring 149, the disk 11 is pushed in the Y2 direction without interference by the roller 62A. Thus, the second disk arm 143 is rotated in the K2 direction with a degree corresponding to the distance that the disk 11 is pushed in the Y2 direction.

Figure 21B:
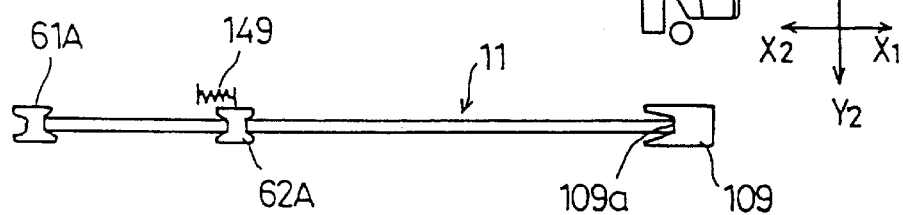

Also, as shown in FIG. 21B, the disk 11 is supported by three points—the X1 side of the periphery 11a is engaged by the guiding groove 109a of the ejection lever 109 and the X2 side is supported by the roller 61A and 62A. Therefore, the disk 11 may be firmly supported and, even when a part of the disk 11 is positioned outside of the disk accommodating part 41A-1, the disk 11 is stably held in a horizontal state.

As mentioned above, the disk transfer mechanism 34A holds the disk 11, a part of which is ejected outside of the disk accommodating part 41A-1 and transfers the disk 11 in the Y2 direction according to the rotation of the loading arm 140 in the L1 direction. The friction generated between the disk 11, the ejection lever 109 and the guiding rail member 60A is caused by rotation. Also, the friction generated between the disk 11 and the rollers 61A and 62A is caused by rotation. Thus, very little force (friction) is applied to the disk 11 during the transfer.

Figure 22A:
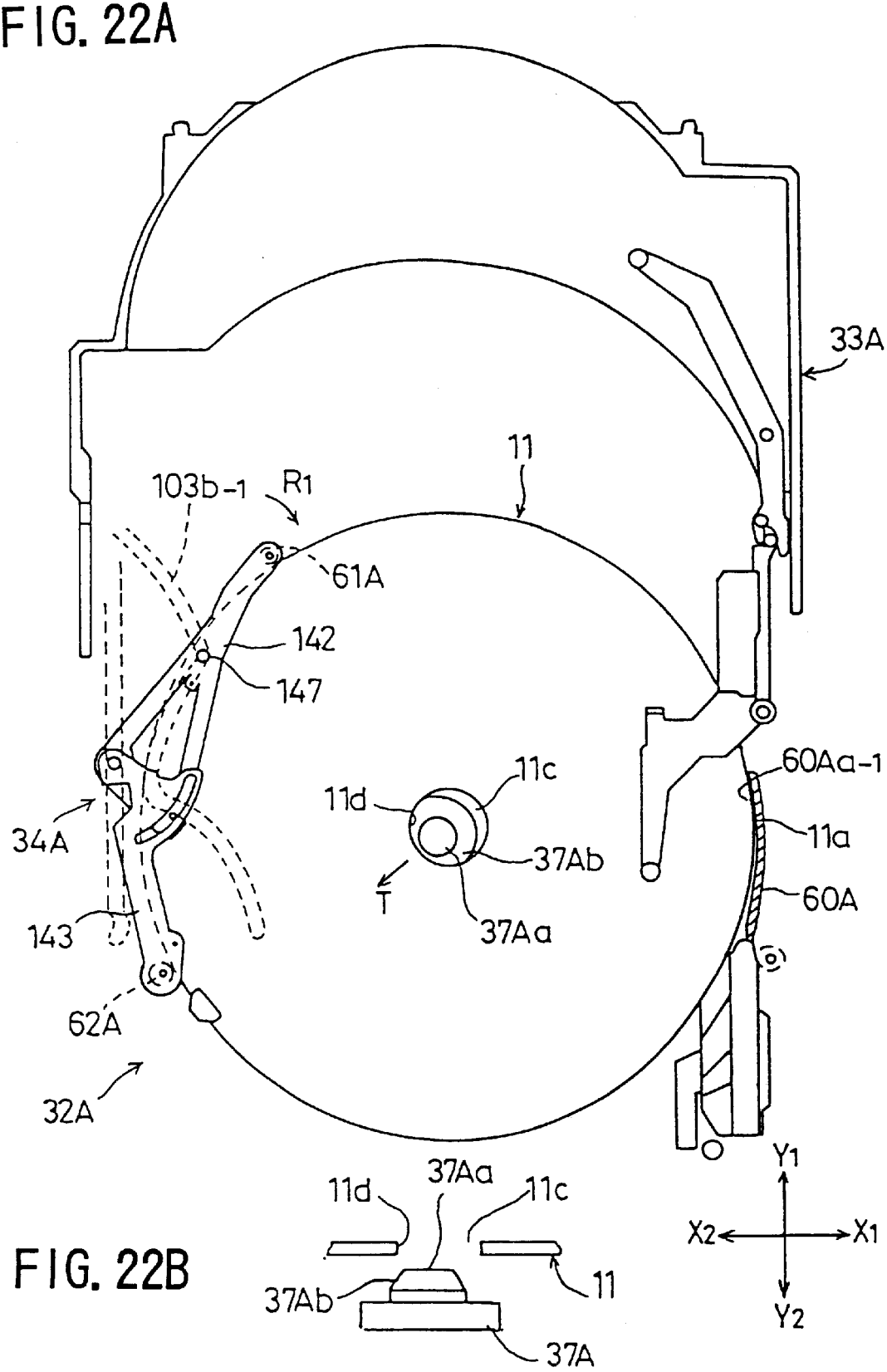
FIGS. 22A and 22B are diagrams for explaining a state in which a disk is transferred to the vicinity of a reproducing position.
Figure 22B:
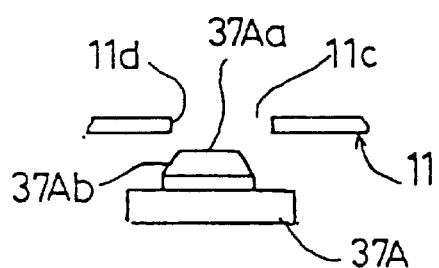
Figure 23A:
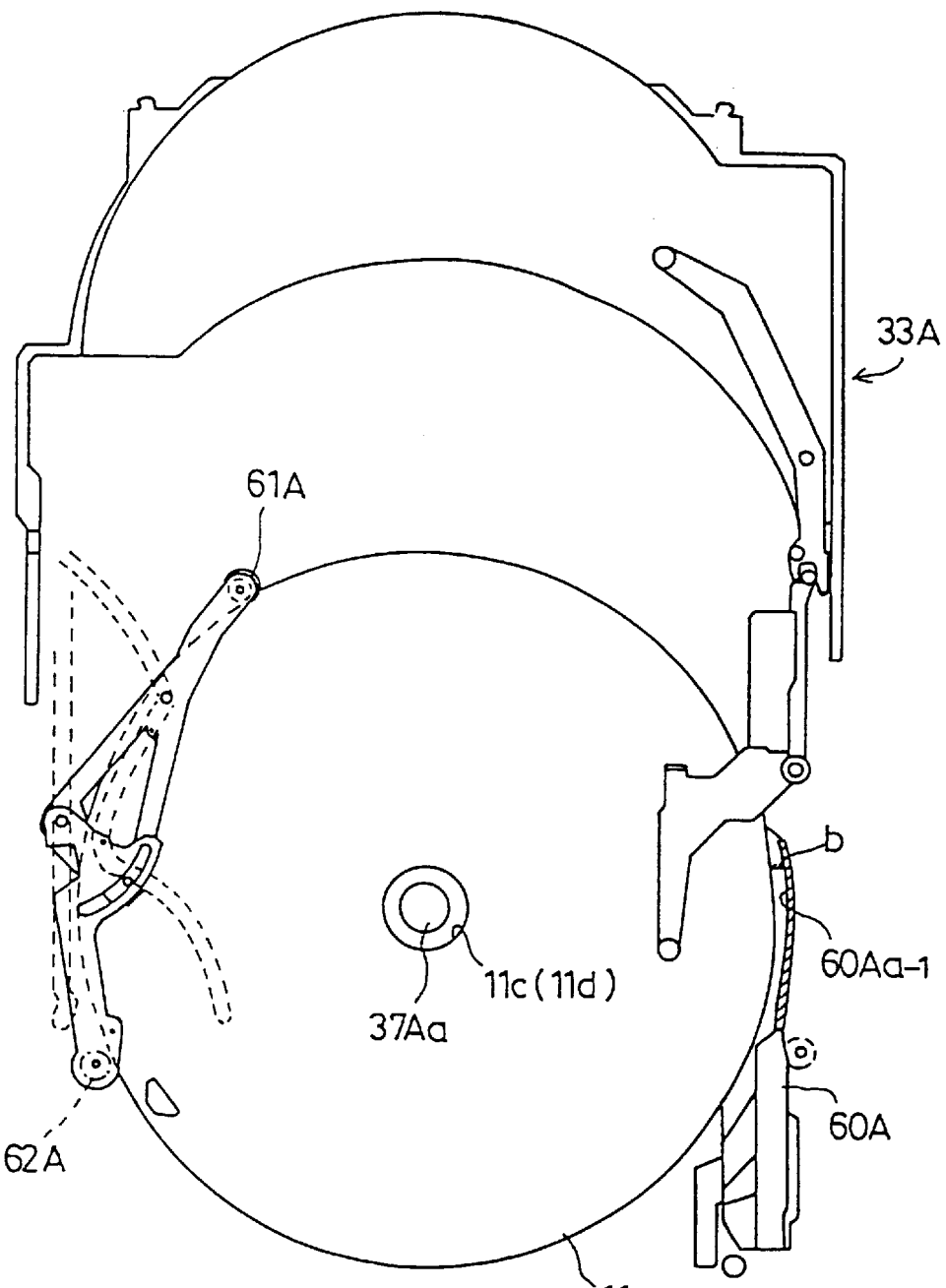
FIGS. 23A and 23B are diagrams for explaining a state in which the disk is clamped.
Figure 23B:
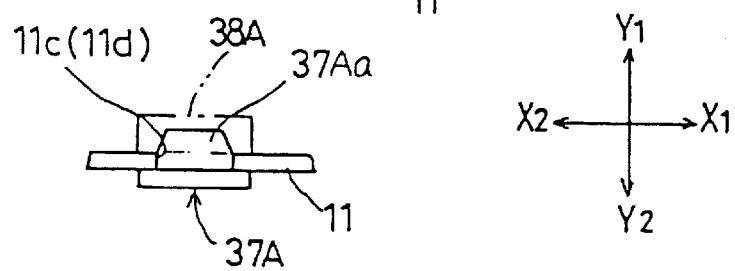

When the loading arm 140 is rotated to the position where the slit 140g-6 is detected by the sensor 145, the disk transfer mechanism 34A enters the state shown in FIGS. 22A and 22B. In this state, the periphery 11a of the disk 11 is in contact with the bottom surface 60Aa-1 of the guiding groove 60Aa of the guiding rail member 60A and the center hole 11c is a little shifted with respect to the turntable 37A. When looking down from the top, the periphery lid of the center hole lid is opposed to a tapered surface 37Ab of a convex portion located at the center of the turntable 37A.

Then, the turntable 37A is moved in the Z1 direction and the vicinity of a central hole 11c of the disk 11 is clamped by the turntable 37A and the clamper 38A. During this clamping operation, the tapered surface 37Ab guides the periphery lid of the center hole 11c and the disk 11 is gradually moved in the T direction between X2 and Y2. Finally, the disk 11 enters the state shown in FIG. 23 and the periphery of the disk 11 is separated from the bottom surface 60Aa-1 by a distance 'b'.

The above-mentioned transfer of the disk 11 in the T direction is smoothly carried out in the state in which the periphery 11a of the disk 11 pushes the roller 62A in the T direction and gradually rotates the second disk arm 143 in the K2 direction against the biasing force of the spring 143. Also, the rollers 61A and 62A are still in contact with the periphery 11a of the disk 11 after the disk 11 has moved in the T1 direction, and hence the disk 11 is still firmly supported after the detachment of the guiding rail member 60A.

Figure 24:
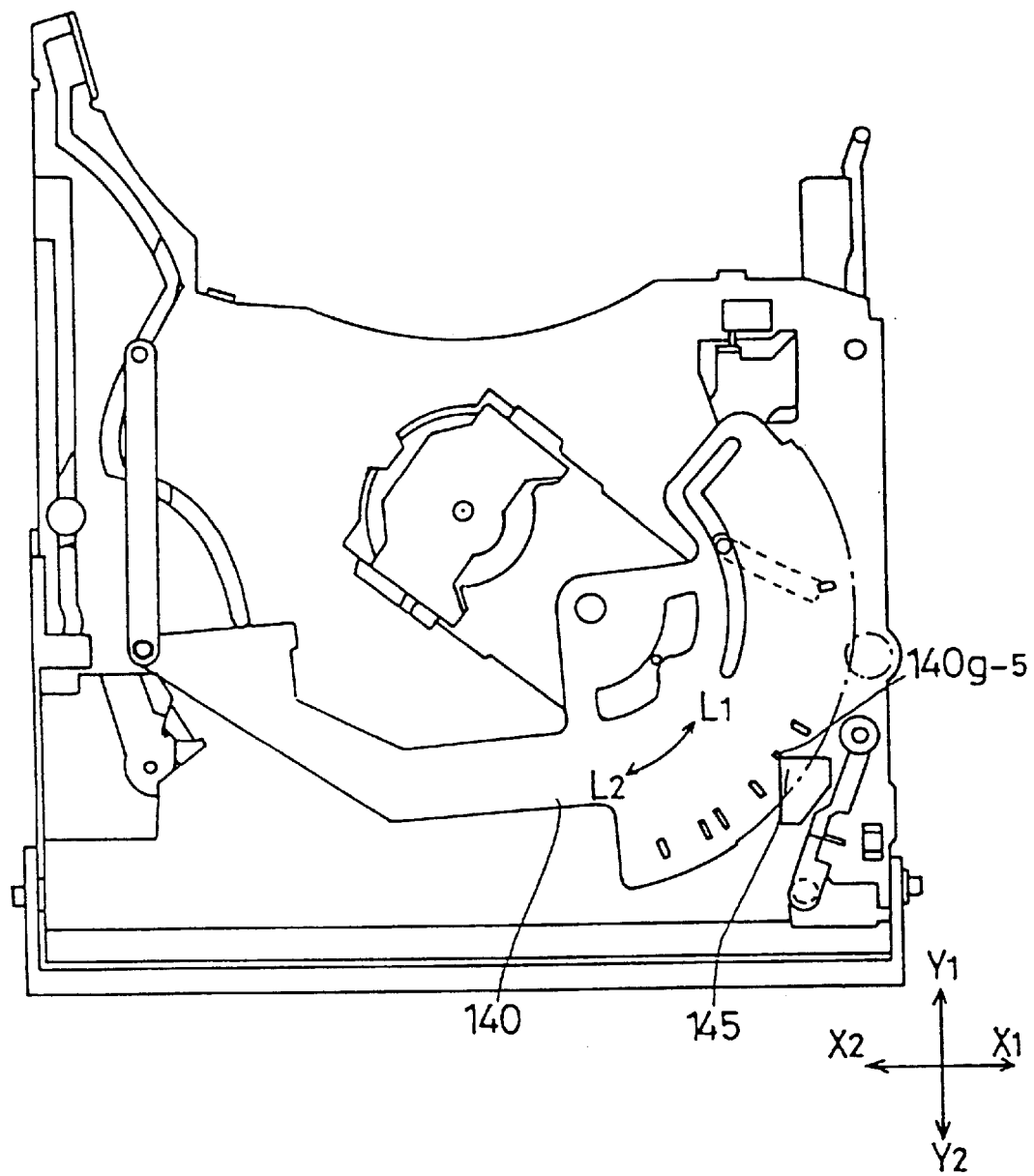
FIG. 24 is a diagram showing a plan view of the disk transfer mechanism in an initial state in which a disk is reproduced.
Figure 25:
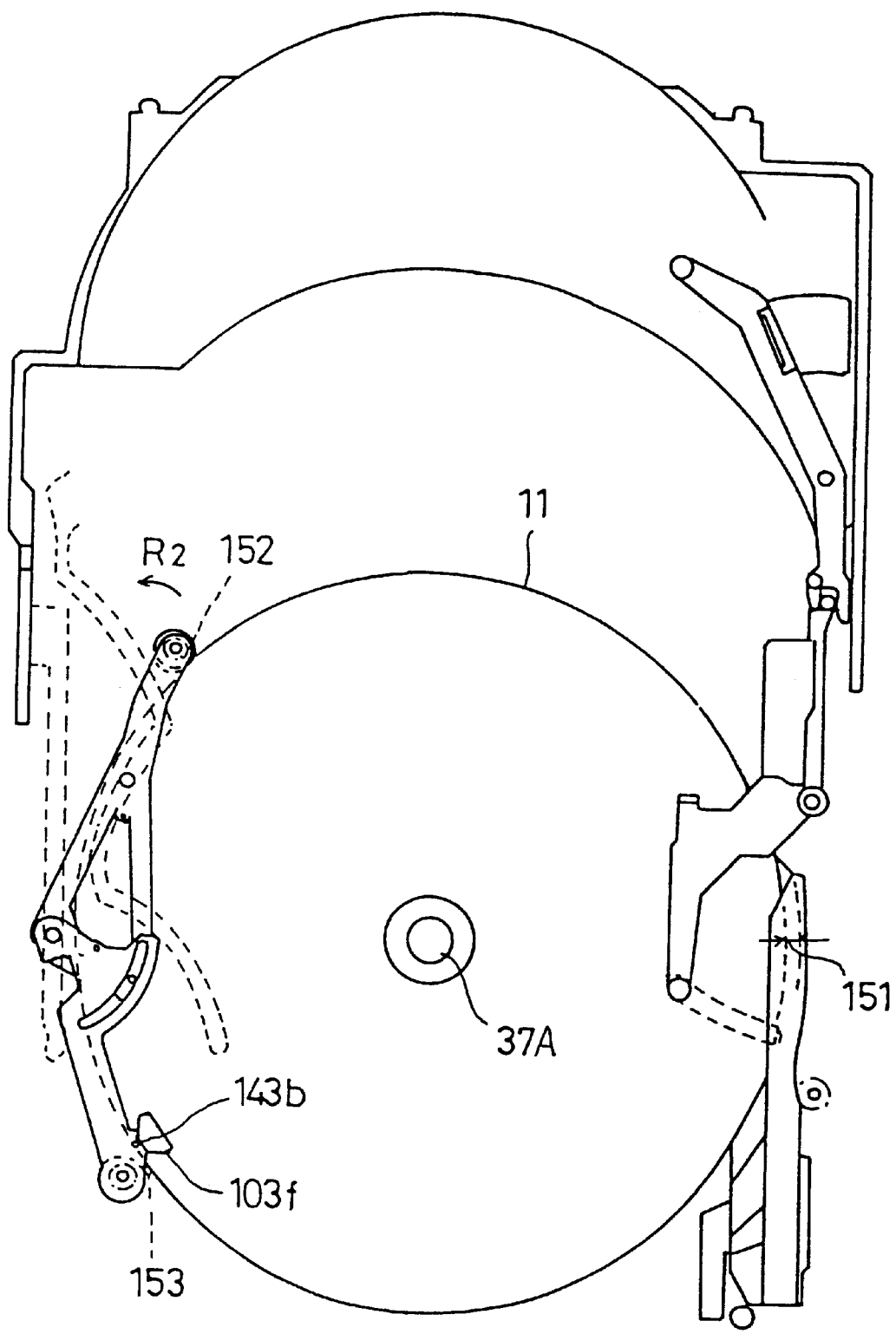
FIG. 25 is a diagram showing a disk reproducing state (the chassis is omitted)
Figure 26:
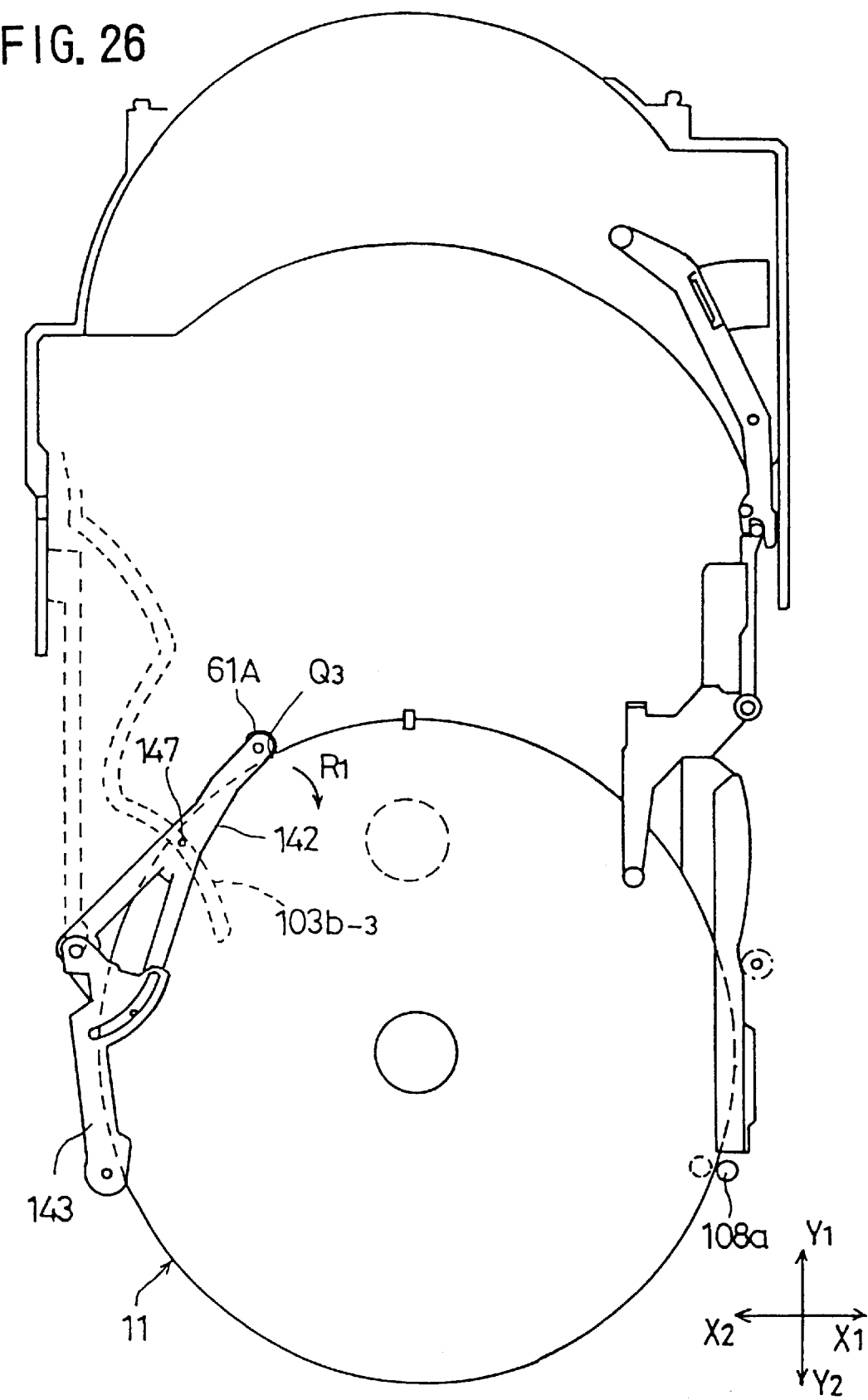
FIG. 26 is a diagram showing a disk transfer state in which the disk is ejected from the reproducing position.

The loading arm 140 is further rotated to the position where the slit 140g-5 is detected by the sensor 145 as shown in FIG. 24 and stops. Due to the rotation of the loading arm 140, the first disk arm 142 is moved in the Y2 direction as shown in FIG. 25 and the pin 147 is rotated in the R2 direction guided by the second elongated guiding hole 103-b. Thus, the roller 61A is detached from the periphery 11a of the disk 11 (refer to FIG. 18D).

The second disk arm 143 contacts the cam 103f and rotates a little in the K2 direction. At that time, the roller 62A is detached from the periphery 11a of the disk 11 (refer to FIG. 18D). Thus, spaces 151, 152 and 153, respectively, are formed between the periphery 11a and the roller 61A, the roller 62A and the bottom surface 60Aa-1, and the disk may be freely rotated.

In this state, the disk 11 is rotated by a motor for rotating the turntable 37A and is reproduced by the photo-pickup 36A.

Next, the operation of the disk reproducing apparatus 30A in which the reproduced disk 11 is returned to the original disk accommodating part 41A-1 will be explained.

In this operation, the rotation of the loading motor 174A is reversed and the roller 61A is moved towards the periphery 11a of the disk 11. Then, the roller 62A is pushed by the periphery 11a of the disk 11 and the turntable 37A is moved in the Z2 direction to release the clamp of the disk 11. After that, the roller 62A pushes the disk 11 to guide it in the direction opposite to the T direction. The disk 11 is supported by the rollers 61A and 62A and the guiding rail member 60A and the loading arm 140 is rotated in the L2 direction to return to the original position.

When the loading arm 140 is rotated in the L2 direction, the first disk arm 142 and the second disk arm 143 are moved in reversed directions in reversed order so that the disk 11 is pushed by the roller 62A to be transferred in the Y1 direction with rotation opposite to the S1 direction while being supported by the rollers 61A and 62A and the guiding groove 60Aa (guiding groove 109a).

Next, the operation to eject the disk 11 outside of the disk reproducing apparatus 30A will be explained.

In this operation, the loading motor 174 is rotated in the normal direction and the turntable 37A is moved in the Z2 direction so as to release the clamping condition of the disk 11. Then, the loading arm 140 is further rotated in the L1 direction until it reaches a position where the slit 140g-1 is detected by the sensor 145 as shown in FIG. 27.

When the loading arm 140 is rotated further in the L1 direction based on the position shown in FIG. 24, the first disk arm 142 is moved in the Y2 direction, as shown in FIG. 25, and is rotated in the R1 direction so as to push the position Q3 on the periphery 11a of the disk 11 in the direction between X1 and Y2. In this manner, the disk 11 is transferred in the Y2 direction along the guiding groove 60Aa with rotations in the S1 direction while being pushed towards the guiding groove 60Aa of the guiding rail member 60A by the rollers 61A and 62A.

At that time, the second disk arm 143 is rotated in the K2 direction with respect to the first disk arm 142 since the roller 62A is pushed by the disk 11.

Also, the portion of the periphery 11a closer to X1 pushes the pole 108a of the insertion lever 108 and moves the insertion lever 108 in the U1 direction against the force exerted by the spring 116. That is, the disk 11 is moved by pushing the pole 108a of the insertion lever 108 and a part of the disk 11 is ejected from the opening of the disk inlet member 111.

In the state that the loading arm 140 is rotated to the position shown in FIG. 27, the first disk arm 142 and the second disk arm 143 are positioned as shown in FIG. 28. That is, the first disk arm 142 is rotated 90 degrees in the R1 direction to face substantially the X1 direction and the roller 61A is transferred to the vicinity of the turntable 37A to push the portion Q10 of the disk 11. Accordingly, the half of the disk 11 at the Y2 side is ejected from a front bezel 39A of the disk reproducing apparatus 30A.

After this, the operator pulls out the disk 11 from the disk reproducing apparatus 30A. Also, the loading motor 174 is reversely rotated immediately after the disk transfer mechanism 34A enters the state shown in FIGS. 27 and 28 so that the apparatus 30A returns to the disk insertion waiting state which is shown in FIGS. 29 and 30.

Next, the operation to insert the disk 11 into the disk reproducing apparatus 30A will be described.

Figure 29:
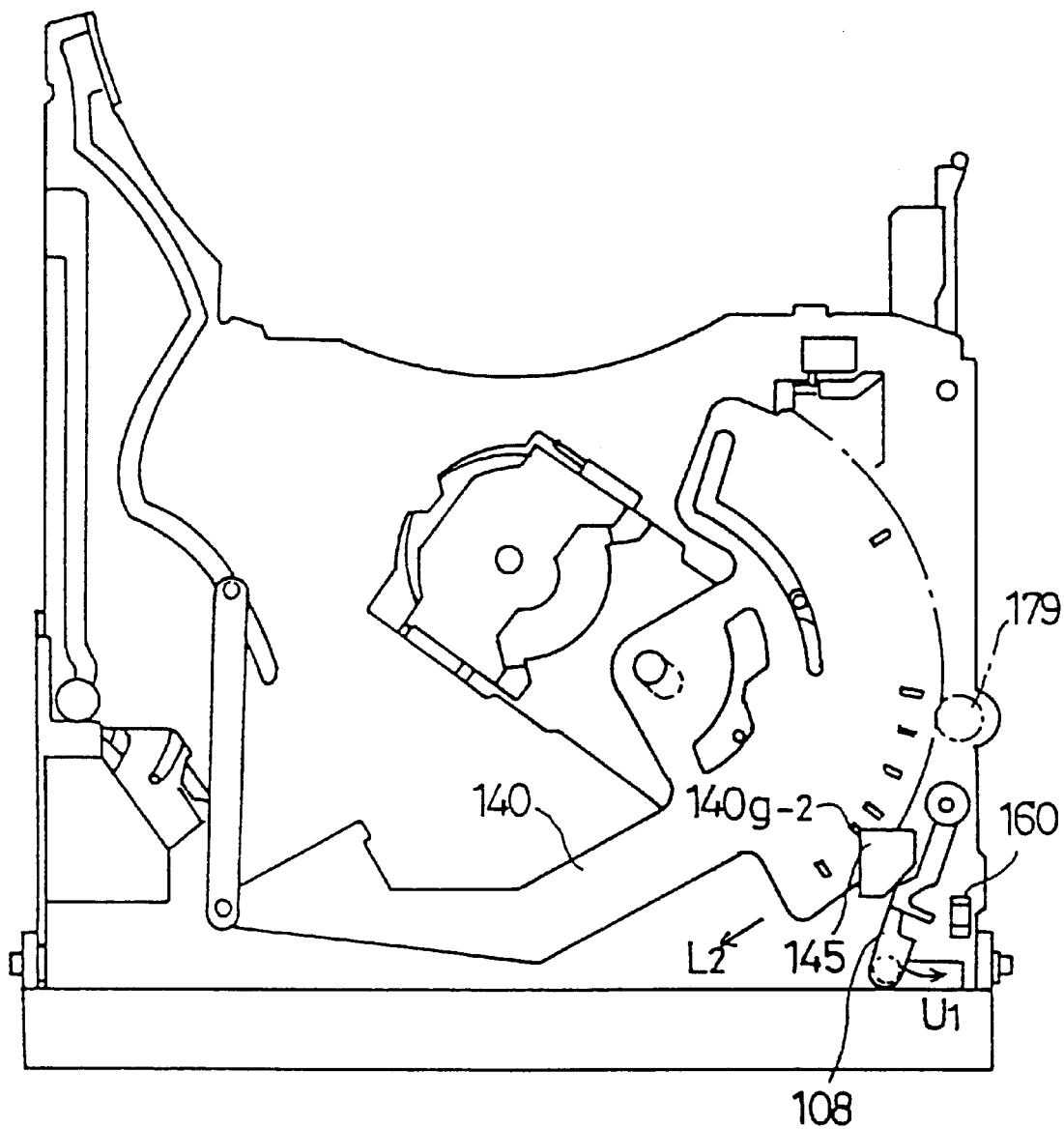
FIG. 29 is a diagram showing a state of the disk transfer mechanism when the disk is inserted.
Figure 30:
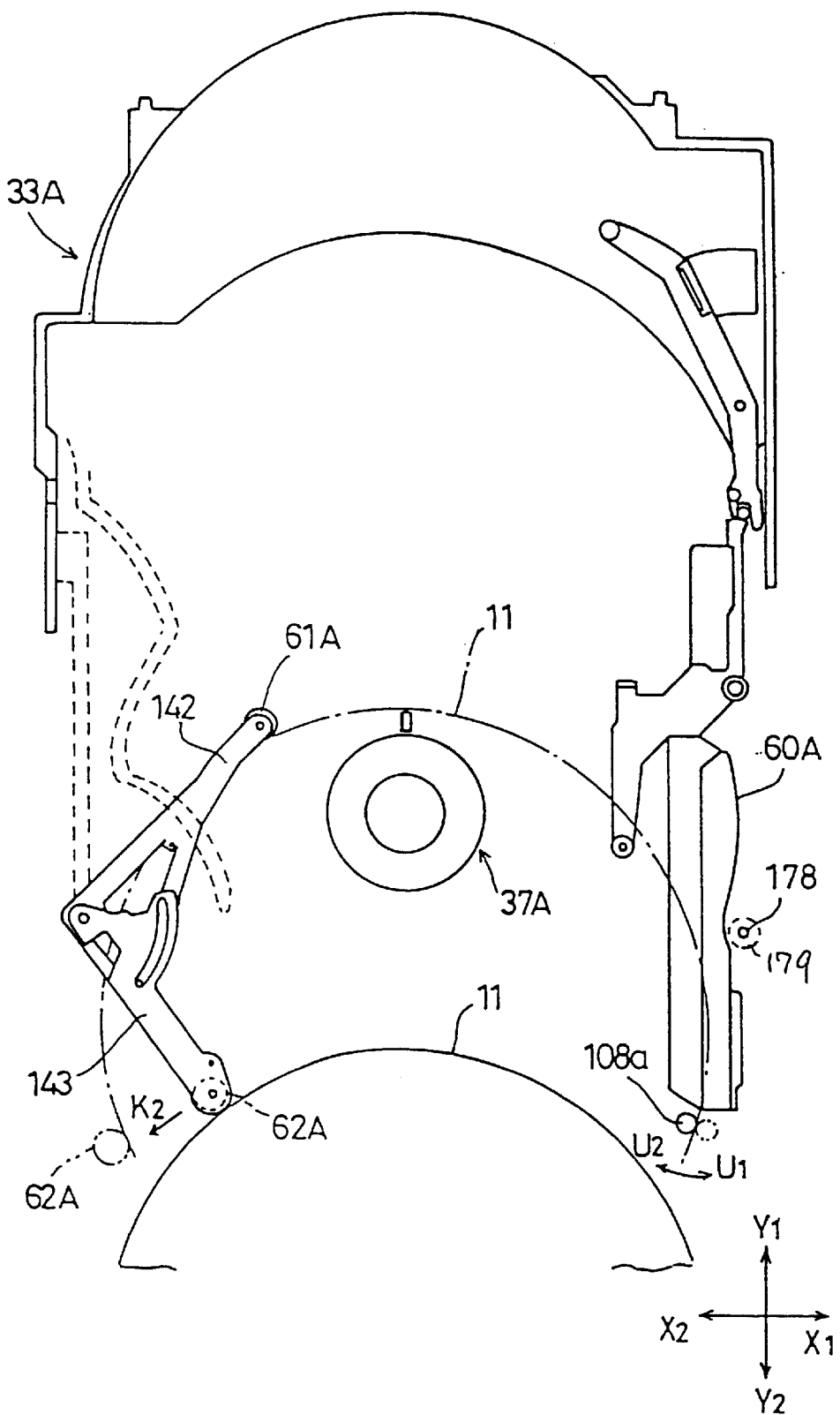
FIG. 30 is a diagram showing a state of the disk transfer mechanism when the disk is inserted (the chassis is omitted)

When an operation to indicate a certain disk accommodating part is conducted, the loading motor 174 is rotated in the normal direction so as to rotate the loading arm 140 to a position shown in FIG. 29. Accordingly, the disk transfer mechanism 34A enters the state shown in FIGS. 29 and 30. In this state the insertion lever 108 is rotated in the U2 direction by a spring 116.

When the disk 11 is inserted in the disk reproducing apparatus 30A via the disk inlet 71A of the front bezel 39A and an opening 11a of the disk inlet member 111 by an operator, the periphery 11a of the disk 11 at the X2 side pushes the roller 62A so as to rotate the second disk arm 143 in the K2 direction. Thus, the periphery 11a of the disk 11 at the X1 side pushes a pole 108a of the insertion lever 108 so as to rotate the insertion lever 108 against the spring 116.

When three-quarters of the disk 11 at the Y1 side are inserted, the disk insertion detection switch 160 is turned on and the loading motor 174 is rotated in the reverse direction so as to rotate the loading arm 140 in the L2 direction. The disk 11 is pushed by the roller 62A and transferred in the Y1 direction along the guiding groove 60Aa with rotations in the S2 direction while being supported by the guiding rail member 60A and the rollers 61A and 62A.

The position of the roller 62A when the disk 11 is inserted by the operator is indicated by dotted lines in FIG. 30 and the roller 62A is in contact with the half of the disk 11 at the Y2 side in that state.

The disk 11 which is transferred is clamped once and after that the clamping condition is released. Then, the disk 11 is transferred in the Y1 direction so as to be located inside the indicated disk accommodating part of the disk accommodating unit 33A.

Figure 31:
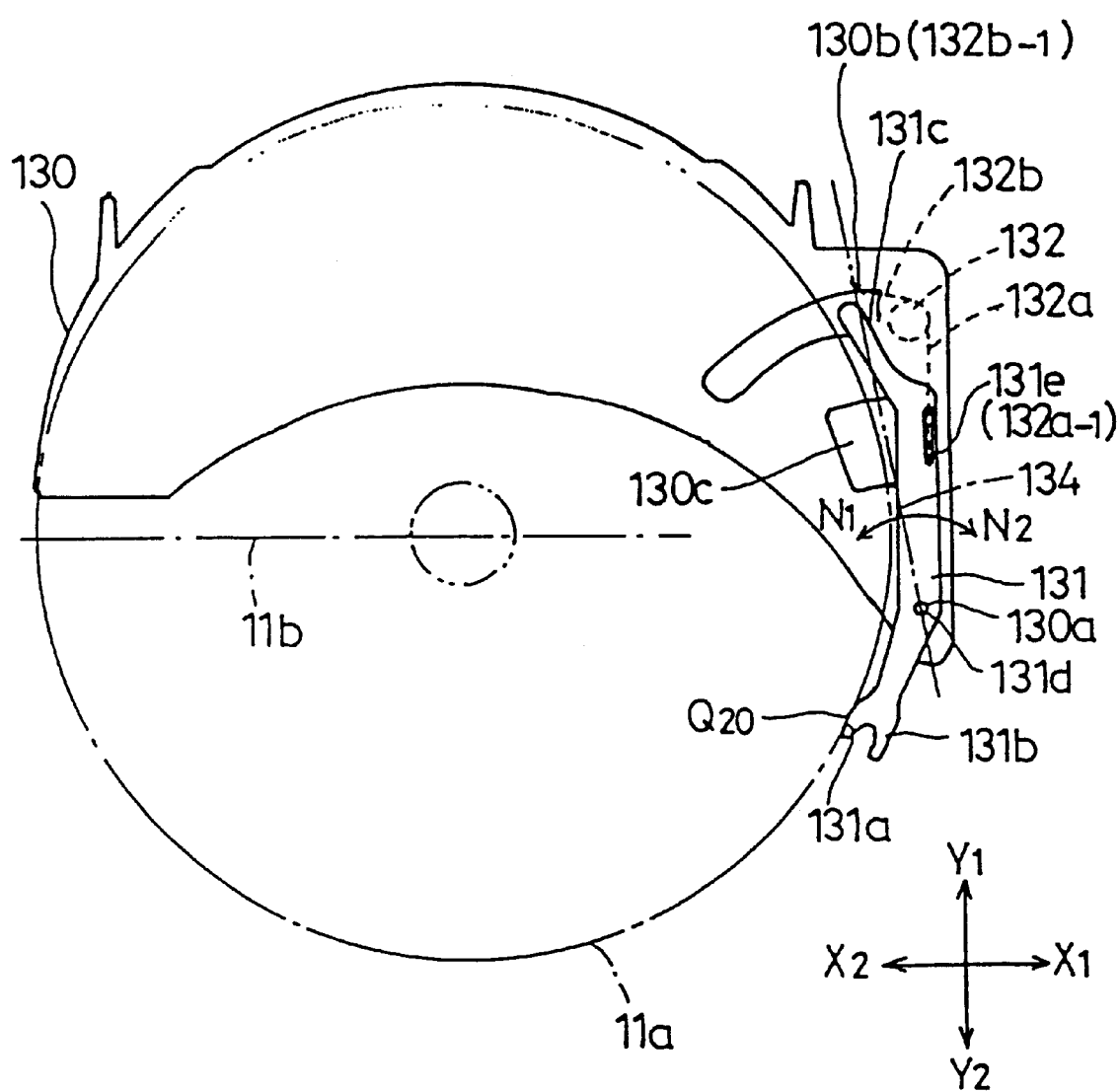
FIG. 31 is a diagram showing a structure around the stock arm of the disk accommodating unit when a disk is accommodated.
Figure 32:
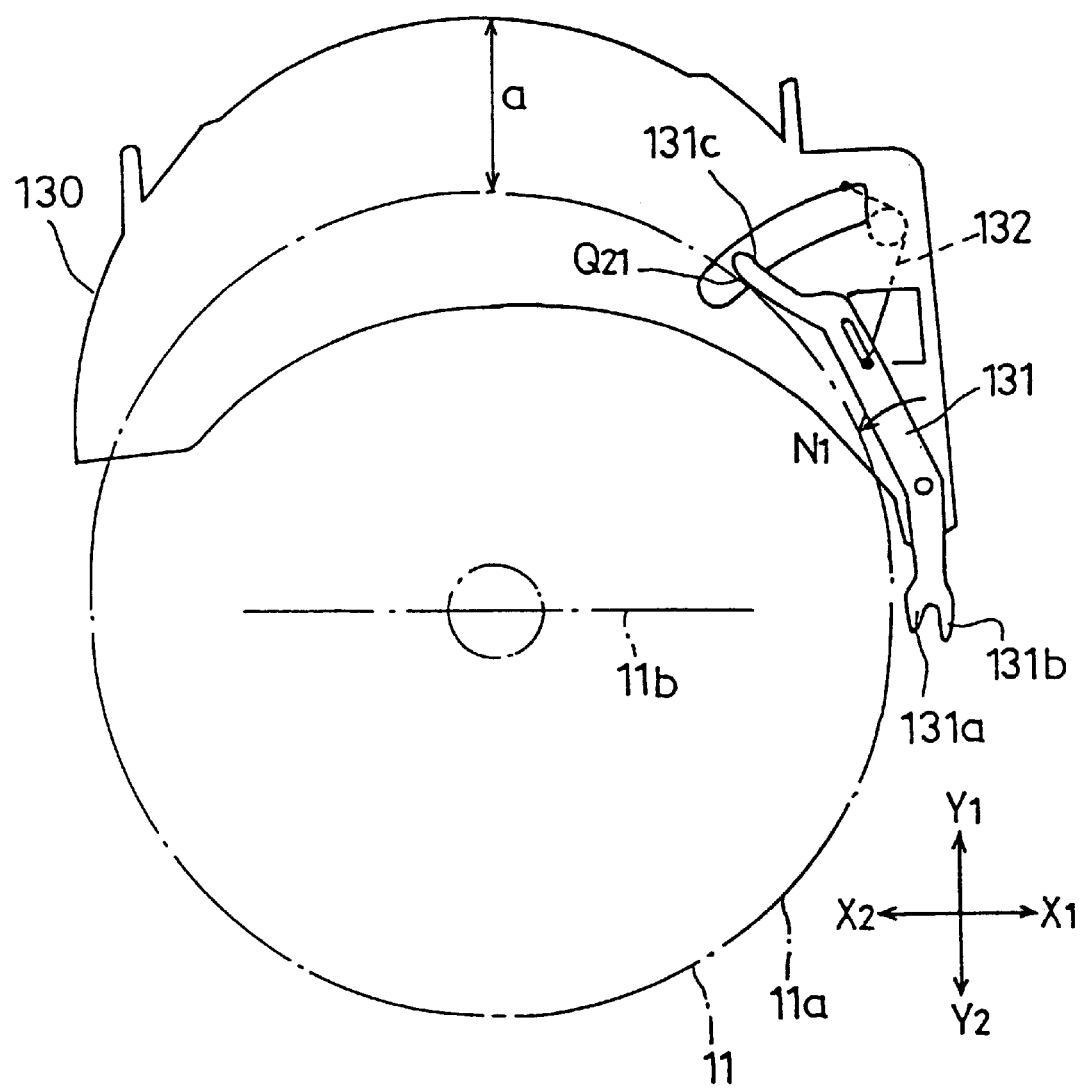
FIG. 32 is a diagram showing a structure around the stock arm of the disk accommodating unit when a disk is not accommodated.

[Structure of Disk Accommodating Unit 33A Around Stock Arm ] (refer to FIGS. 31 and 32)

FIG. 31 is a diagram showing a state in which the disk 11 is accommodated and FIG. 32 is a diagram showing a state in which the disk 11 is not accommodated.

The stock arm 131, which has a reversed C-shape, as a holding member, is comprised of the holding portion 131a and a hooking portion 131b at one end in the Y2 direction and the pushing portion 131c at the other end in the Y1 direction. The stock arm 131 is rotatably supported by a shaft 130a which is engaged with a hole 131d.

There is a torsion coil spring 132 which is deformed so as to narrow the angle between arm portions 132a and 132b. An opening 130c is formed in the parting plate 130 and the arm portion 132a of the torsion coil spring 132 penetrates the opening 130c. The opening 130c determines the angle of the rotation of the arm portion 132 (i.e., the rotation of the stock arm 131).

Also, the torsion coil spring 132 is provided so that the end 132a-1 of the arm portion 132 crosses a line 134 when the stock arm 131 is rotated. The line 134 passes through a hole 130b and the shaft 130a.

When the disk 11 is accommodated, the end 132a-1 of the arm portion 132a is located at the X1 side with respect to the line 134 as shown in FIG. 31. The stock arm 131 is biased in the N2 direction by the torsion coil spring 132 and its rotation angle is determined by the opening 130c. Thus, the disk 11 is contained in the disk accommodating part with the portion Q20 of the periphery 11a of the disk 11 being held by the holding portion 131a.

When the ejection lever 109 is rotated in the M1 direction, an end 109c of the ejection lever 109 pushes the hooking portion 131b and the stock arm 131 is rotated in the N1 direction. When the end 132a-1 of the arm portion 132a passes over the line 134, the stock arm 131 is then rotated in the N1 direction by the torsion coil spring 132.

By the rotation of the stock arm 131 in the N1 direction, the holding portion 131a is moved in the X1 direction and the pushing portion 131c pushes the portion Q21 of the periphery 11a of the disk 11. In this manner, the disk 11 is pushed toward the Y2 direction a distance 'a' with respect to the predetermined disk accommodating part and, as shown in FIG. 21, the periphery 11a of the disk 11 contacts the rollers 61A and 62A.

Also, the disk 11, which has been transferred in the Y1 direction, may be accommodated in the predetermined disk accommodating part by the operation in which the stock arm 131 is rotated in the N2 direction firstly by the ejection lever 109 followed by the torsion coil spring 132.

Moreover, since the holding portion 131a of the stock arm 131 pushes the disk 11 and transfers it in the Y1 direction, the periphery 11a of the disk 11 is separated from the rollers 61A and 62A as shown in FIG. 20. Thus, it becomes possible to operate disk selecting means.

[Driving Mechanism Assembly 110] (refer to FIGS. 33 through 37)

As shown in FIGS. 14 and 33, the driving mechanism assembly 110 is comprised of the chassis base 150, the sliding member 105 which is supported by the lower surface of the chassis base 150 and may be moved in the Y1 and Y2 directions, a shaft 170, a gear 171 (including a worm wheel portion 171a and a gear portion 171b) which is rotatably supported independent of the shaft 170, a gear 172 and a pinion 173, the loading motor 174 which is fixed to the lower surface of the chassis 150, a worm 175 which is fixed to a spindle of the loading motor 174 and is engaged with the worm wheel portion 171a, a cam gear 177 which is supported by a shaft 176 fixed to the chassis base 150 and engaged with the gear 172, a gear 179 which is rotatably supported by a shaft 178 and engaged with the cam gear 177, shafts 180a and 180b which are fixed to the pinion 173, a gear 181a which is rotatably supported by the shaft 180a and engaged with the gear portion 171b, a gear 181b which is rotatably supported by the shaft 180b and engaged with the gear 172, and a link arm 183 which is rotatably supported by a shaft 182 and includes two pins 183a and 183b. Since the gear 179 is engaged with the rack 140d of the loading arm 140, the loading arm 140 is rotated when the gear 179 is rotated.

When the rotation of the pinion 173 is held, the gear 181 (i.e., the gear 181a and the gear 181b) does not rotate and the rotation of the gear portion 171b is transmitted to the gear 172. Also, as will be described later, when the rotation of the pinion 173 is not held, the cam gear 177 and the gear 172 are stopped since the rotation of the cam gear 177 is held. Accordingly, the gear 181 (the gear 181a and the gear 181b) rotates around the gear 172 and the pinion 173 is rotated.

The sliding member 105 includes a horizontal plate portion 105a and a vertical plate portion 105b. A groove 105d is formed with the horizontal plate portion 105a and a guiding groove 105c is formed with the vertical plate portion 105b. The pin 183a of the link arm 183 is engaged with a cam groove 177a and the pin 183b is engaged with the groove 105d.

Also, a rack 105e is formed with the horizontal plate portion 105a. The rack 105e is engaged with the pinion 173.

The groove 105d extends in the Y1 and Y2 directions. A first step portion 105d-1, a first groove portion 105d-2, a second step portion 105d-3, a third step portion 105d-4, a second groove portion 105d-5, a fourth step portion 105d-6, and a fifth step portion 105d-7 are provided from the Y2 side to Y1 side in that order.

The cam groove 177a is comprised of a first circular groove portion 177a-1, a first radius groove portion 177a-2, a second circular groove portion 177a-3, a second radius groove portion 177a-4, and a third circular groove portion 177a-5.

The first groove portion 105d-2 of the groove 105d restricts the rotation of the link arm 183 in the range that the pin 183a is positioned at the first radius groove portion 177a-2. The second groove portion 105d-5 of the groove 105d restricts the rotation of the link arm 183 in the range that the pin 183a is positioned at the second radius groove portion 177a-4.

The first circular groove portion 177a-1 of the cam groove 177a restricts the rotation of the link arm 183 in the range that the pin 183b is positioned at the first step portion 105d-1. The second circular groove portion 177a-3 of the cam groove 177a restricts the rotation of the link arm 183 in the range that the pin 183b is positioned at the second step portion 105d-3 and the third step portion 105d-4. The third circular groove portion 177a-5 of the cam groove 177a restricts the rotation of the link arm 183 in the range that the pin 183b is positioned at the fourth step portion 105d-6 and the fifth step portion 105d-7.

When the cam gear 177 is rotated counterclockwise, the first radium groove portion 177a-2 functions so as to rotate the link arm 183 clockwise by releasing the rotation restriction of the link arm 183 located at the rotation position where the pin 183b is positioned at the first step portion 105-1. The second radius groove portion 177a-4 of the cam groove 177a functions so as to rotate the link arm 183 clockwise by releasing the rotation restriction of the link arm 183 located at the rotation position where the pin 183b is positioned at the second step portion 105-3. When the cam gear 177 is rotated clockwise, the second radium groove portion 177a-4 and the first radius groove portion 177a-2 function so as to rotate the link arm 183 counterclockwise.

The first step portion 105d-1, the second step portion 105d-3, and the fourth step portion 105d-6 of the groove 105d function so as to restrict the movement of the sliding member 105 in the Y2 direction when it contacts the pin 183b. The fifth step portion 105d-7 and the third step portion 105d-4 function so as to restrict the movement of the sliding member 105 in the Y2 direction when it contacts the pin 183b.

Also, as mentioned above, the pinion 173 is engaged with the rack 105e of the sliding member 105. Thus, the sliding member 105 is not movable (i.e., the pinion 173 is not rotatable) when the cam gear 177 is rotatable, and the sliding member 105 is movable (i.e., the pinion 173 is rotatable) when the cam gear 177 is not rotatable.

The chassis base 150 has the arm portion 150a. The arm portion 150a is provided across the lower surface of the disk transfer mechanism 34A. A pad 155 made of synthetic resin is provided with the arm portion 150a so as to support and not damage the disk 11, which has been transferred, in the position between the disk accommodating unit 33A and the disk reproducing unit 32A.

Next, the operation of the driving mechanism assembly 110 having the above structure will be explained.

FIGS. 37A through 37G are diagrams for explaining the operation of the each structural portion of the driving mechanism assembly 110.

Figure 35A:
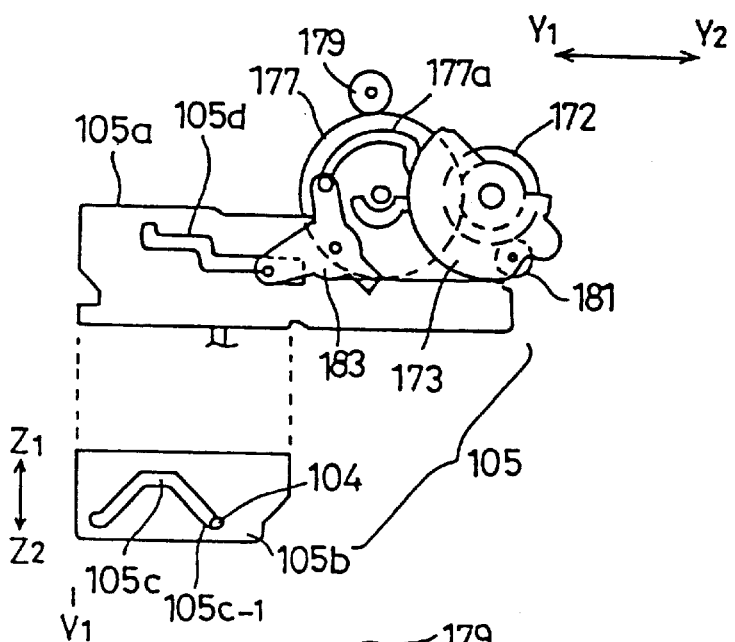
FIGS. 35A through 35C are diagrams for explaining a disk clamping operation.
Figure 35B:
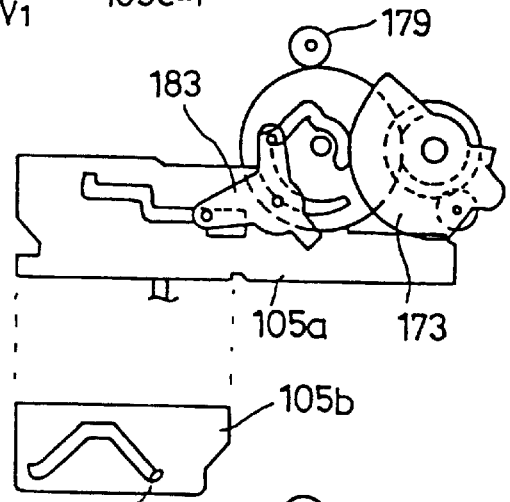

When the disk transfer mechanism 34A is in the initial state shown in FIG. 19, the driving mechanism assembly 110 is in the state shown in FIG. 35A. The cam gear 177 is rotated clockwise, the pin 183a is at the position 1 in the cam groove 177a, the link arm 183 is rotated counterclockwise, and the pin 183b is at the position 1 in the groove 105d. The sliding member 105 is located at the position V1 and is prohibited from moving in the Y2 direction. Hence, the pinion 173 cannot be rotated. On the other hand, the pin 104 is guided by a portion 105c-1 of the guiding groove 105c.

When the motor is rotated in the normal direction, the rotation of the motor is transmitted to the cam gear 177 via the worm 175, the gear 171, the gear 181 and the gear 172, and the cam gear 177 is rotated counterclockwise. The link arm 183 stays at the original position until the pin 183a reaches the position 2. The pin 183b is still located at the position 1 of the groove 105d so that the sliding member 105 is restricted from moving in the Y2 direction and the pinion 173 cannot be rotated.

When the cam gear 177 is rotated counterclockwise as mentioned above, the gear 179 is rotated in the normal direction and the loading arm 140 is rotated in the L1 direction. Accordingly, the disk transfer mechanism 34A transfers the disk 11 in the Y2 direction from the disk accommodating part 41A-1.

Figure 35C:
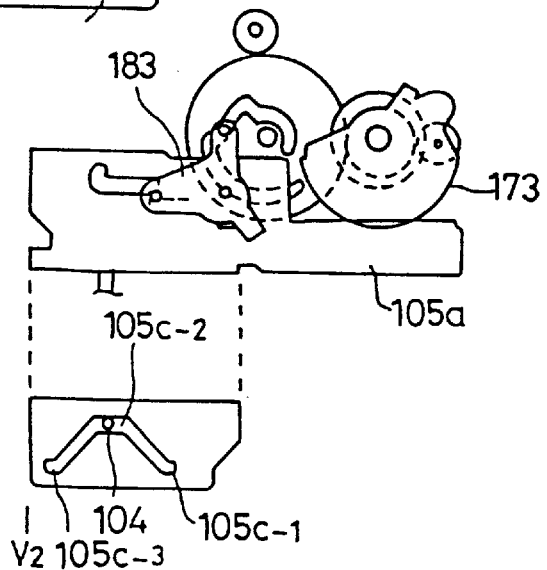

At the last step during the transfer of the disk 11 to the position shown in FIG. 22 (i.e., the position where the slit 140g-6 is detected), the link arm 183 is rotated in the clockwise direction. Thus, the pin 183a moves from the position 2 to the position 3 and the pin 183b moves to the position 11 to enter the state shown in FIG. 35B. In this state, the cam gear 177 is no longer rotated and the operation of the disk transfer mechanism 34 is stopped. Instead, the sliding member 105 becomes movable (i.e., the pinion 173 is rotatable) and the sliding member 105 starts to move in the Y2 direction. As shown in FIG. 35C, the sliding member 105 moves until the pin 183b relatively reaches the position III, that is, the second step portion 105d-3 reaches the position V2. When the second step portion 105d-3 reaches the position opposed to the pin 183b, the movement of the sliding member is stopped.

The pin 104 enters the state in which it is guided by the top portion 105c-2 of the guiding groove 105c and the disk reproducing unit 32A is rotated in the J direction so that the turntable 37A is moved up to clamp the disk 11.

Since the pin 183b reaches the position III, the link arm 183 may be rotated in the clockwise direction. The pin 183a is guided by the radius groove portion 177a-2 to rotate the link arm 183 in the clockwise direction. As a result, the pin 183a reaches the position 4 and the pin 183b reaches the position IV to enter the state shown in FIG. 35C. In this state, the movement of the sliding member 105 is restricted and the cam gear 177 is now rotatable in the counterclockwise direction. When the cam gear 177 rotates in the counterclockwise direction, the disk transfer mechanism 34 is actuated so as to detach the rollers 61A and 62A from the periphery 11a of the disk 11.

When the pin 183a reaches substantially the center or the position 4 and the position 5, the slit 140g-6 is detected and the motor 174 is stopped. Then, another motor (not shown) for rotating the turntable is operated so as to reproduce the disk 11.

When the disk 11 is returned to the disk accommodating part 41A-1, where the disk 11 is originally located, after the completion of the reproducing of the disk 11, the motor 174 is rotated in the reverse direction so as to rotate the cam gear 177 in the clockwise direction to hold the disk 11 by the rollers 61A and 62A. Then, the sliding member 105 is moved in the Y1 direction to release the clamping state of the disk 11 and the cam gear 177 is rotated in the clockwise direction to transfer the disk 11 in the Y1 direction.

When the disk 11 is ejected, the motor 174 is continuously rotated in the normal direction after the slit 140g-6 is detected so that the cam gear 177 is rotated in the counterclockwise direction and the pin 183a moves from the position 4 to the position 5 in the second circular groove portion 177a-3. The link arm 183 stays at the original position until the pin 183a reaches the position 5 and the pin 183b is located at the position IV in the groove 105d. Thus, the sliding member 105 is not moved in the Y2 direction and the pinion 173 is not rotated.

The gear 179 is rotated due to the rotation of the above-mentioned cam gear 177 in the counterclockwise direction, and the loading arm 140 is rotated in the L1 direction until the slit 140g-4 is detected. At that time, the disk transfer mechanism 34A supports the periphery 11a of the disk 11.

Figure 34B:
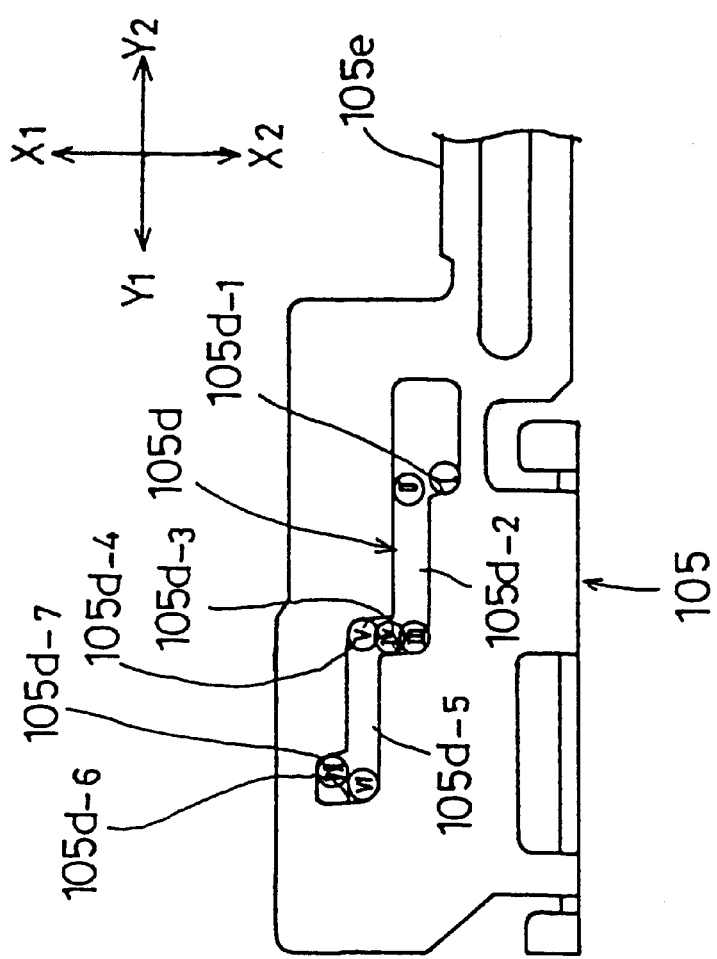
FIG. 34B is a diagram showing positional relationships among pins in a groove of a sliding member.
Figure 34A:
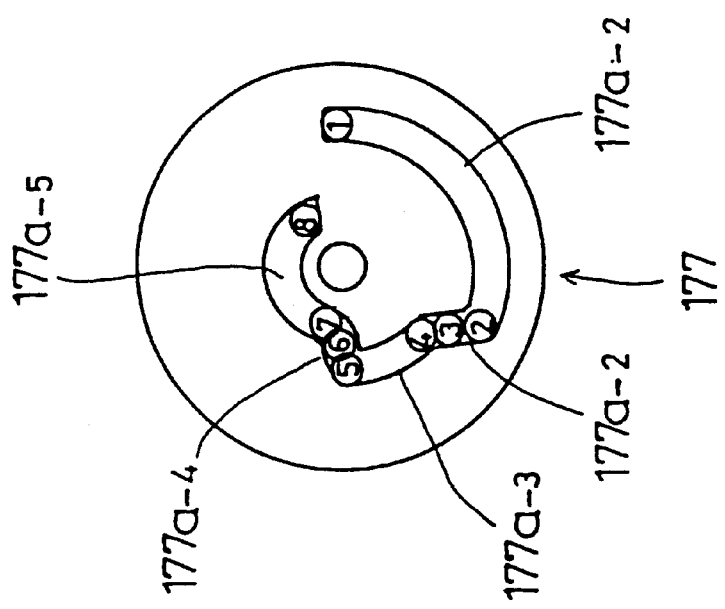
FIG. 34A is a diagram showing positional relationships among pins in a cam groove of cam gear of the driving mechanism assembly.
Figure 36A:
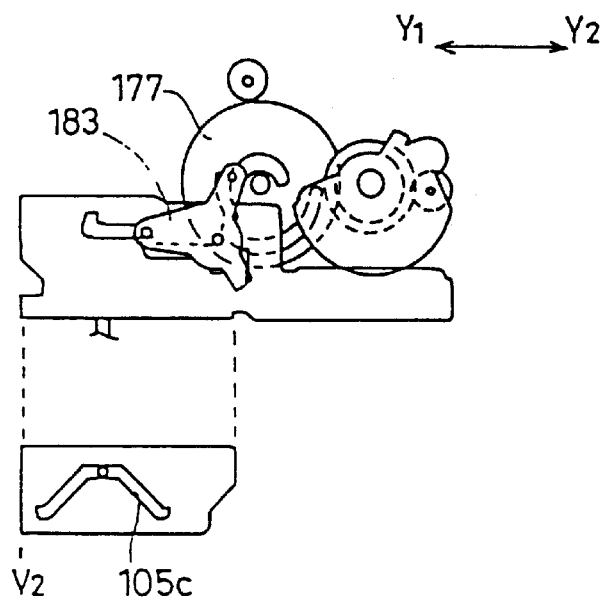
FIGS. 36A through 36C are diagrams for explaining a disk clamping releasing operation.

When the pin 183a reaches the position 5, it is moved by the radius groove portion 177a-4 to reach the position 6 and the pin 183b reaches the position V as shown in FIGS. 34 and 36A. Accordingly, the cam gear 177 is no longer rotatable and the sliding member 105 is now movable. Thus, the pinion 173 is rotated by the gear 181 and the sliding member 105 starts to move in the Y2 direction. The sliding member 105 moves in the Y2 direction until the pin 183b reaches the position VI, that is, until the fourth step portion 105d-6 reaches the position V3. When the fourth step portion 105d-6 reaches the position opposed to the pin 183b, the movement of the sliding member 105 is stopped.

In that state, the pin 104 is guided by the portion 105c-3 of the guiding groove 105c and the disk reproducing unit 32A is rotated in the J direction so that the turntable 37A is moved down to release the clamping of the disk 11. As mentioned above, the upward and the downward movement of the turntable 37A is carried out when the motor 174 is rotated in the normal direction without reversing the direction.

Figure 36B:
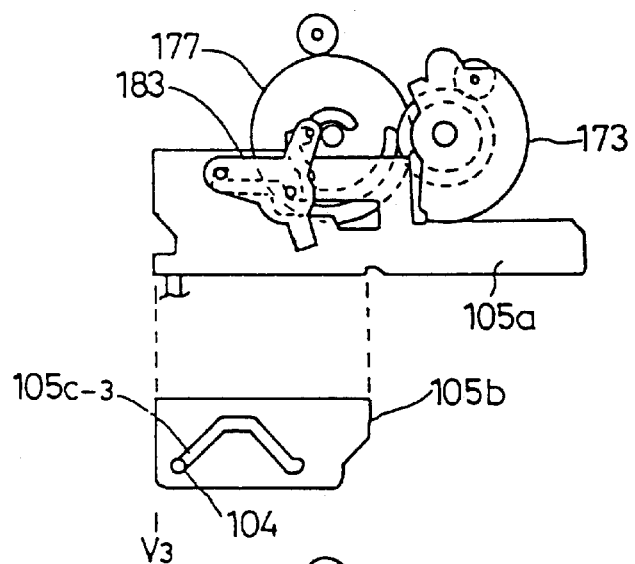

As shown in FIGS. 34 and 36B, the link arm 183 is rotatable when the pin 183b reaches the position VI. In that state, the pin 183a is moved by the radius groove portion 177a-4 and the link arm 183 rotated in the clockwise direction so that the pin 183a reaches the position 7 and the pin 183b reaches the position VII. Thus, the cam gear 177 is rotatable again and the movement of the sliding member 105 is still restricted.

Figure 36C:
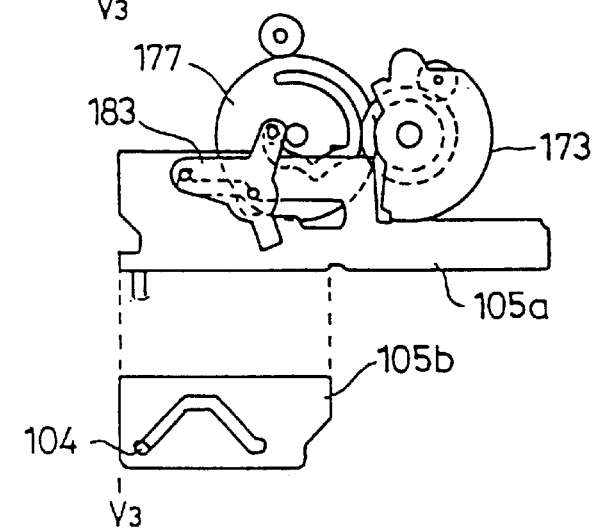

The cam gear 177 is rotated in the counterclockwise direction to a position shown in FIG. 36C. The gear 179 is rotated according to the rotation of the cam gear 177 and the loading arm 140 is further rotated in the L1 direction. As mentioned above, the disk transfer mechanism 34A transfers the disk 11 in the Y2 direction until the disk 11 is positioned outside of the disk reproducing apparatus 30A and the motor 174 is stopped when the slit 140g-1 is detected. Immediately after that, the motor 174 is rotated in the reversed direction and it is stopped when the slit 140g-2 is detected. At this moment, the pin 183a is located between the position 7 and the position 8 (i.e., the disk insertion waiting state).

When the disk 11 is inserted, the motor 174 is rotated in the reverse direction and the cam gear 177 and the sliding member 105 are moved in the reversed directions in reversed order so that the driving mechanism assembly 110 returns to the initial state as shown in FIG. 35A.

[Disk Clamping Mechanism] (refer to FIGS. 38 through 42)

Figure 39:
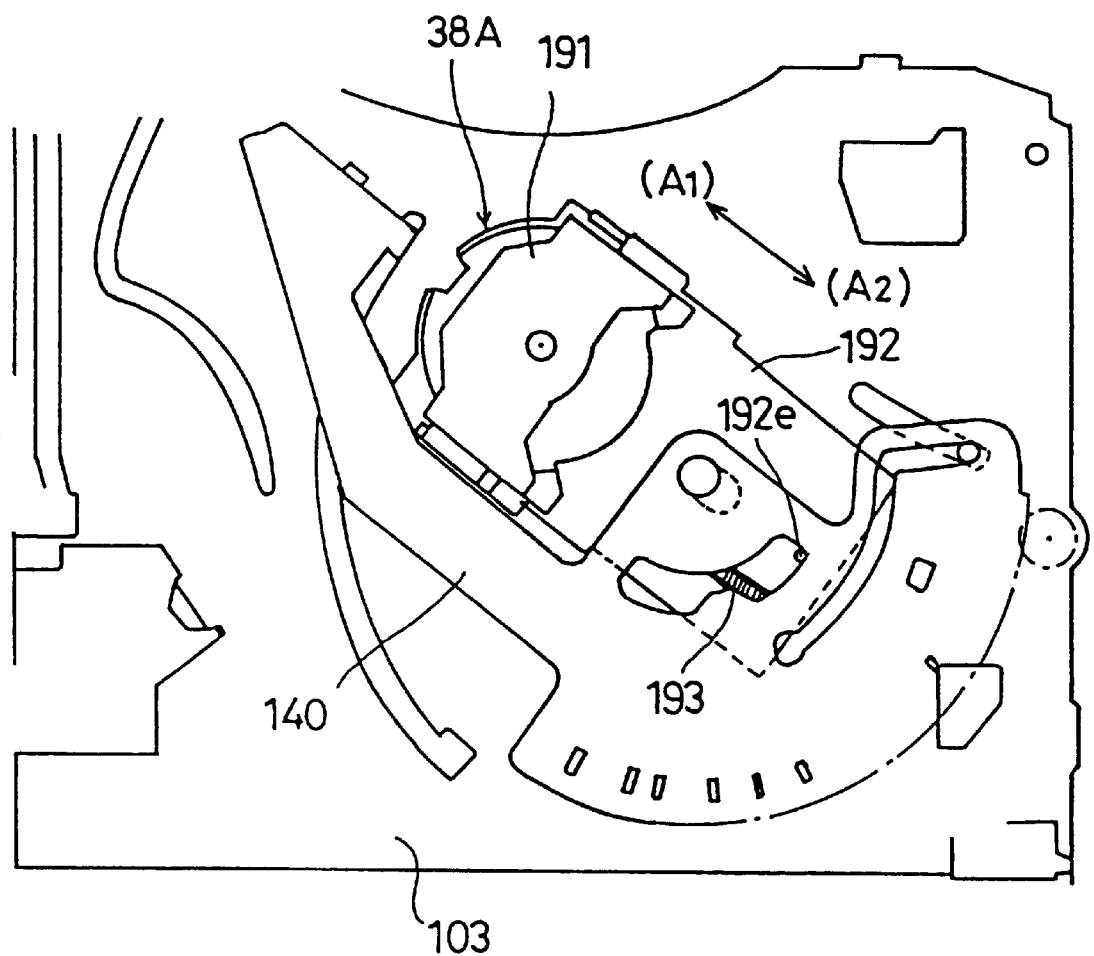
FIG. 39 is a diagram showing a plan view of the disk clamping mechanism.

As shown in FIGS. 38 and 39, the disk clamping mechanism 190 is comprised of a damper holder up-and-down mechanism 107 which moves the damper holder in the up and down directions and a turntable up-and-down mechanism (turntable transfer mechanism) 114 which moves the turntable 37A in the up and down directions.

The disk clamping mechanism 190 functions so as to make the disk 11 difficult to bend during the disk clamping operation.

The turntable up-and-down mechanism 114, as shown in FIG. 38, is comprised of the guiding groove 105c of the vertical plate portion 105b of the sliding member 105 and the pin 104. The turntable up-and-down mechanism 114 moves the turntable 37A in the up and down directions as shown in FIG. 40.

The damper holder up-and-down mechanism 107 is comprised of a damper 38A, a damper holder 191 and a clamp slider 192 as shown in FIG. 38. The clamper 38A includes a pole portion 38Aa and a flange portion 38Ab. An annular groove 38Ac is formed at a portion around the pole 38Ac and below the flange portion 38Ab.

The damper holder 191 has a central hole 191a, pins 191b and 191c at one side and a pin 191d at the other side.

The annular groove portion 38Ac is engaged with the central hole 191a and the damper 38A is supported by the damper holder 191. The width w1 of the annular groove portion 38Ac in the Z direction is smaller than the thickness t1 of the damper holder 191. There is an additional space (corresponding to the size t1-w1) provided in the axis direction of the damper 38A with respect to the damper holder 191.

The damper holder 191 may be moved in the Z1 and Z2 directions by engaging the pins 191b, 191c and 191d with the guiding grooves 103d, 103e and 103f, respectively. The damper 38A is projected from the lower surface of the chassis 103 via the opening 103a.

The clamp slider 192 includes a fork portion 192a at one end and a pin portion 192e at the other end. Cam grooves 192b, 192c and 192d are provided with the fork portion 192a. The cam grooves 192b, 192c and 192d, respectively, are engaged with the pins 191b, 191c and 191d and formed on the chassis 103 so as to be slidably movable in the A3 and A4 directions. The A3 direction extends between Y1 and X2 and the A4 direction extends between Y2 and X1. The pin portion 192e opposes the cam 140f of the loading arm 140.

The clamp slider 192 is pulled in the A4 direction by a coil spring 193.

The cam 140f is comprised of inclining portions 140f-1 and a40f-2 and a top portion 140f-3. The cam groove 192b is comprised of an upper-side portion 192b-1, an inclining portion 192b-2 and a lower-side portion 192b-3.

The clamp slider 192 is positioned at the position P10, P11 and P12 in the A3 and A4 directions by the cam 140f. In this manner, the clamp holder 191 is positioned at a high position Hu, a middle position Hm and a low position Hl (refer to FIG. 18g). The high position Hu is a position at which the damper holder 191 supports the flange portion 38Ab so that the damper 38A is located at a waiting position H10 where it does not interfere with the transfer of the disk 11. The middle position Hm is a position at which the damper 38A is supported at the position H11 where it contacts the disk 11. The low position Hl is a position lower than the flange portion 38Ab of the damper 38A located at the position H11, i.e., a position at which the damper holder 191 is separated from the flange portion 38Ab.

Next, the operation of the disk clamp mechanism 190 will be explained.

FIG. 18G is a diagram for showing the movement of the damper holder 191 and FIG. 18I is a diagram for showing the movement of the turntable 37A.

Firstly, the clamping operation of the disk 11 will be explained.

In the initial state of the disk transfer mechanism 34A as shown in FIG. 33, the clamp slider 192 is located at the position P10 and the damper holder 191 is located at the position Hu. Likewise, the damper 38A is located at the position H10 and the turntable 37A is located at the position H20 where it does not interfere with the transfer of the disk 11 (refer to FIG. 18I).

When the loading arm 140 is rotated in the counterclockwise direction by the motor 174 and the disk 11 is transferred to the reproducing position, the inclining portion 140f-1 of the cam 140f pushes the pin portion 192e and enters the state shown in FIG. 40B. That is, the clamp slider 192 moves in the A3 direction against the biasing force of the spring 193 and reaches the position P11, the inclining portion 192b-2 guides the pin 191b and the clamper holder 191 is located at the middle position Hm. The clamper 38A is located at the position H11.

In this state, the turntable up-and-down mechanism 114 is operated as shown in FIG. 40C and the turntable 37A is moved upward to reach the position H21 where it supports the disk 11. At that time, a magnet 37Ac contained in the turntable 37A attracts iron plates 38Ad in the clamper 38A and the disk 11 is clamped on the turntable 37A.

As mentioned above, by moving the turntable 37A in the upward direction after locating the clamper 38A at the clamping position, it becomes possible to carry out the clamping operation using the magnetic attraction of the magnet 37Ac effectively.

Then, the loading arm 140 is further rotated in the counterclockwise direction and enters the state shown in FIG. 40D. That is, the top portion 140f-2 of the cam 140f pushes the pin portion 192e and the clamp slider 192 is further moved in the A3 direction to reach the position P12. The lower-side portion 192b-3 guides the pin 191b and the clamper holder 191 is located at the position Hl so as to be separated from the flange portion 38Ab and positioned in the annular groove portion 38Ac.

Next, a case in which the disk 11 is shifted from the reproducing position more than a predetermined distance will be explained.

Figure 41A:
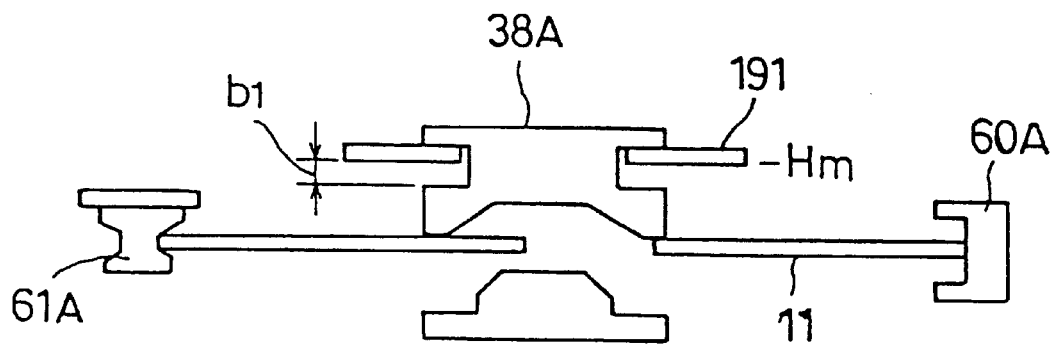
FIGS. 41A and 41B are diagrams showing a case in which a disk is not clamped correctly.
Figure 41B:
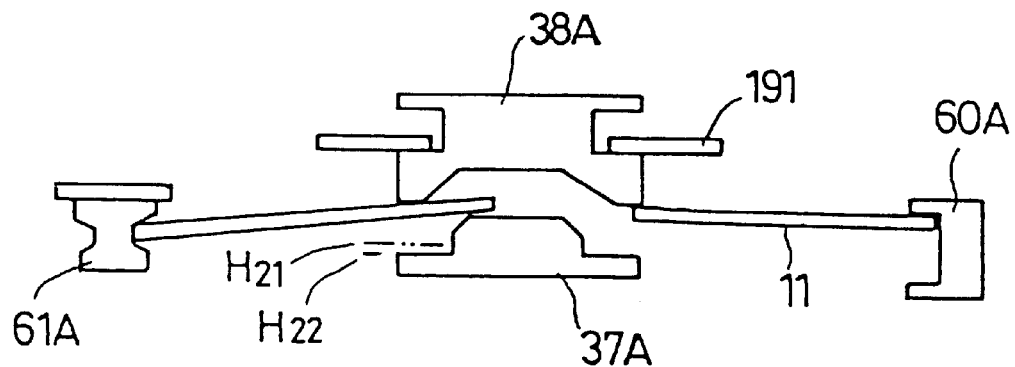

When the turntable 37A is moved upwardly, it pushes the portion around the central hole of the disk 11 and deforms or bends the disk 11 as shown in FIG. 41B.

The damper holder 191 is already positioned at the middle position Hm as shown in FIG. 41A and the length of the damper 38A to be deformed in the Z1 direction is restricted to b1. Thus, the movement of the turntable 37A in the upward direction is restricted to the position H22 as shown in FIG. 41B.

Accordingly, the degree of the deformation of the disk 11 around the central hole is lowered compared with a case in which the turntable 37A is moved upwardly to the position H21.

Next, the releasing operation of the clamping of the disk 11 will be explained.

When the loading arm 140 is rotated in the clockwise direction due to the reversed rotation of the motor 174, the inclining portion 140f-2 of the cam 140f pushes the pin portion 192e and enters the state shown in FIG. 42A. That is, the clamp slider 192 moves in the A3 direction to reach the position P11 and the inclining portion 192b-2 guides the pin 191b. The damper holder 191 is located at the middle position Hm so as to support the flange portion 38Ab of the damper 38A. The damper 38A is located at the position H11.

In this state, the periphery 11a of the disk 11 is held as shown in FIG. 42b and the turntable 37A is moved in the downward direction by the turntable up-and-down mechanism 114. Thus, the turntable 37A is separated from the damper 38A and reaches the position H20 to release the clamping of the disk 11.

When the turntable 37A is moved downwardly, the iron plates 38Ad in the damper 38A are separated from the magnet 37Ac contained in the turntable 37A. However, due to the magnetic force of the magnet 37Ac, the iron plates 38Ad are attached to the magnet 37Ac until the last moment. Therefore, the damper 38A is deformed downwardly according to the movement of the turntable 37A. When the damper 38A is deformed downwardly, the disk 11 whose periphery 11a is held by the damper 38A is also deformed. According to the present invention, however, the damper holder 191 is located at the middle position Hm to support the flange portion 38Ab of the damper 38A and the movement of the damper 38A in the downward direction is restricted. Thus, the disk 11 is not deformed upon releasing of the clamping condition.

After that the loading arm 140 is further rotated in the clockwise direction to enter the state shown in FIG. 42C. That is, the pin portion 192e reaches the lower portion of the cam 140f and passes over the top portion 140f-2. Thus, the clamp slider 192 moves in the A4 direction to reach the position P10. The upper-side portion 192b-1 guides the pin 191b and the damper holder 191 reaches the position Hu. The damper 38A is moved in the upward direction and reaches the position H10 so as to come up from the disk 11.

Figure 43:
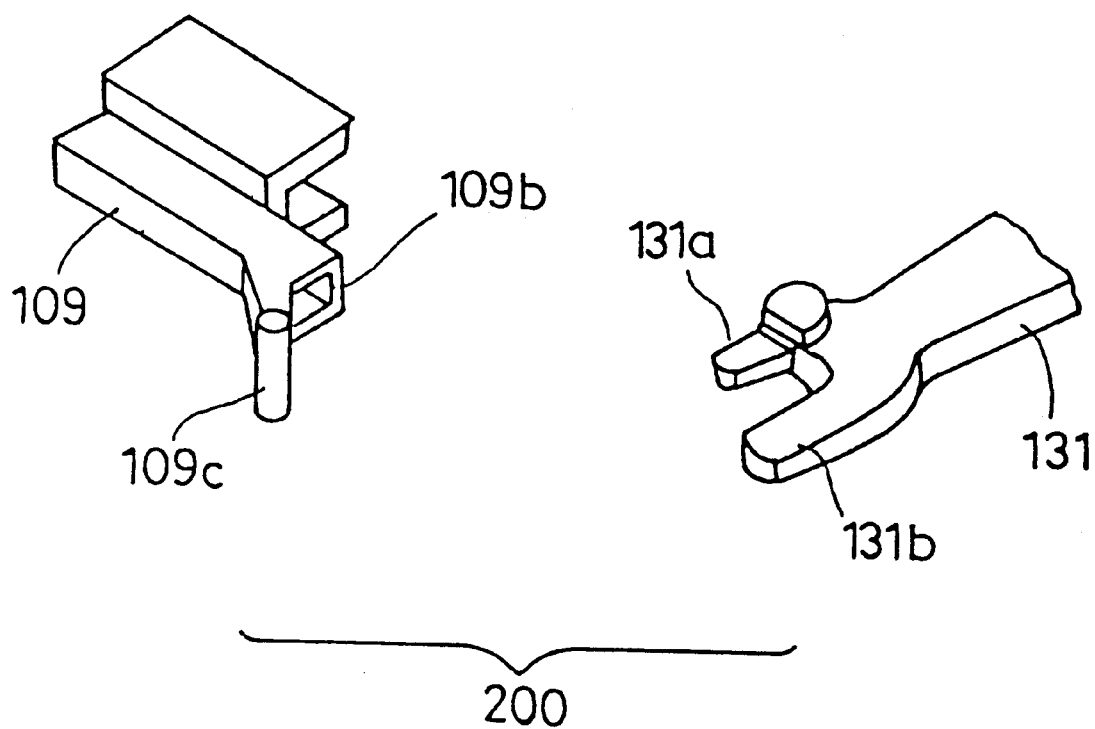
FIG. 43 is a diagram showing main parts of a coupling mechanism.

[Coupling Mechanism of the Disk Reproducing Unit 30A and Disk Accommodating Unit 33A] (refer to FIGS. 43 and 44)

The disk reproducing apparatus 30A includes a coupling mechanism 200. The coupling mechanism 200 functions so as to mechanically couple the disk reproducing unit 32A and the disk accommodating unit 33A so that the rotation mechanism 35A is not operated when the disk transfer mechanism 34 A is operated. That is the coupling mechanism functions so as to not rotate the disk reproducing unit 32A and the disk accommodating unit 33A.

As shown in FIG. 43, the coupling mechanism 200 is comprised of a concave portion 109b located at the end of the ejection lever 109 and the holding portion 131a located at the end of the stock arm 131. That is, the coupling mechanism 200 may be constructed without using any special parts.

Figure 44A:
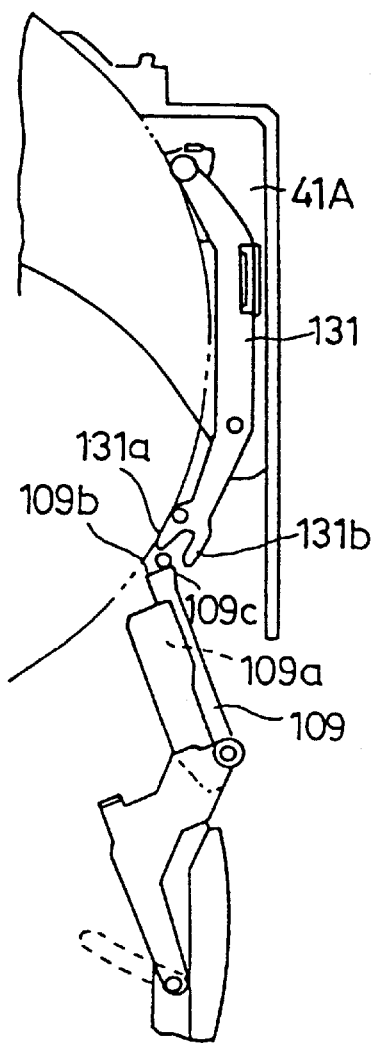
FIGS. 44A through 44C are diagrams showing an operation of the coupling mechanism.

When the disk transfer mechanism 34A is in the initial state shown in FIG. 33, the ejection lever 109 is located at the position shown in FIG. 44A and the ejection lever 109 and the stock arm 131 are not coupled. Thus, the disk reproducing unit 32A and the disk accommodating unit 33A are not coupled and may be rotated freely. That is, if the rotation mechanism 35A is operated, the disk reproducing unit 32A and the disk accommodating unit 33A are rotated.

If the disk transfer mechanism 34A is operated after the rotation mechanism 35A is actuated so that the disk reproducing unit 32A is rotated to the position opposing a predetermined disk accommodating part 41A of the disk accommodating unit 33A, the ejection lever 109 starts to rotate in the M1 direction. Then, the end 109c of the ejection lever 109 pushes the hooking portion 131b and the stock arm 131 is rotated in the N1 direction.

Figure 44B:
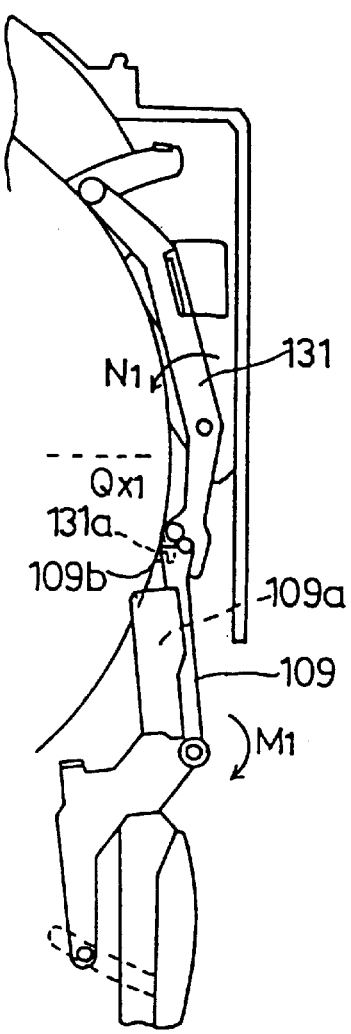
Figure 44C:
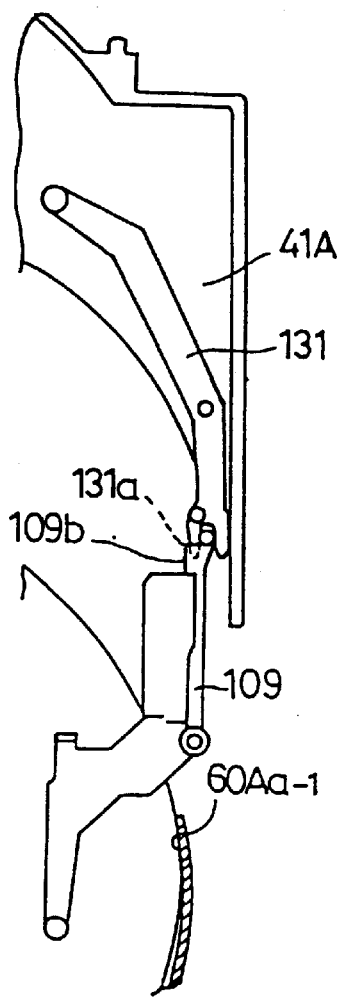

When the ejection lever 109 starts to rotate in the M1 direction, the concave portion 109b starts to engage with the holding portion 131a of the stock arm 131 as shown in FIG. 44B. The ejection lever 109 and the stock arm 131 are rotated to the position shown FIG. 44C so that the holding portion 131a is deeply engaged with the concave portion 109b. In this manner, the ejection lever 109 and the stock arm 131 are mechanically coupled, and hence the disk reproducing unit 32A and the disk accommodating unit 33A are also mechanically coupled.

In the above mentioned state, a rotation of the disk reproducing unit 32A and the disk accommodating unit 33A are prohibited. Thus, although it is programed that the rotation mechanism 35A is non-operatable by controlling the electric current when the disk transfer mechanism 34A is operated, the disk reproducing unit 32A and the disk accommodating unit 33A are not rotated even when the control is interfered with by electric noises, etc. Thus, it is possible to firmly maintain the positional relationship between the disk reproducing unit 32A and the disk accommodating unit 33A. Accordingly, the disk transfer operation of the disk transfer mechanism 34A may be smoothly operated.

Also, it is possible to prevent the collision of the disk 11, which is transferred to outside of the disk accommodating unit 33A, with another disk to damage the disks. Thus, the disk reproducing unit 32A may be provided closer to the disk accommodating unit 33A as shown in FIG. 13 according to the present invention. Accordingly, the size L10 of the disk reproducing apparatus 30A is relatively short. Also, since the size L10 of the disk reproducing apparatus 30A is relatively short, the distance for transferring the disk 11 is shortened and the time required for the disk 11 is reduced.

Moreover, the structure of the coupling mechanism 200 may be modified so that the end of the ejection lever 109 hooks a portion of the parting plate 130 of the disk accommodating unit 33A.

Figure 45:
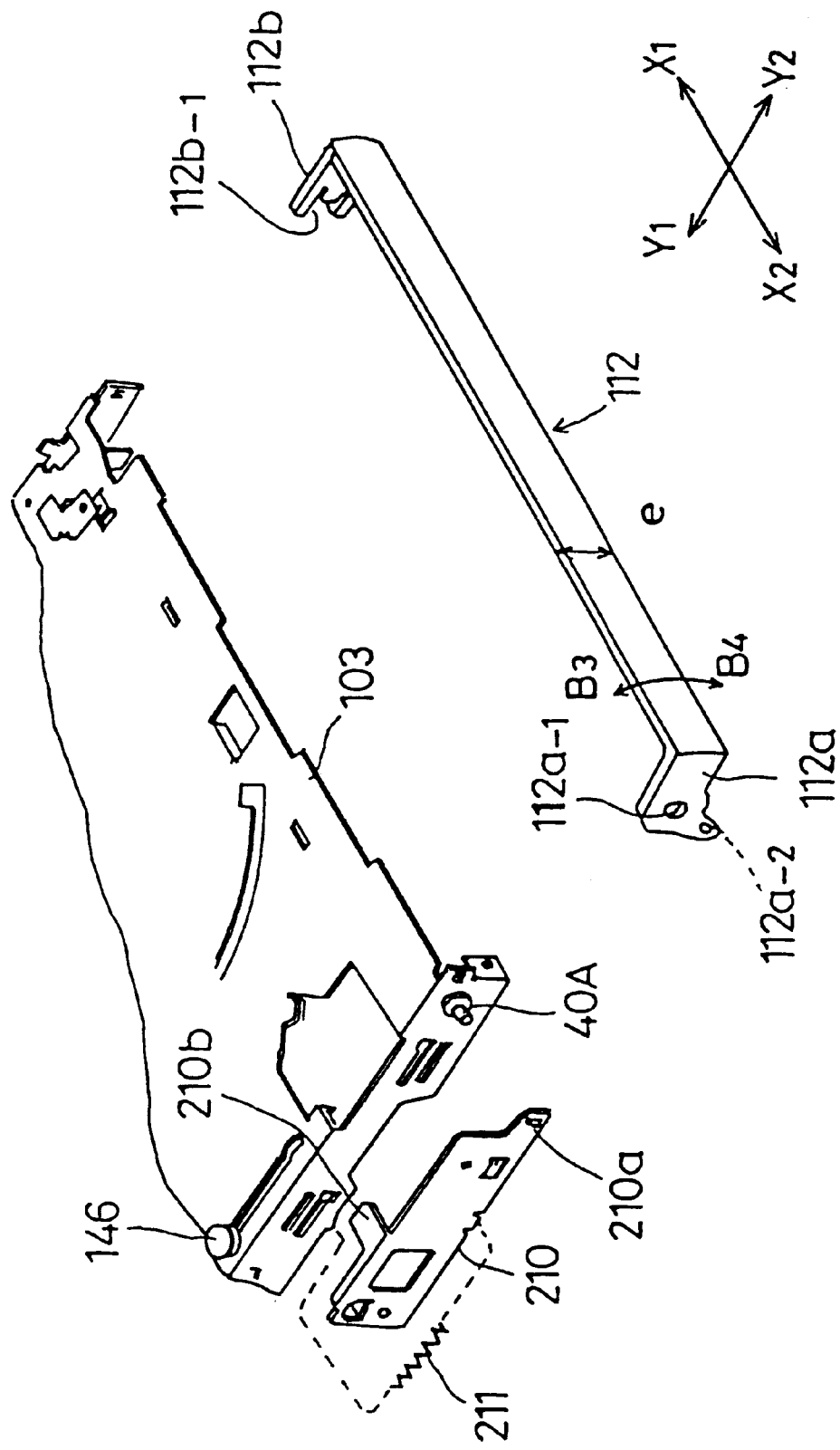
FIG. 45 is a diagram showing an exploded perspective view of a flap opening mechanism.

[Flap 112 and Flap Opening Mechanism 113] (refer to FIGS. 45 through 47)

Figure 46B:
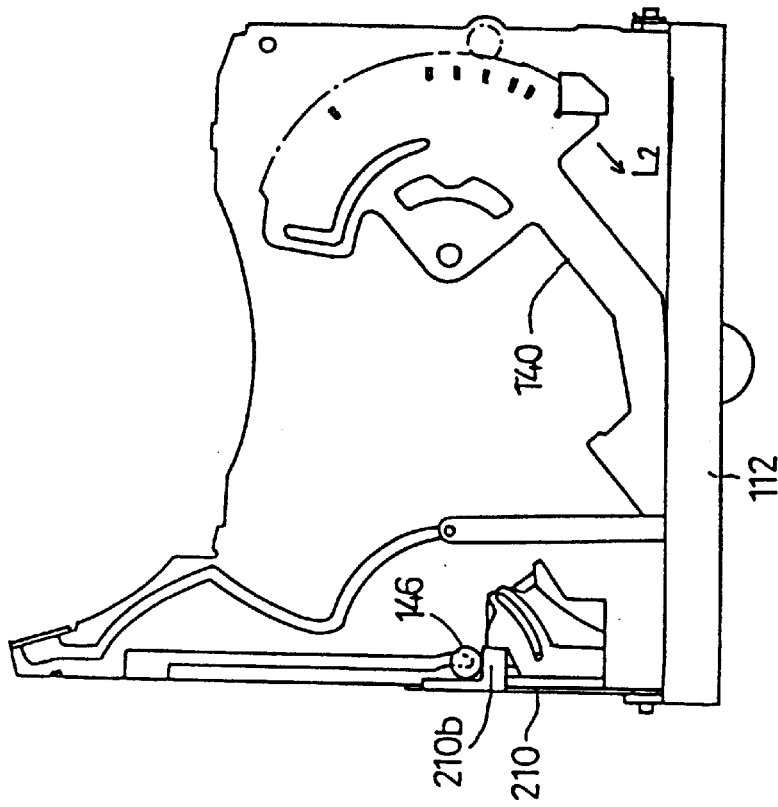
FIG. 46B is a diagram showing a closing state of the flap.
Figure 46A:
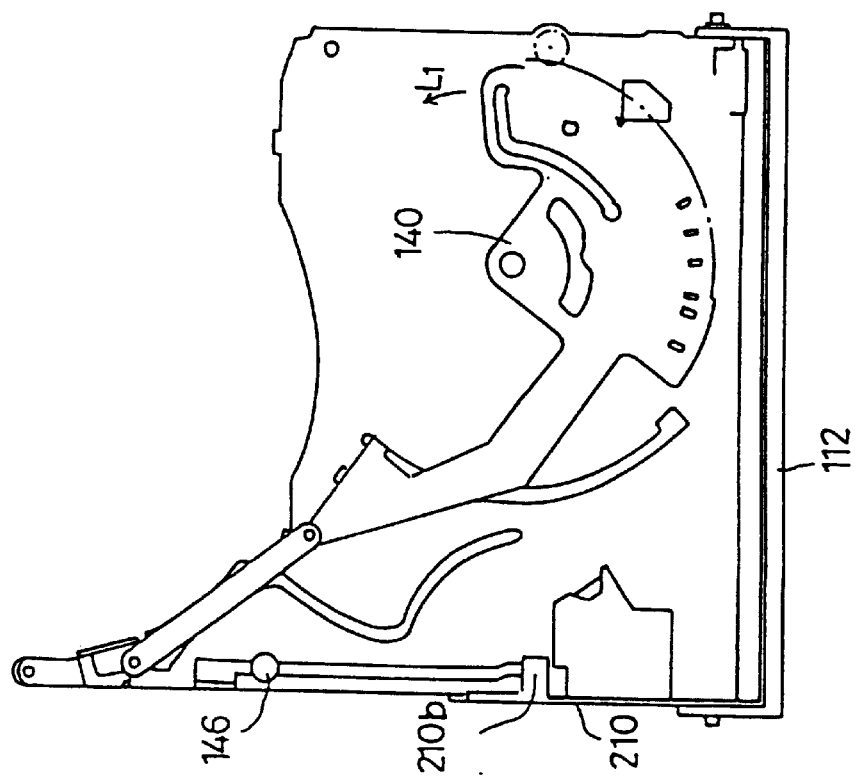
FIG. 46A is a diagram showing an opening state of a flap.

As shown in FIGS. 45 and 46A, the flap 112 is rotatably provided in the B3 and B4 directions by engaging a hole 112a-1 of the arm portion 112a with the pin 40A of the chassis 103 and a portion 112b-1 of the arm portion 112b with the pin 40Aa.

Figure 47A:
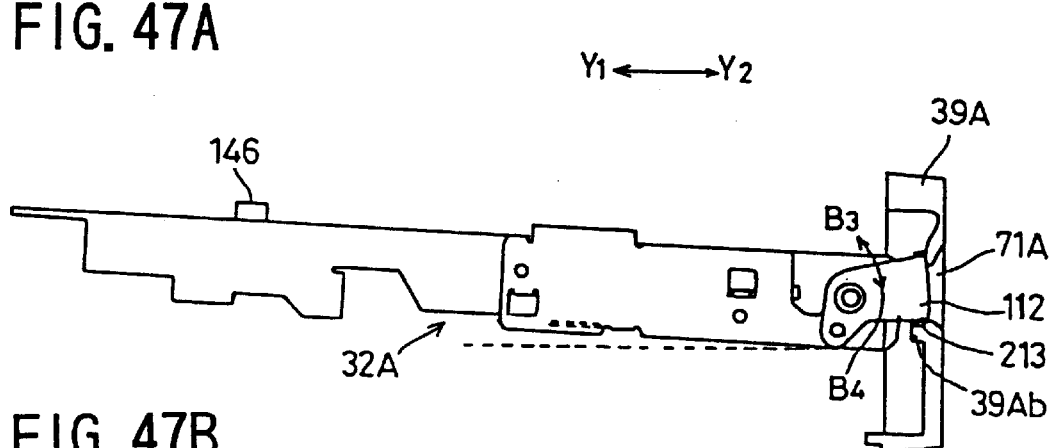
FIGS. 47A through 47C are diagrams showing a state of the flap when the disk reproducing unit is moved.
Figure 47B:
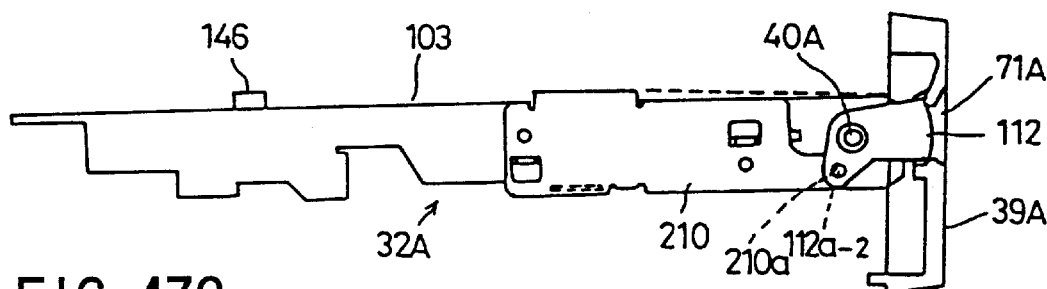

The slider 210 is slidably provided in the Y1 and Y2 directions with the side surface of the chassis 103. The hole 210a of the slider 210 is engaged with the pin portion 112a-2 of the arm portion 112a of the flap 112 so that the slider 210 is coupled with the flap 112. The slider 210 is pulled by the spring 211 in the Y1 direction and the flap 112 is pulled in the B4 direction. In this state, the flap 112 closes the opening 71A of the front bezel 39A as shown in FIGS. 47A and 47B.

The slider 210 includes a finger portion 210b. The finger portion 210b is projected to a position above the chassis 103, where it may be pushed by the pin 146.

Figure 47C:
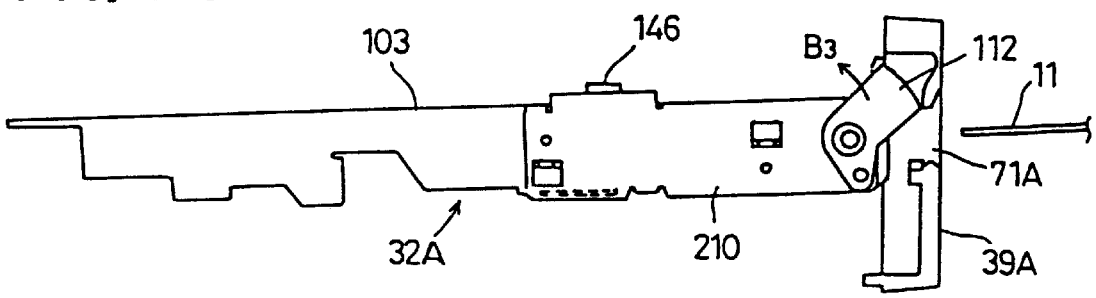

When the disk transfer mechanism 34A is operated so as to eject the disk 11 from the disk reproducing apparatus 30A, the pin 146 which has been moved in the Y2 direction pushes the finger portion 210b at the last moment, i.e., just before the disk 11 is ejected, as shown in FIGS. 46B and 47C. Thus, the slider 210 is moved in the Y2 direction against the spring 211 and the flap 112 is rotated in the B3 direction to open the opening 71A of the front bezel 39A. When the opening 71A of the front bezel 39A is opened, the disk 11 is immediately ejected from the opening 71A.

Here, the state in which the flap 112 closes the opening 71A of the front bezel 39A is considered.

The flap 112 is fixed to the chassis 103 of the loading assembly 100 and pulled in the B4 direction by the spring 211 via the slider 210. The flap 112 contacts a sponge 213 on a receiving portion 39Ab which is projected to the back of the opening 71A of the front bezel 39A.

For this reason, the flap 112 is continuously in contact with the sponge 213 by the movement of the slider 210 when the rotation mechanism 35A is operated and the disk reproducing unit 32A is moved around the pins 40A and 40Aa as shown in FIGS. 47A and 47B. That is, a vibration associated with the movement of the disk reproducing unit 32A is absorbed by the sliding movement of the slider 210 and the flap 112 is kept in contact with the sponge 213 of the receiving portion 39Ab. Thus, the opening 71A of the front bezel 39A is kept closed by the flap 112. Accordingly, the positional relationship between the flap 112 and the front bezel 39A is not changed when the disk reproducing unit 32A is vibrated, and hence it is not necessary to increase the size (height) of the flap 112. Therefore, the size reduction of the disk reproducing apparatus 30A may be achieved.

Also, since the flap 112 is always in contact with the sponge 213 of the receiving portion 39Ab, no space is generated between the flap 112 and the sponge 213. Thus, the opening 71A of the front bezel 39A of the disk reproducing apparatus 30A has an excellent anti-dust property.

Moreover, since the flap 112 is located at the back of the front bezel 39A and the flap 112 is not in the way, it is easy to pull out the disk 11 from the disk reproducing apparatus 30A.

Figure 48:
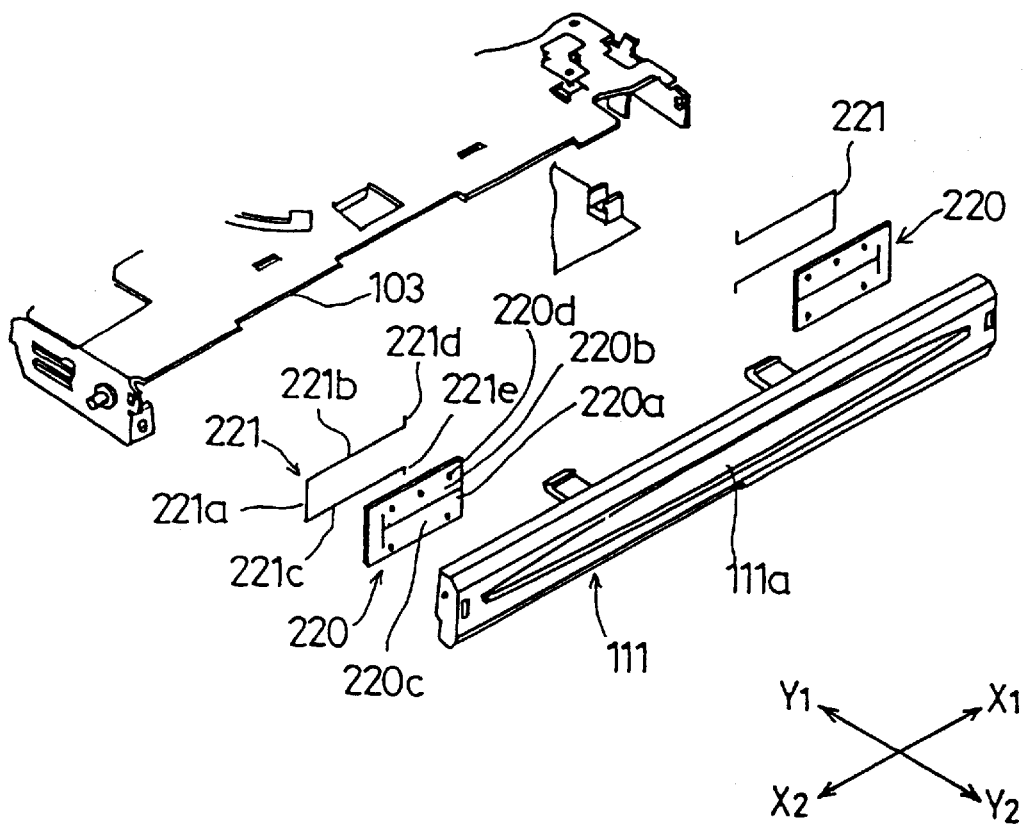
FIG. 48 is a diagram showing an exploded perspective view the structure around a disk inlet member.

[Structure Around Disk Inlet Member 111] (refer to FIGS. 48 through 50)

The structure of the disk inlet member 111 is the main feature of the present invention.

Figure 49A:
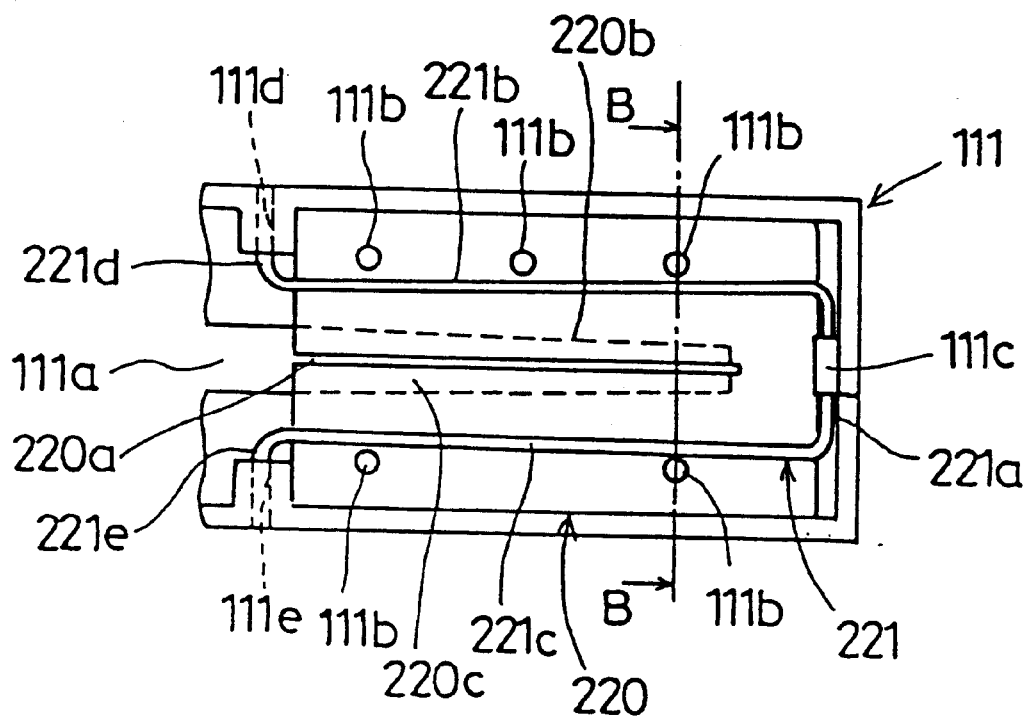
FIGS. 49A and 49B are diagrams showing a fixing state of a disk supporting member.
Figure 49B:
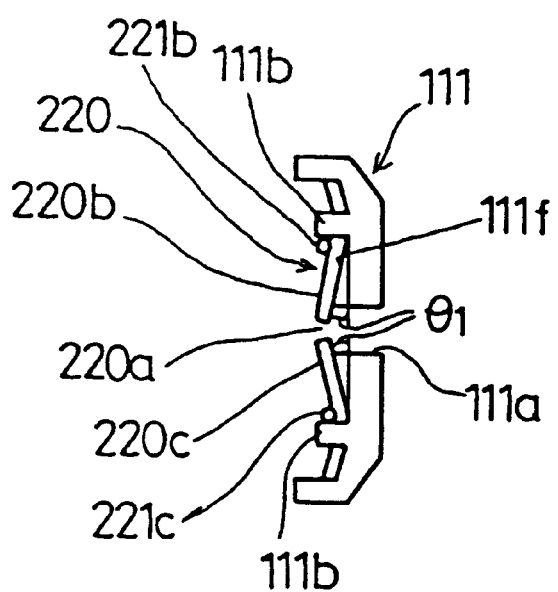

As shown in FIGS. 48, 49A and 49B, a disk supporting member 220 is fixed to the back of the X1 and X2 ends of the disk inlet member 111 which is made of resin. The disk inlet member 111 is fixed to the chassis 103.

The disk supporting member 220 may be made of a sheet-type felt and a slit 220a of a T-shape is formed therein. A pair of wing portions 220b and 220c are formed by the slit 220a. Each of the wing portions 220b and 220c may be elastically deformed. Also, a plurality of holes 220d corresponding to the plurality of projections 111b located at the back of the disk inlet member 111 are formed in the disk supporting member 220.

A fixing member 221 is provided and it is comprised of three arm portions 221a, 221b and 221c, which are formed by bending a wire in a U-shape, and end portions 221d and 221e extending from the arm portions 221b and 221c, respectively, and curved toward the outside.

As shown in FIG. 49A, a hook portion 111c and holes 111d and 111e for fixing the fixing member 221 are provided at the back of the disk inlet member in addition to the above-mentioned projections 111b.

The position of the disk supporting member 220 is determined by engaging the holes 220d with the projections 111b so that the slit 220a and the wing portions 220b and 220c are located in the inlet 111a of the disk inlet member 111. The fixing member 221 is fixed by hooking the arm portion 221b to the hook portion 111c and inserting the end portions 221d and 221e in the holes 111d and 111c, respectively.

The arm portions 221b and 221c extend in the transverse direction so as to hold the disk supporting member 220 and the disk supporting member 220 is firmly fixed just like an adhesive composition is used.

Figure 50A:
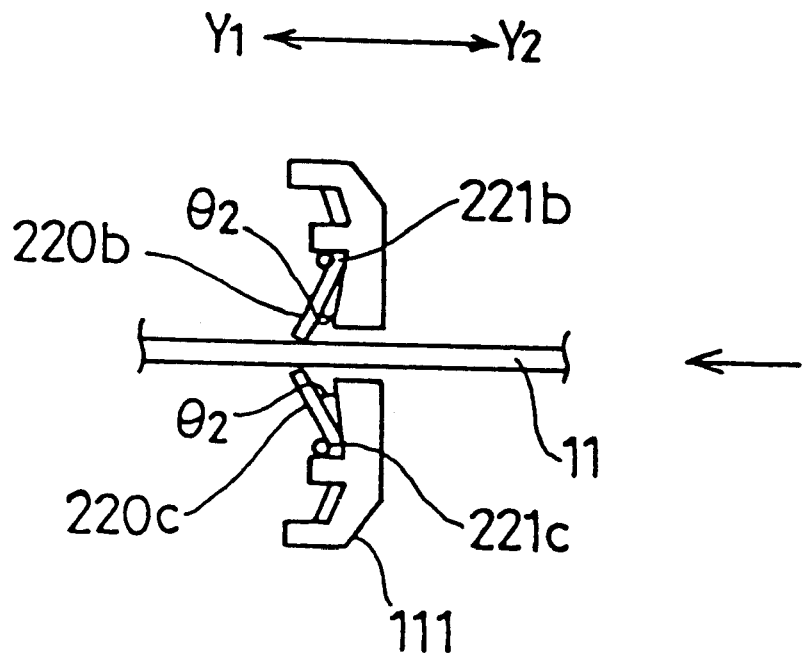
FIG. 50A is a diagram showing a state of the disk supporting member when a disk is inserted.
Figure 50B:
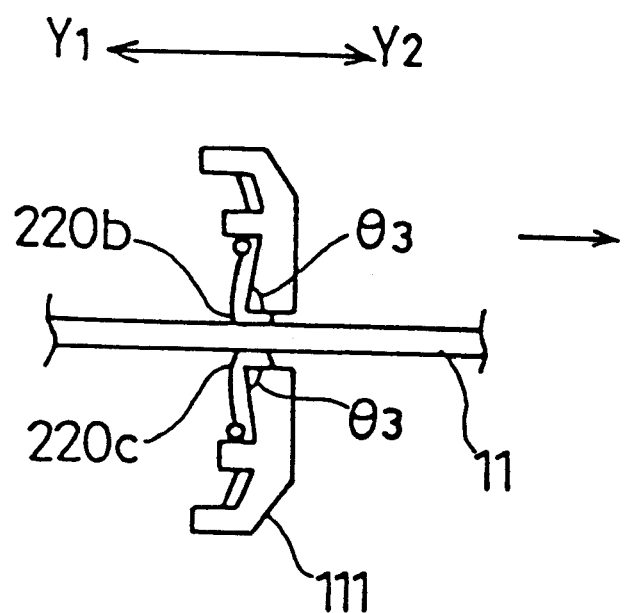
FIG. 50B is a diagram showing a state of the disk supporting member when a disk is ejected.

Here, the wing portions 220b and 220c of the disk supporting member 220 are elastically deformed as shown in FIG. 50A when the disk 11 is inserted. The deformed wing portions 220b and 220c support the disk 11 by the elastic restoring force thereof. When the disk 11 is ejected, the wing portions 220b and 220c are elastically deformed as shown in FIG. 50B to support the disk 11 as in the case when the disk 11 is inserted. As mentioned above, the disk support member 220 is worn every time the disk 11 is inserted or ejected. Therefore, the disk supporting member 220 should be exchanged after a certain time period after starting to use the disk reproducing apparatus 30A.

According to the present invention, the fixing member 221 may be easily taken out by pulling the end portions 221d and 221e from the respective holes 111d and 111e. By taking out the fixing member 221, the disk supporting member 220 may be taken out and exchanged for a new one. Thus, there is no need to exchange the disk inlet member 111.

Also, the back surface of the disk supporting member 220 is inclined in the Y1 direction as it comes closer to the inlet 111a. The wing portions 220b and 220c are inclined by an angle $\theta 1$ in the Y1 direction with respect to a vertical axis.

For this reason, when the disk 11 is inserted, the bent angle of the wing portions 220b and 220c becomes $\theta 2$ as shown in FIG. 50A. The angle $\theta 2$ is smaller than the bent angle of conventional wing portions by $\theta 1$ which are provided vertically with respect to the insertion direction of a recording medium. Accordingly, the elastic restoring force of the bent wing portions 220b and 220c is relatively small and the resisting force (the force works against the insertion of the disk 11) of the bent wing portions 220b and 220c are reduced. Thus, the insertion operation of the disk 11 may be performed with a lower insertion force and increased ease.

Also, the (bent) center of the wing portions 220b and 220c, respectively, is a position pressed by the arm portions 221b and 221c, which is apart from the periphery of the inlet 111a. In a conventional apparatus in which the wing portions are adhered, the (bent) center is located at the periphery of the inlet 111a. From this point of view also, the bent angle of the wing portions 220b and 220c, respectively, becomes smaller and a lower insertion force is required for an insertion operation.

Moreover, when the disk 11 is ejected and/or the ejected disk 11 is pulled out, the bent angle of the wing portions 220b and 220c, respectively, becomes $\theta 3$ as shown in FIG. 50B. The angle $\theta 3$ is bigger than the bent angle of conventional wing portions by $\theta 1$ which are provided vertically with respect to the ejection direction of a recording medium. Accordingly, the elastic restoring force of the bent wing portions 220*b* and 220*c* is relatively large and the force of the bent wing portions 220*b* and 220*c* to hold and support the disk 11 is increased. Thus, even when operator's fingers are accidentally separated from the disk 11 during a pulling out operation of the disk 11, the disk 11 is firmly supported by the bent wing portions 220*b* and 220*c*. Thus, accidents such as a falling of the disk 11 will not occur.

In addition, the disk supporting member 220 may be made of rubber or sponge. Further, the disk supporting member 220 may also be used for supporting card-type recording media.

Figure 51:
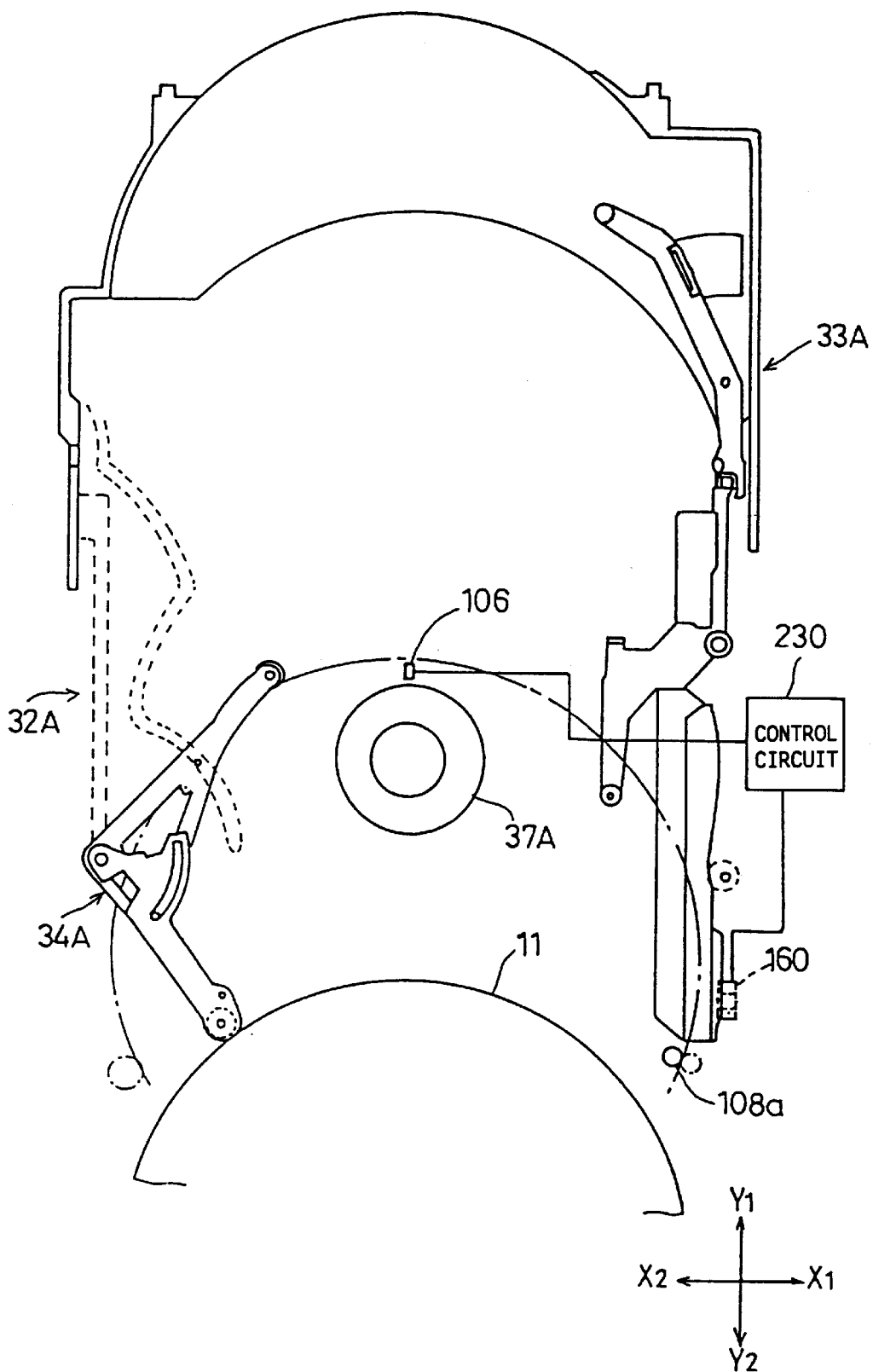
FIG. 51 is a diagram showing a state in which a disk is inserted.

[Operation When Operator Forcibly Pulls Out Disk 11 Upon Insertion of the Disk 11 After the Disk Transfer Mechanism 34A is Actuated] (refer to FIGS. 51 through 53)

As shown in FIGS. 7 and 51, when the disk 11 is accommodated in the disk accommodating unit 33A, the disk insertion detection switch 160 is turned on as approximately three-fourths of the disk 11 is inserted in the disk reproducing apparatus 30A as shown in FIGS. 52A and 52B. Then, when substantially the entire disk 11 is inserted in the disk reproducing apparatus 30A, the detector 106 is turned on and the disk detection switch 160 is turned off.

There may be an occasion in which an operator notices a wrong disk is inserted or changes his/her mind to reproduce another disk when the disk insertion detection switch 160 is turned on or the detector 106 is turned on and tries to forcibly pull out the disk. The disk reproducing apparatus 30A according to the present invention has means to prepare for such occasion.

The means checks the state of the disk insertion detection switch 160 and the detector 106 after a time required for the disk insertion detection switch 160 to be turned off has elapsed, i.e., a little after the actuation of the operation of the disk transfer mechanism 34A. If the disk insertion detection switch 160 is turned off and the detector 106 is turned on, it is determined that the state is normal and the disk transfer operation is continued. If states other than that is observed, it is determined that something is wrong and an error signal is generated and the disk transfer mechanism 34A is returned to the initial ejection state, i.e., the disk insertion waiting state.

FIG. 53 is a flowchart of a microcomputer which constructs the control circuit 230 shown in FIGS. 2 and 51.

When it is determined that the disk insertion detector 106 is turned on (ST2), the loading motor 174 is rotated in the reverse direction (ST4). When it is determined that the slit 140*g*-3 is detected (ST5), it is determined if the disk insertion detection switch 160 is turned off (ST7). If 'yes', then it is determined if the disk insertion detector 106 is turned off (ST 10). If 'yes', then it is determined if the slit 140*g*-7 is detected (ST12). If 'yes', then the loading motor 174 is stopped (ST13).

If the result is 'no' in (ST7) or in (ST10), an error signal is generated (ST14).

The photo-diode of the detector 106 is controlled to be turned on for just a required amount of time in (ST1), (ST3), (ST9), and (ST11). Also, the photo-diode of the disk insertion detection switch 106 is controlled to be turned on for just a required amount of time in (ST6) and (ST8). In FIG. 53, the numeral 231 indicates the time that the photo-diode of the detector 106 is turned on. The photo-diodes of the disk insertion detection switch 160 and the detector 106 are turned on for a period necessary for the detection operation. Accordingly, the consumption of electricity may be reduced.

The slit 140*g*-3 is detected just before the flap 112 is closed and, if the loading is performed normally, when the entire disk is contained in the apparatus. Thus, the disk cannot be pulled out after the slit 140*g*-3 is detected, and hence it is possible to securely protect the disk.

Also, since the determination is made before the flap is closed, it is possible to prevent the disk being pulled out from colliding against the closing flap 112. Moreover, the determination is made before the clamping (the slit 140*g*-5), it is possible to prevent the disk being pulled out from colliding against the turntable.

Although the present invention is described for the CD-ROM, it is possible to apply the same principle to other disks such as MD and DVD.

A description will now be given of another embodiment of the peripheral structure of the disk inlet member 111 with reference to FIGS. 54 through 60B, in which parts that are the same as those shown in the previously described figures are given the same reference numbers.

Figure 54:
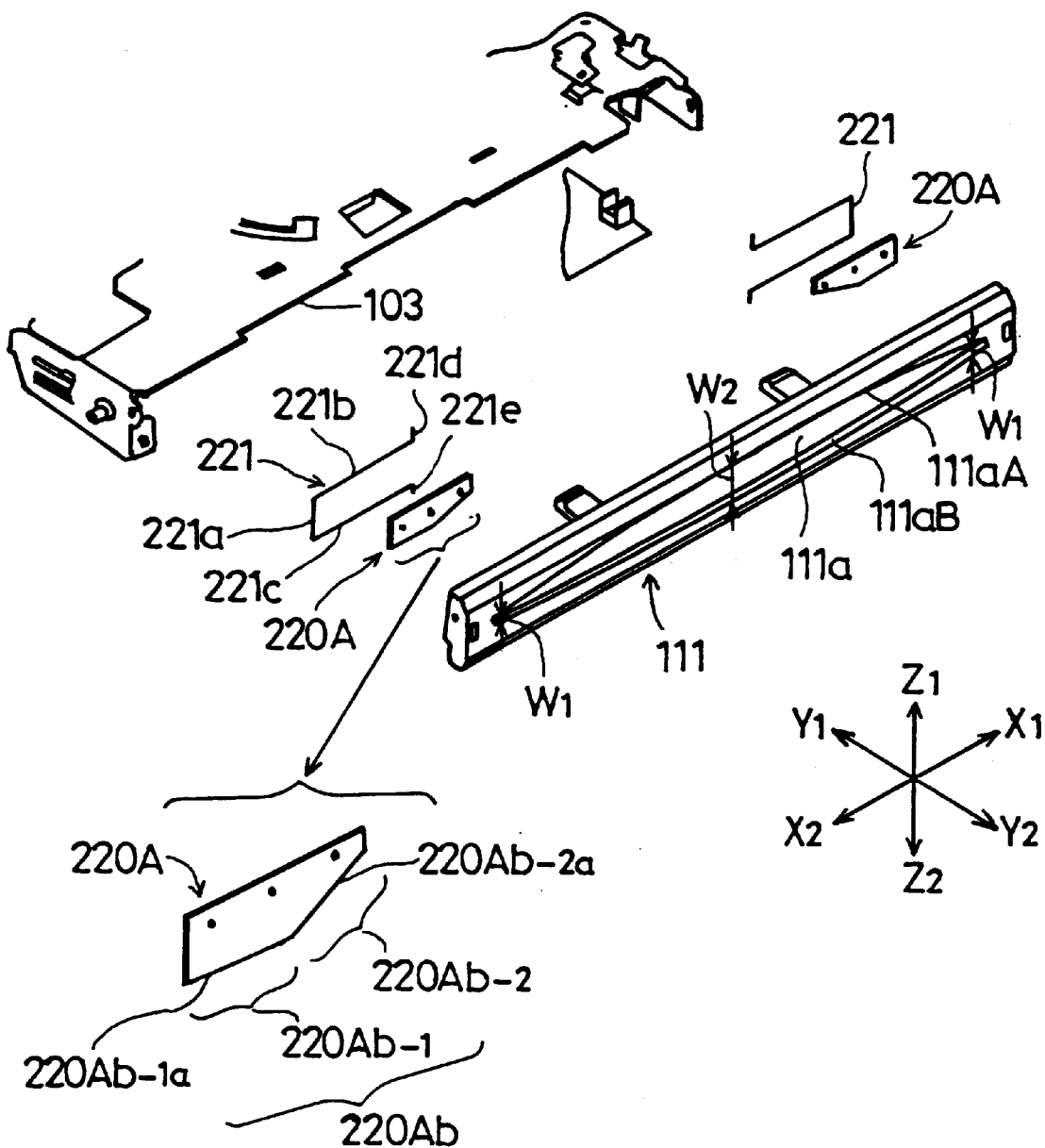
FIG. 54 is an exploded perspective view of a peripheral structure of the disk inlet member.

As shown in FIG. 54, the peripheral structure of the disk inlet member 111 has disk supporting members 220A arranged in the direction X1-X2. The disk 11 is inserted into the disk inlet 11*a* with the horizontal attitude in which the recording surface faces down.

As shown in FIG. 54, the disk inlet 111*a* of the disk inlet member 111 has a slender shape extending in the direction X1-X2. The disk inlet 111*a* has a length in the direction X1-X2 and a width in the direction Z1-Z2. The disk inlet 111*a* has an upper edge 111*a*A and a lower edge 111*a*B, which face each other in the width direction and extend in the length direction X1-X2. The lower edge 111*a*B faces the recording surface 11*a* of the disk 11, which can be inserted and ejected. The lower edge 111*a*B is curved in the direction Z2 (in the downward direction) towards the center of the disk inlet from the extreme ends thereof facing in the direction X1-X2. In other words, the lower edge 111*a*B of the disk inlet 111 is curved so that the distance from the imaginary line connecting the extreme ends of the disk inlet 111 to the lower edge measured in the direction Z2 increases as the position on the imaginary line becomes closer to the center of the disk inlet 111. Hence, the disk inlet 111*a* has the minimum width w1 at the extreme ends thereof has a width which gradually increases as the width measuring location becomes closer to the center. The maximum width w2 of the disk inlet 111*a* is obtained in the center. The upper edge 111*a*A is curved in the counterpart formation of the lower edge 111*a*B so that the curved shapes of the edges 111*a*A and 111*a*B are symmetrical to each other.

Each of the disk supporting members 220A has a sheet shape made of felt, and has a wing part 220Ab, which includes a rectangular portion 220Ab-1 and a triangular portion 220Ab-2, which are arranged integrally side by side. The rectangular portion 220Ab-1 has an edge 220Ab-1*a* extending in the direction X1-X2. The triangular portion 220Ab-2 has an edge 220Ab-2*a* extending obliquely.

Figure 55A:
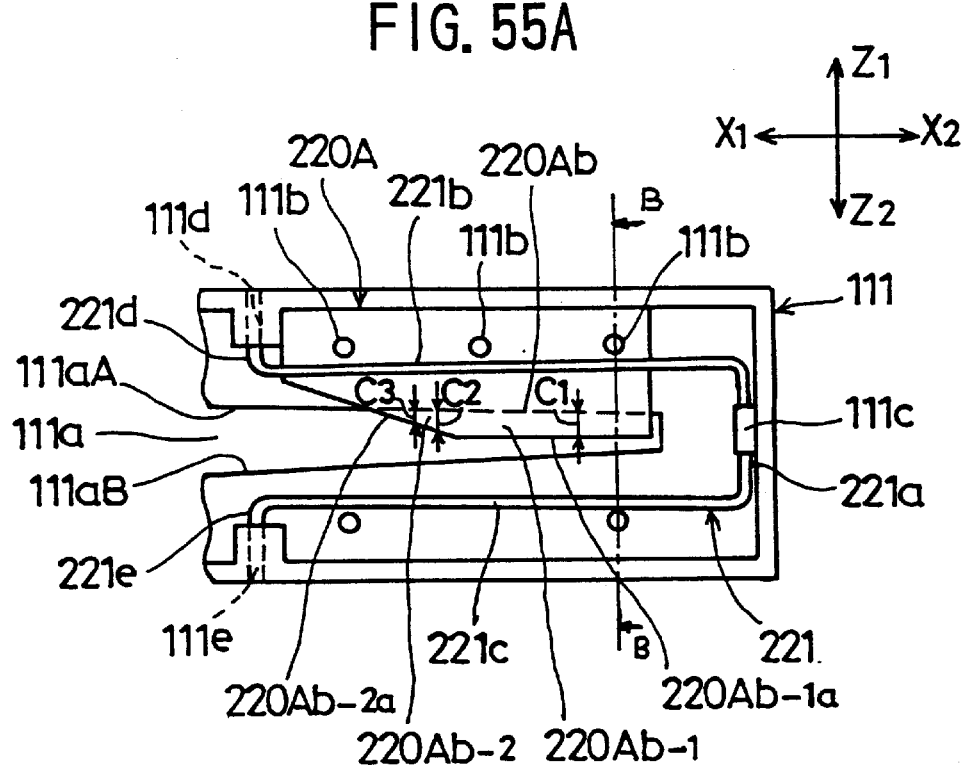
FIGS. 55A and 55B are diagrams showing an attachment of a disk supporting member.
Figure 55B:
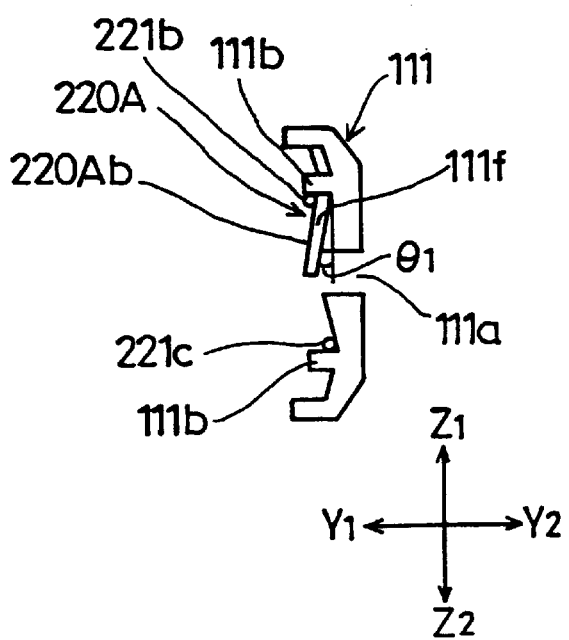

As shown in FIGS. 55A and 55B, the disk supporting member 220A is positioned so that the projections 111*b* are fit in the holes 220*d*, and is attached to the disk inlet member 111 at side positions in the longitudinal direction in such a way that the disk supporting member 220A is pushed against the back surface 111*f* of the disk inlet member 111 by the fixing member 221. In a state different from the state shown in FIGS. 49A and 49B, the disk supporting members 220A are attached to portions which are offset in the direction Z1 (the upper side) with respect to the disk inlet 111*a*, and the wing parts 220Ab protrude from the upper edge 111*a*A and extend in the disk inlet 111*a*.

As shown in FIG. 55A, the rectangular portions 220Ab-1 of the wing parts 220Ab are located close to the extreme ends of the disk inlet 111*a*, and the triangular portions 220Ab-2 thereof are located closer to the center of the disk inlet 111a than the rectangular portions 220Ab-1. The extending portion of each of the wing parts 220Ab, which portion protrudes from the upper edge 111aA and extends in the disk inlet 111a, has a fixed length c1 in the rectangular portion 220Ab-1 and lengths c2 and c3 in the triangular portion 220Ab-2, which lengths c2 and c3 gradually decrease towards the center of the disk inlet 111a.

As shown in FIG. 55B, the wing parts 220Ab contact the back surface 111f of the disk inlet member 111, which back surface 111f is a tapered surface which faces in the direction Y1 as it becomes closer to the inlet 111a. In other words, the wing parts 220Ab are inclined at an angle θ1 in the disk inserting direction Y1 with respect to the direction Z1-Z2 perpendicular to the disk inserting direction Y1 in which the disk 11 is inserted into the disk reproducing apparatus 30A.

A description will now be given of an operation of the wing parts 220Ab of the disk supporting member 220A executed when the disk 11 is manually inserted into the disk inlet 111a and is automatically ejected therefrom.

Figure 56:
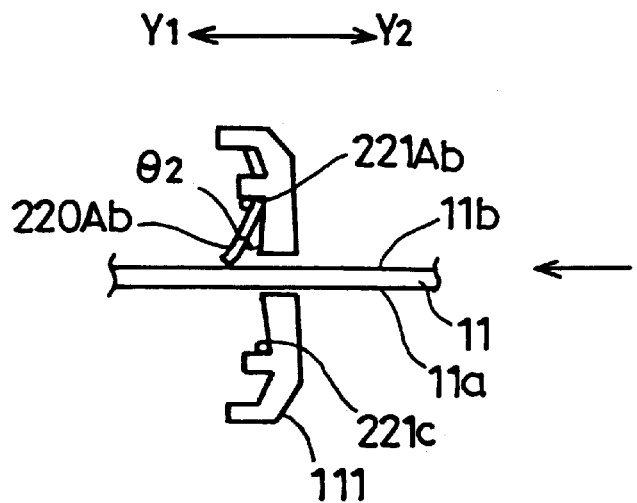
FIG. 56 is a side view of the disk supporting member observed when the disk is inserted.
Figure 57:
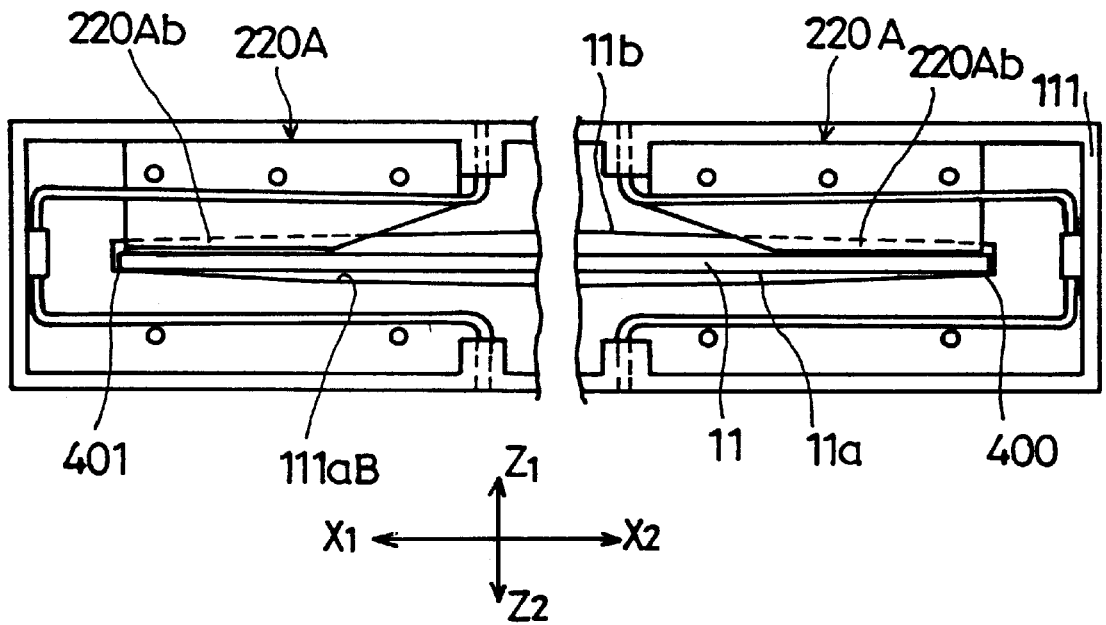
FIG. 57 is a diagram of the disk supporting member observed when the disk is inserted and viewed from the inside of the disk reproducing unit.

As shown in FIGS. 56 and 57, the disk 11 is inserted so that the wing parts 220Ab of the disk supporting member 220A are pressed and warped in the direction Y1. The disk 11 is horizontally inserted into the disk inlet 111a so that the recording surface 11a thereof faces downwards and the label surface 11b faces upwards. Only the label surface 11b of the disk is rubbed against the wing parts 220Ab, while the recording surface 11a thereof is not rubbed against the wing parts 220Ab. As described before, the lower edge 111aB of the disk inlet 111 is curved so that the distance from the imaginary line connecting the extreme ends of the disk inlet 111 to the lower edge measured in the direction Z2 increases as the position on the imaginary line becomes closer to the center of the disk inlet 111. Hence, the disk 11 contacts the lower edge 111aB positions 400 and 401 close to the extreme edges of the disk inlet 111, and are spaced part from the lower edge 111aB in other positions. Hence, the recording surface 11a of the disk 11 can be kept in non-contact with the wing parts 220Ab and the lower edge 111aB of the disk inlet 111 and can be prevented from being damaged.

Since the wing parts 220Ab are inclined at the angle θ1 in the direction Y1 with respect to the direction Z1-Z2, the wing parts 220Ab are restricted so as to be warped at the maximum angle θ2, as shown in FIG. 56. Hence, the wing parts 220Ab obtained at the warped state have a small elastically restoring force. Hence, the resistance force exerted onto the disk 11 due to the wing parts 220Ab caused in the warped state (the load on the disk 11) is small. Hence, the inserting work of the disk 11 can comfortably be carried out with a reduced force.

The center of the warp of each of the wing parts 220Ab corresponds to the position which is pressed by the arm portion 221b, and is spaced apart from the upper edge 111aA of the disk inlet 111 upwards. This also contributes to causing the wing parts 220Ab to be warped at the restricted angle.

Figure 58:
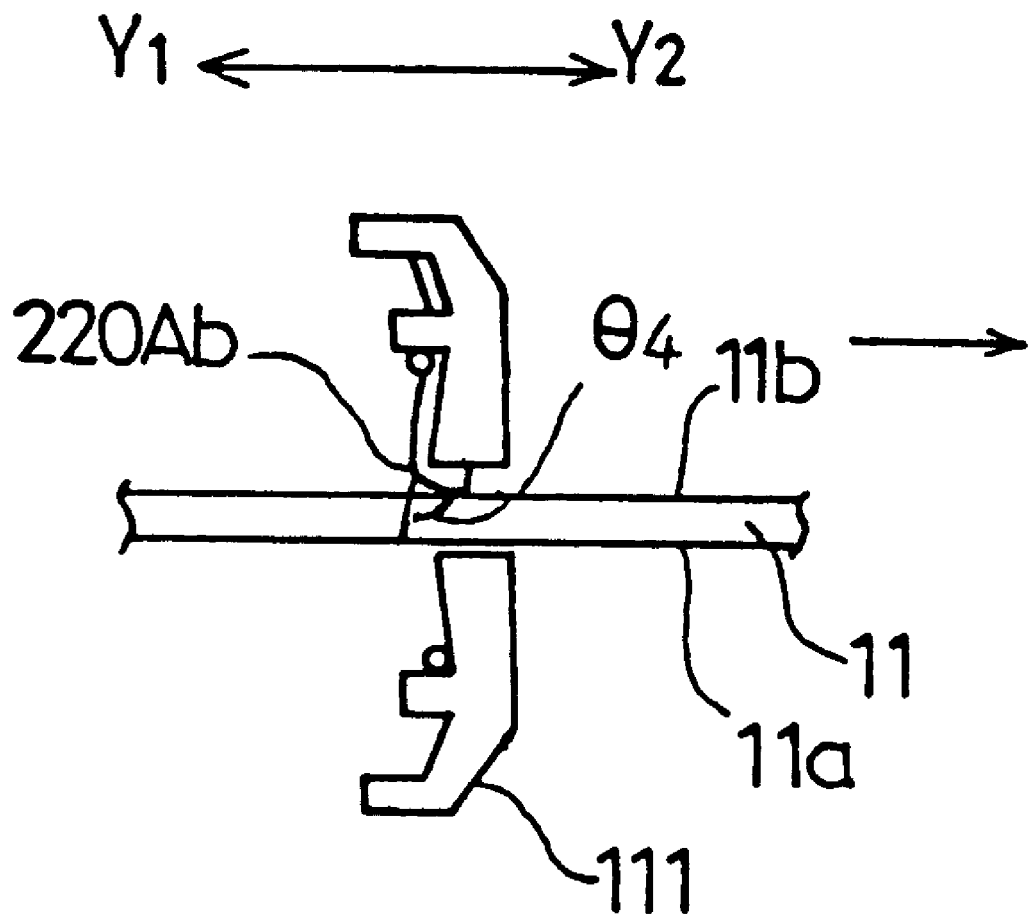
FIG. 58 is a side view of the disk supporting member observed when the disk is ejected.
Figure 59A:
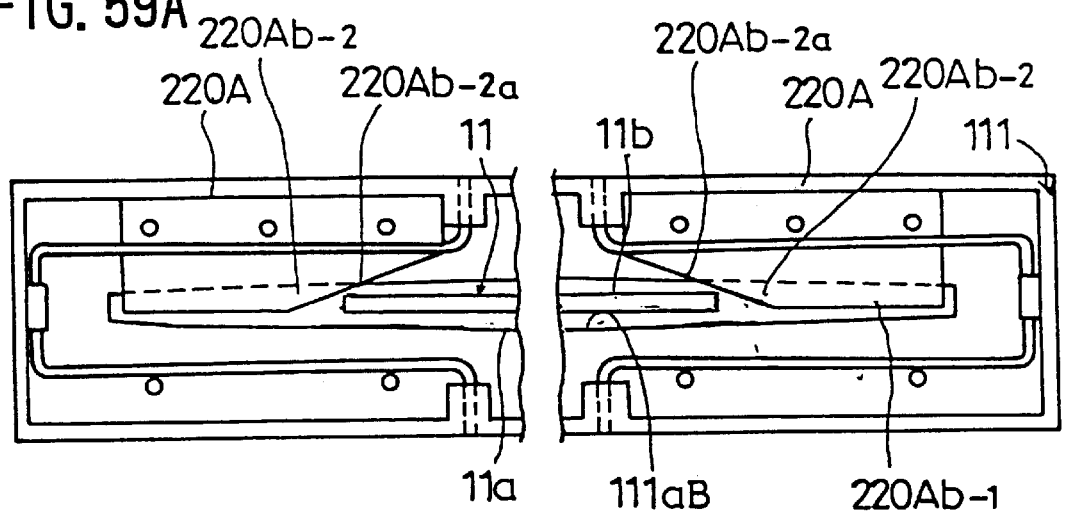
FIGS. 59A, 59B and 59C are diagrams of the disk supporting member and the disk inlet observed when the disk is ejected and viewed from the inside of the disk reproducing unit.
Figure 59B:
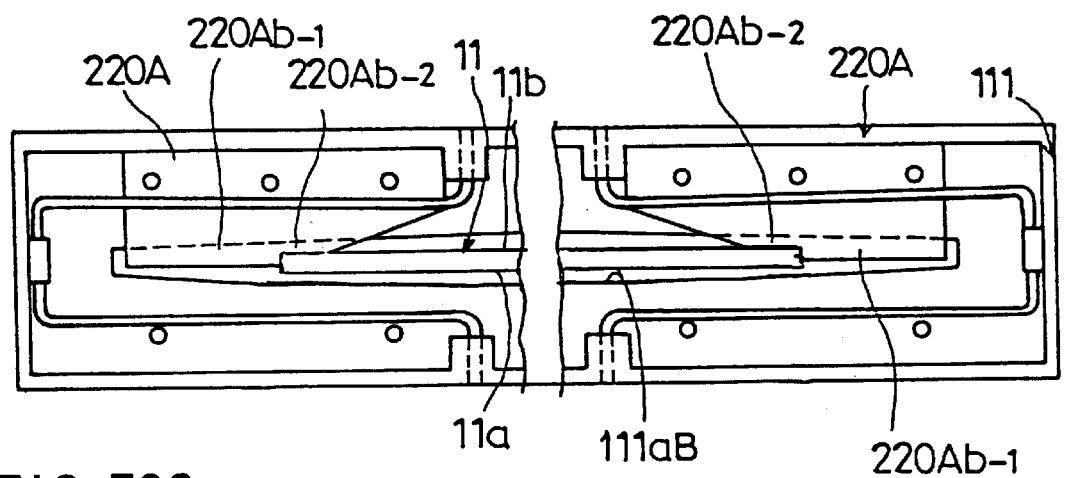
Figure 59C:
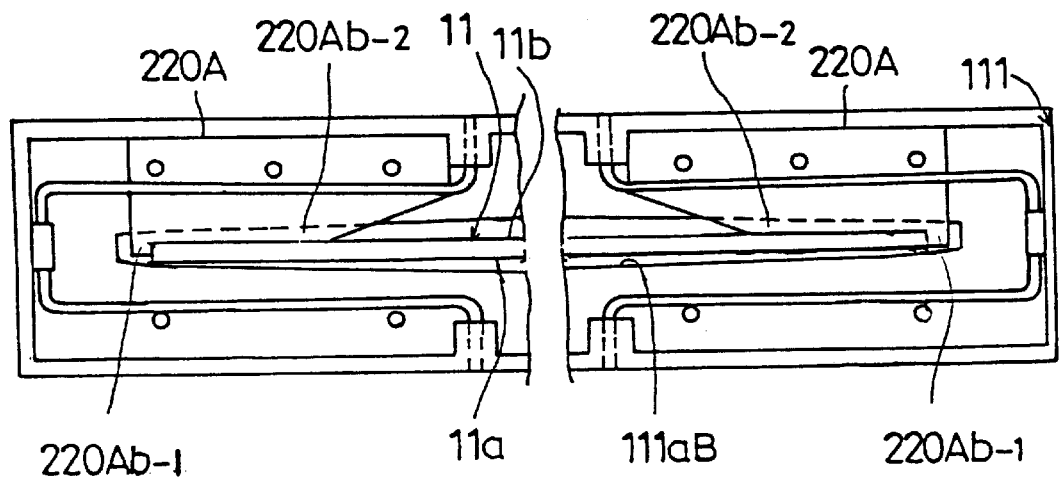
Figure 60A:
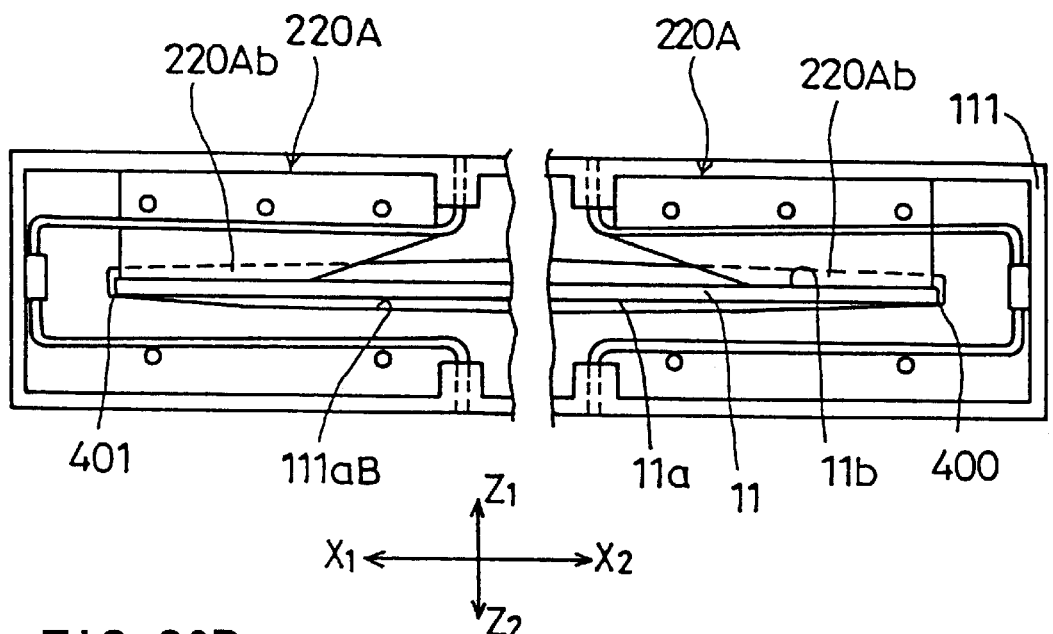
FIGS. 60A and 60B are diagrams of the disk supporting member observed when the disk is manually ejected and viewed from the inside of the disk reproducing unit.
Figure 60B:
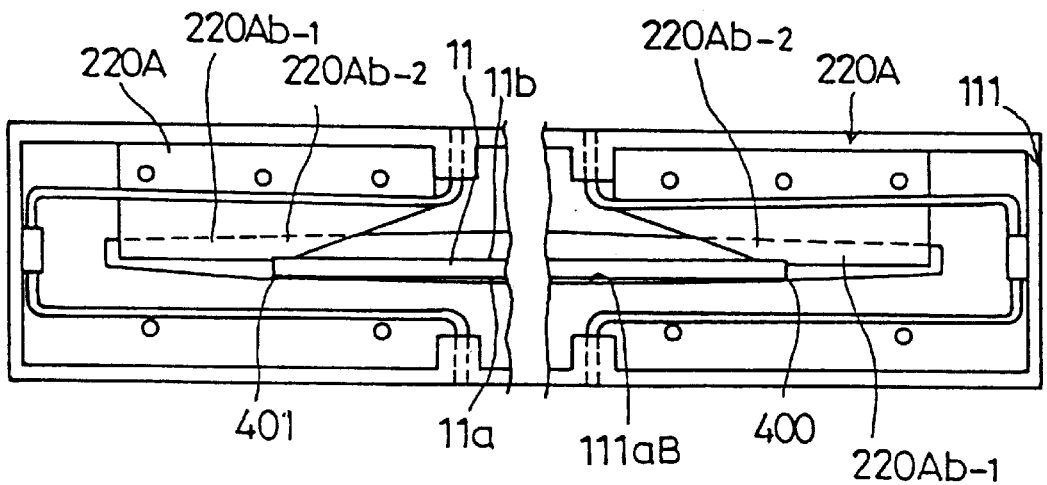

The disk 11 is automatically ejected in the direction Y2 by the disk transfer mechanism 34A until the approximately half of the disk 11 protrudes from the disk inlet 111. Then, the disk 11 can be taken out of the disk inlet 111 by picking the disk 11 by the fingers of the operator and drawing it. While the disk 11 is being moved by the disk transfer mechanism 34A, the disk transfer mechanism 34A picks the peripheral edge of the disk 11, which is thus maintained at the height of the center of the disk inlet 111. As shown in FIGS. 59A, 59B and 59C, the disk 11 can be ejected so that it does not contact the lower edge 111aB of the disk inlet 111. When the operator draws the disk 11, as shown in FIGS. 60A and 60B, the disk 11 leaves the disk transfer mechanism 34A, and contacts the lower edge 111aB of the disk inlet 111 in the positions 400 and 401. As shown in FIG. 58, the elastically restoring force is stored in the wing parts 220Ab which are warped at a comparatively large angle θ4, and the label surface 11b of the disk 11 is pressed against the warped wing parts 220Ab in the direction Z2. Thus, the disk 11 is sandwiched between the lower edge 111aB and the wing parts 220Ab and can be drawn. Hence, even if the fingers of the operator are detached from the disk 11, the disk 11 can be supported so that the disk 11 disengages and falls.

As in the case of the disk inserting operation, the disk 11 can be ejected so that only the label surface 11b is rubbed against the wing parts 220Ab and the recording surface 11a is spaced apart from the lower edge 111aB of the disk inlet 111. Hence, the disk 11 can be taken out without any damage on the recording surface 11a.

The initial-stage of the ejecting operation is shown in FIGS. 60A and 60B. When the disk 11 is ejected from the disk inlet 111 in the direction Y2, the peripheral edge of the disk 11 comes into contact with an obliquely extending edge 220Ab-2a of the triangular portion 220Ab-2 of each of the wing portions 220Ab, so that the edge 220Ab-2a is gradually warped. Then, the peripheral edge of the disk 11 comes into contact with the rectangular portion 220Ab-1, so that it is gradually warped. Hence the load applied to the disk 11 can greatly be reduced, so that unwanted vibrations of the disk 11 do not occur while the disk 11 is being ejected. Hence, the disk 11 can smoothly be ejected from the disk inlet 111.

The disk supporting members 220A are not made to be inclined in the direction Y1 but are provided in the direction Z1-Z2 perpendicular to the disk inserting direction Y1. Also, the disk supporting members 220A do not have the triangular portions 220Ab-2, which may be replaced by rectangular portions. In an arrangement in which the disk 11 is inserted so that the recording surface 11a thereof faces upwards, the disk supporting members 220A are attached to the position lower than the disk inlet 111, and the wing portions 220Ab protrude from the lower edge 111aB.

The present invention is not limited to the above-mentioned embodiments, and variations and modifications may be made without departing from the scope of the present invention.

What is claimed is:

1. A recording medium reproducing apparatus comprising:
   a recording medium inlet member through which a recording medium is inserted;
   a recording medium reproducing unit which reproduces said recording medium; and
   a recording medium supporting member including at least one wing portion which supports said recording medium, wherein:
   said at least one wing portion is elastically warped by the recording medium and supports the recording medium by an elastically restoring force;
   the recording medium inlet member has a disk inlet having a first curved edge so that a center portion of the disk inlet has a width greater than that of edge portions thereof; and
   said at least one wing portion protrudes from a second edge of the disk inlet and extends in the disk inlet, the first curved edge being opposite the second edge, and, when the recording medium is inserted into the disk inlet, a first surface of the recording medium contacts the first curved edge of the disk inlet at extreme edge positions without contacting said at least one wing portion, and only a second, opposite surface of the recording medium elastically warps said at least one wing portion.

2. The recording medium reproducing apparatus as claimed in claim 1, wherein:

said at least one wing portion has an extending portion located in the disk inlet; and the extending portion has a length which is gradually increased towards the edges of the disk inlet from the center thereof.

3. The recording medium reproducing apparatus as claimed in claim 1, wherein said at least one wing portion is provided obliquely in a direction in which the recording medium is inserted in the recording medium reproducing unit.

4. The recording medium reproducing apparatus as claimed in claim 1, wherein said at least one wing portion has a plate shape.

5. The recording medium reproducing apparatus as claimed in claim 1, wherein the recording medium is a bare disk-shaped recording medium.

6. The recording medium reproducing apparatus as claimed in claim 1, wherein said at least one wing portion is provided on both sides of the center portion of the disk inlet.

* * * * *